US011894637B2

(12) United States Patent
Pepe

(10) Patent No.: US 11,894,637 B2
(45) Date of Patent: Feb. 6, 2024

(54) CONNECTORS AND CONTACTS FOR A SINGLE TWISTED PAIR OF CONDUCTORS

(71) Applicant: COMMSCOPE TECHNOLOGIES LLC, Hickory, NC (US)

(72) Inventor: Paul John Pepe, Clemmons, NC (US)

(73) Assignee: CommScope Technologies LLC, Hickory, NC (US)

( * ) Notice: Subject to any disclaimer, the term of this patent is extended or adjusted under 35 U.S.C. 154(b) by 198 days.

(21) Appl. No.: 17/439,653

(22) PCT Filed: Mar. 13, 2020

(86) PCT No.: PCT/US2020/022731
§ 371 (c)(1),
(2) Date: Sep. 15, 2021

(87) PCT Pub. No.: WO2020/190758
PCT Pub. Date: Sep. 24, 2020

(65) Prior Publication Data

US 2022/0158389 A1 May 19, 2022

Related U.S. Application Data

(60) Provisional application No. 62/819,246, filed on Mar. 15, 2019.

(51) Int. Cl.
*H01R 13/6582* (2011.01)
*H01R 13/504* (2006.01)
(Continued)

(52) U.S. Cl.
CPC ..... *H01R 13/6582* (2013.01); *H01R 13/5045* (2013.01); *H01R 13/6463* (2013.01); *H01R 24/20* (2013.01); *H01R 43/20* (2013.01)

(58) Field of Classification Search
CPC ............ H01R 13/6582; H01R 13/5045; H01R 13/6463; H01R 24/20; H01R 43/20; H01R 2103/00; H01R 13/6599
See application file for complete search history.

(56) References Cited

U.S. PATENT DOCUMENTS 2,673,968 A 3/1954 Smith
2,813,257 A 11/1957 Cornell, Jr.
(Continued)

FOREIGN PATENT DOCUMENTS

CN 1408135 A 4/2003
CN 1977428 A 6/2007
(Continued)

OTHER PUBLICATIONS

Office Action in European Application No. 18791421.3 dated Nov. 30, 2021.

(Continued)

*Primary Examiner* — Travis S Chambers
(74) *Attorney, Agent, or Firm* — Merchant & Gould P.C.

(57) ABSTRACT

A connector for exactly two conductors that includes a forward connector body, a rear connector body, a metal frame and exactly one pair of electrical contacts. The rear connector body interfaces with the forward connector body. The metal frame surrounds at least a portion of both the forward connector body and the rear connector body. The metal frame including a shielding interface, wherein the metal frame is secured to the forward connector body with at least two retaining features. The exactly one pair of electrical contacts comprises a first electrical contact and a second electrical contact that extend from the rear connector body into the forward connector body.

17 Claims, 46 Drawing Sheets

(51) Int. Cl.

| | |
|---|---|
| ***H01R 13/6463*** | (2011.01) |
| ***H01R 24/20*** | (2011.01) |
| *H01R 43/20* | (2006.01) |

(56) References Cited

U.S. PATENT DOCUMENTS

| | | | |
|---|---|---|---|
| 3,199,060 | A | 8/1965 | Marasco |
| 3,827,007 | A | 7/1974 | Fairbairn et al. |
| 3,828,706 | A | 8/1974 | Scott |
| 4,054,350 | A | 10/1977 | Hardesty |
| 4,449,767 | A | 5/1984 | Weidler |
| 4,458,971 | A | 7/1984 | D'Urso et al. |
| 4,565,416 | A | 1/1986 | Rudy et al. |
| 4,702,538 | A | 10/1987 | Hutter et al. |
| 4,743,208 | A | 5/1988 | Weisenburger |
| 4,744,774 | A | 5/1988 | Pauza |
| 4,824,394 | A | 4/1989 | Roath et al. |
| 4,917,625 | A | 4/1990 | Haile |
| 4,932,906 | A | 6/1990 | Kaley et al. |
| 5,013,255 | A | 5/1991 | Juret et al. |
| 5,014,407 | A | 5/1991 | Boughten et al. |
| 5,240,436 | A | 8/1993 | Bradley et al. |
| 5,368,499 | A | 11/1994 | Hirt |
| 5,385,476 | A | 1/1995 | Jasper |
| 5,496,184 | A | 3/1996 | Garrett et al. |
| 5,533,915 | A | 7/1996 | Deans |
| 5,580,264 | A | 12/1996 | Aoyama et al. |
| 5,647,119 | A | 7/1997 | Bourbeau et al. |
| 5,748,819 | A | 5/1998 | Szentesi et al. |
| 5,749,755 | A | 5/1998 | Genta et al. |
| 5,833,496 | A | 11/1998 | Hollander et al. |
| 5,897,404 | A | 4/1999 | Goodman et al. |
| 5,915,989 | A | 6/1999 | Adriaenssens et al. |
| 5,984,703 | A | 11/1999 | Weingartner |
| 5,989,057 | A | 11/1999 | Gerke et al. |
| 6,019,521 | A | 2/2000 | Manning et al. |
| 6,045,389 | A | 4/2000 | Ferrill et al. |
| 6,050,845 | A | 4/2000 | Smalley, Jr. et al. |
| 6,065,994 | A | 5/2000 | Hashim et al. |
| 6,135,804 | A | 10/2000 | Lux |
| 6,217,230 | B1 | 4/2001 | Matsushita |
| 6,254,440 | B1 | 7/2001 | Ko et al. |
| 6,270,372 | B1 | 8/2001 | Jenner et al. |
| 6,272,738 | B1 | 8/2001 | Holliday et al. |
| 6,280,230 | B1 | 8/2001 | Takase et al. |
| 6,305,950 | B1 | 10/2001 | Doorhy |
| 6,390,687 | B1 | 5/2002 | Shirakawa |
| 6,402,571 | B1 | 6/2002 | Muller et al. |
| 6,488,550 | B1 | 12/2002 | Kikuchi et al. |
| 6,499,889 | B1 | 12/2002 | Shirakawa et al. |
| 6,568,967 | B2 | 5/2003 | Inaba et al. |
| 6,572,276 | B1 | 6/2003 | Theis et al. |
| 6,641,431 | B2 | 11/2003 | Saitoh |
| 6,702,617 | B1 | 3/2004 | Clement et al. |
| 6,729,901 | B2 | 5/2004 | Aekins |
| 6,805,577 | B2 | 10/2004 | Murakami et al. |
| 6,988,914 | B2 | 1/2006 | Pepe et al. |
| 7,004,797 | B2 | 2/2006 | Harada et al. |
| 7,201,601 | B2 | 4/2007 | Lappohn |
| 7,217,162 | B2 | 5/2007 | Harada et al. |
| 7,278,854 | B1 | 10/2007 | Robinette et al. |
| 7,291,046 | B2 | 11/2007 | Russelburg |
| 7,318,272 | B1 | 1/2008 | Steiner et al. |
| 7,325,976 | B2 | 2/2008 | Gurreri et al. |
| 7,537,393 | B2 | 5/2009 | Anderson et al. |
| 7,559,789 | B2 | 7/2009 | Hashim |
| 7,618,297 | B2 | 11/2009 | Wang |
| 7,867,033 | B2 | 1/2011 | Kumagai et al. |
| 7,955,112 | B2 | 6/2011 | Yang et al. |
| 8,006,372 | B2 | 8/2011 | Caveney et al. |
| 8,052,482 | B1 | 11/2011 | Lin |
| 8,109,789 | B2 | 2/2012 | Tyler |
| 8,113,889 | B2 | 2/2012 | Zhang et al. |
| 8,172,468 | B2 | 5/2012 | Jones et al. |
| 8,303,337 | B2 | 11/2012 | Ballard et al. |
| 8,684,763 | B2 | 4/2014 | Mattson et al. |
| 8,690,596 | B2 | 4/2014 | Su et al. |
| 8,715,016 | B2 | 5/2014 | DeBock et al. |
| 8,757,895 | B2 | 6/2014 | Petersen |
| 8,839,506 | B2 | 9/2014 | Slater et al. |
| 8,840,424 | B2 * | 9/2014 | Kudo .................. H01R 4/2429 439/417 |
| 8,888,535 | B2 | 11/2014 | Knight et al. |
| 8,911,260 | B2 | 12/2014 | Golko et al. |
| 8,915,759 | B2 | 12/2014 | Miyamoto |
| 8,952,703 | B2 | 2/2015 | Font Aranega et al. |
| 8,979,572 | B2 | 3/2015 | Mochizuki |
| 8,979,574 | B2 | 3/2015 | Daily, Jr. et al. |
| 8,987,933 | B2 | 3/2015 | Yu |
| 9,093,807 | B2 | 7/2015 | O'Connor et al. |
| 9,136,652 | B2 | 9/2015 | Ngo |
| 9,172,169 | B2 | 10/2015 | Hagio et al. |
| 9,209,578 | B2 | 12/2015 | Mochizuki |
| 9,293,877 | B2 | 3/2016 | Wong et al. |
| 9,343,822 | B2 | 5/2016 | Sparrowhawk et al. |
| 9,356,439 | B2 | 5/2016 | Keith et al. |
| 9,407,043 | B2 | 8/2016 | Hashim et al. |
| 9,490,591 | B2 | 11/2016 | Yamashita et al. |
| 9,590,339 | B2 | 3/2017 | Oberski et al. |
| 9,634,417 | B2 | 4/2017 | Ramanna et al. |
| 9,685,726 | B2 | 6/2017 | Ang et al. |
| 9,692,161 | B2 | 6/2017 | Lindkamp et al. |
| 9,799,981 | B2 | 10/2017 | Weber |
| 9,853,388 | B2 | 12/2017 | Copper et al. |
| 9,917,390 | B1 | 3/2018 | Bianca et al. |
| 9,972,932 | B2 | 5/2018 | Copper et al. |
| 10,061,090 | B2 | 8/2018 | Coenegracht |
| 10,069,269 | B2 | 9/2018 | Takahashi |
| 10,164,383 | B2 | 12/2018 | Feng |
| 10,389,062 | B2 | 8/2019 | Zebhauser et al. |
| 10,403,996 | B2 | 9/2019 | Pan et al. |
| 10,411,409 | B2 | 9/2019 | Hashim et al. |
| 10,535,969 | B2 | 1/2020 | Sutter |
| 10,665,974 | B2 | 5/2020 | Oberski et al. |
| 10,665,985 | B2 | 5/2020 | Keith et al. |
| 10,727,626 | B2 | 7/2020 | Murray |
| 10,768,374 | B2 | 9/2020 | Gurreri et al. |
| 10,998,685 | B2 | 5/2021 | Curtis et al. |
| 11,031,719 | B2 | 6/2021 | Somanathapura Ramanna |
| 11,271,350 | B2 | 3/2022 | Moffitt et al. |
| 11,362,463 | B2 | 6/2022 | Tobey et al. |
| 11,652,319 | B2 | 5/2023 | Pepe et al. |
| 11,652,322 | B2 | 5/2023 | Keith et al. |
| 2001/0018287 | A1 | 8/2001 | Reichle |
| 2002/0055294 | A1 | 5/2002 | Murakami et al. |
| 2002/0072275 | A1 | 6/2002 | Arai |
| 2002/0151224 | A1 | 10/2002 | Liao |
| 2004/0152360 | A1 | 8/2004 | Harris et al. |
| 2004/0266255 | A1 | 12/2004 | Lee |
| 2005/0227545 | A1 | 10/2005 | Lahoreau et al. |
| 2005/0232566 | A1 | 10/2005 | Rapp et al. |
| 2005/0277335 | A1 * | 12/2005 | Gordon .............. H01R 13/6589 439/607.48 |
| 2006/0116021 | A1 | 6/2006 | Dennes et al. |
| 2006/0134966 | A1 | 6/2006 | Lappohn |
| 2007/0270043 | A1 | 11/2007 | Pepe et al. |
| 2007/0287332 | A1 | 12/2007 | Gordon et al. |
| 2008/0057793 | A1 * | 3/2008 | Gerber ............... H01R 13/6464 439/676 |
| 2009/0176415 | A1 | 7/2009 | AbuGhazaleh et al. |
| 2010/0003863 | A1 | 1/2010 | Siemon et al. |
| 2010/0022112 | A1 | 1/2010 | Duesterhoeft et al. |
| 2010/0035454 | A1 | 2/2010 | Morgan et al. |
| 2010/0040332 | A1 | 2/2010 | Van den Meersschaut et al. |
| 2010/0041273 | A1 | 2/2010 | Scherer et al. |
| 2010/0071202 | A1 | 3/2010 | Peng et al. |
| 2010/0120284 | A1 | 5/2010 | Oka et al. |
| 2010/0151740 | A1 | 6/2010 | Hogue et al. |
| 2010/0173528 | A1 | 7/2010 | Martich et al. |
| 2010/0221951 | A1 | 9/2010 | Pepe et al. |
| 2010/0304600 | A1 | 12/2010 | Busse |
| 2010/0319963 | A1 | 12/2010 | James et al. |
| 2011/0143602 | A1 | 6/2011 | Niitsu |
| 2011/0294342 | A1 | 12/2011 | DeBock et al. |

(56) References Cited

U.S. PATENT DOCUMENTS

| | | | |
|---|---|---|---|
| 2012/0004655 A1 | 1/2012 | Kim et al. | |
| 2012/0204417 A1 | 8/2012 | Stull | |
| 2013/0075149 A1 | 3/2013 | Golko et al. | |
| 2013/0090014 A1 | 4/2013 | Champion | |
| 2013/0171885 A1 | 7/2013 | Zhang | |
| 2013/0189873 A1 | 7/2013 | Maranto et al. | |
| 2013/0252469 A1 | 9/2013 | Mochizuki | |
| 2013/0288516 A1 | 10/2013 | Chang et al. | |
| 2014/0038462 A1 | 2/2014 | Coffey et al. | |
| 2014/0213119 A1 | 7/2014 | Thackston et al. | |
| 2015/0083455 A1 | 3/2015 | Keith et al. | |
| 2015/0144395 A1 | 5/2015 | Tanaka | |
| 2015/0155670 A1 | 6/2015 | Gardner | |
| 2015/0207254 A1 | 7/2015 | Kamei et al. | |
| 2015/0214667 A1 | 7/2015 | Chen et al. | |
| 2015/0249295 A1 | 9/2015 | Tseng | |
| 2015/0311646 A1 | 10/2015 | Bopp et al. | |
| 2016/0028198 A1 | 1/2016 | Yamashita et al. | |
| 2016/0093984 A1 | 3/2016 | Iwamoto | |
| 2016/0131858 A1 | 5/2016 | Anderson et al. | |
| 2016/0164223 A1 | 6/2016 | Zebhauser et al. | |
| 2016/0192527 A1 | 6/2016 | Anderson et al. | |
| 2016/0294111 A1 | 10/2016 | Kobayashi et al. | |
| 2016/0315436 A1 | 10/2016 | Plamondon et al. | |
| 2016/0344139 A1* | 11/2016 | O'Young | H01R 13/6461 |
| 2017/0077966 A1 | 3/2017 | Chen et al. | |
| 2017/0184798 A1 | 6/2017 | Coenegracht | |
| 2017/0207561 A1 | 7/2017 | Scherer et al. | |
| 2017/0264025 A1 | 9/2017 | Lappöhn | |
| 2017/0322378 A1 | 11/2017 | Declerck et al. | |
| 2017/0373405 A1 | 12/2017 | Lappoehn | |
| 2019/0154923 A1 | 5/2019 | Flaig | |
| 2019/0296491 A1 | 9/2019 | Maesoba et al. | |
| 2020/0036130 A1 | 1/2020 | Fontaine et al. | |
| 2020/0153174 A1 | 5/2020 | Curtis et al. | |
| 2020/0274273 A1 | 8/2020 | Oberski et al. | |
| 2020/0350730 A1 | 11/2020 | Keith et al. | |
| 2021/0083441 A1 | 3/2021 | Moffitt et al. | |
| 2021/0104842 A1 | 4/2021 | Keith et al. | |
| 2021/0104843 A1 | 4/2021 | Tobey et al. | |
| 2021/0151905 A1 | 5/2021 | Novak et al. | |
| 2021/0194179 A1 | 6/2021 | Pepe et al. | |
| 2021/0378834 A1 | 12/2021 | Kleiner | |
| 2022/0360033 A1 | 11/2022 | Pepe et al. | |
| 2022/0384984 A1 | 12/2022 | Pepe et al. | |
| 2023/0071501 A1 | 3/2023 | Tobey et al. | |
| 2023/0238757 A1 | 7/2023 | Pepe et al. | |

FOREIGN PATENT DOCUMENTS

| | | | |
|---|---|---|---|
| CN | 102055115 | A | 5/2011 |
| CN | 102136649 | A | 7/2011 |
| CN | 103311746 | A | 9/2013 |
| CN | 104428958 | A | 3/2015 |
| CN | 105789965 | A | 7/2016 |
| CN | 106415944 | A | 2/2017 |
| CN | 107104329 | A | 8/2017 |
| CN | 209167592 | U | 7/2019 |
| DE | 102 16 915 | A1 | 10/2003 |
| EP | 1 128 494 | A2 | 8/2001 |
| EP | 1 783 871 | A1 | 5/2007 |
| EP | 3 091 614 | A1 | 11/2016 |
| FR | 2 290 136 | A7 | 5/1976 |
| GB | 628 419 | A | 8/1949 |
| GB | 2510490 | A | 8/2014 |
| JP | 2004-319196 | A | 11/2004 |
| JP | 4514356 | B2 | 5/2010 |
| JP | 2014-38847 | A | 2/2014 |
| KR | 10-2010-0122766 | A | 11/2010 |
| KR | 10-2011-0020262 | A | 3/2011 |
| WO | 2006/048867 | A1 | 5/2006 |
| WO | 2016/132855 | A1 | 8/2016 |
| WO | 2017/019370 | A1 | 2/2017 |
| WO | 2018/200528 | A1 | 11/2018 |
| WO | 2019/165466 | A1 | 8/2019 |
| WO | 2020/051340 | A1 | 3/2020 |
| WO | 2021/067274 | A1 | 4/2021 |

OTHER PUBLICATIONS

Extended European Search Report for Application No. 20774495.4 dated Nov. 10, 2022.

Office Action from Chinese Application No. 201980023438.2 dated Jun. 3, 2021, 19 pages [English translation].

DiBiaso et al., "Designing a Connection System for Gigabit Automotive Ethernet," SAE International Journal of Passenger Cars—Electronic and Electrical Systems, vol. 9, No. 1, pp. 134-146 (May 2016).

Extended European Search Report for Application No. 18791421.3 dated Oct. 8, 2020.

International Search Report and Written Opinion of the International Searching Authority for International Patent Application No. PCT/US2018/029146 dated Aug. 9, 2018, 12 pages.

International Search Report and Written Opinion of the International Searching Authority for International Patent Application No. PCT/US2019/019660 dated Jun. 19, 2019, 17 pages.

2-Pin Connector w/Header, .10, All Electronics Corporation, 3 pages, downloaded: http://www.allelctronics.com/item/con-242/2-pin-connector-w/header -.10/html (May 31, 2017).

2 Pin Connectors, Wiring Specialties, 5 pages (May 31, 2017).

International Search Report and Written Opinion of the International Searching Authority for International Patent Application No. PCT/US2020/022731 dated Jul. 13, 2020, 9 pages.

Extended European Search Report for Application No. 19758304.0 dated Mar. 11, 2022.

Bapat, "On the design and analysis of compliant mechanisms using the pseudo-rigid-body model concept." Retrieved from the Internet: <https://scholarsmine.mst.edu/cgi/viewcontent.cgi?article=3378&context=doctoral_dissertations>. Doctoral Dissertation, Missouri University of Science and Technology, 295 pages (2015).

Office Action from Chinese Application No. 202080020977.3 dated Apr. 28, 2023, 15 pages (English Translation).

Her, "Methodology for Compliant Mechanisms Design" Thesis, Purdue University, 196 pages (Dec. 1986).

Koli, "A generalized approach for compliant mechanism design using the synthesis with compliance method, with experimental validation." Retrieved from the Internet: <URL: https://scholarsmine.mst.edu/cgi/viewcontent.cgi?article=8098&context=masters_theses>. Masters Thesis, Missouri University of Science and Technology, 155 pages (2013).

* cited by examiner

DETAIL A

A-A

SEC C-C

SECTION E-E

SECTION D-D

Section C-C

CONNECTORS AND CONTACTS FOR A SINGLE TWISTED PAIR OF CONDUCTORS

CROSS-REFERENCE TO RELATED APPLICATION

This application is a National Stage Application of PCT/US2020/022731, filed on Mar. 13, 2020, which claims the benefit of U.S. Patent Application Ser. No. 62/819,246, filed on Mar. 15, 2019, the disclosures of which are incorporated herein by reference in their entireties. To the extent appropriate, a claim is made to each of the above disclosed applications.

TECHNICAL FIELD

The present disclosure is directed to connectors and, more specifically, to connectors for use with a single-twisted pair of conductors.

BACKGROUND

A single twisted pair of conductors can be used to transmit data and/or power over a communications network that includes, for example, computers, servers, cameras, televisions, and other electronic devices including those on the internet of things (IoT), etc. In the past, this has been performed through use of Ethernet cables and connectors that typically include four pairs of conductors that are used to transmit four differential signals. Differential signaling techniques, where each signal is transmitted over a balanced pair of conductors, are used because differential signals may be affected less by external noise sources and internal noises sources such as crosstalk as compared to signals that are transmitted over unbalanced conductors.

In Ethernet cables, the insulated conductors of each differential pair are tightly twisted about each other to form four twisted pairs of conductors, and these four twisted pairs may be further twisted about each other in a so-called "core twist." A separator may be provided that is used to separate (and hence reduce coupling between) at least one of the twisted pairs from at least one other of the twisted pairs. The four twisted pairs and any separator may be enclosed in a protective jacket. Ethernet cables are connectorized with Ethernet connectors; a single Ethernet connector is configured to accommodate all four twisted pairs of conductors. However, it is possible that data and/or power transfer can be effectively supported through a singled twisted pair of conductors with its own more compact connector and cable. Accordingly, a connector design different from a standard Ethernet connector is needed.

SUMMARY

A single twisted pair of conductors can be used to transmit data and/or power over a communications network that includes, for example, computers, servers, cameras, televisions, and other electronic devices including those on the internet of things (IoT), etc. A family of connectors to accommodate a single twisted pair of conductors is disclosed herein. The family of connectors includes a free connector, a fixed connector, and an adapter; the free and/or fixed connectors can be modified to accommodate the adapter configuration and/or modified to accommodate various patch cord configurations. In certain embodiments, the one or more of the family of connectors adopts an LC fiber optic style connector configuration and an LC fiber optic footprint configuration. In certain examples, one or more of the family of connectors adopts an LC fiber optic style connector configuration but in a footprint that is larger or smaller than the footprint of the LC fiber optic footprint. Other configurations may also be adopted.

An aspect of the present disclosure is directed to a connector. The connector is configured for exactly two conductors. The connector includes a forward connector body, a rear connector body, a metal frame and exactly two electrical contacts. The rear connector body interfaces with the forward connector body. Further, the metal frame, which includes a shielding interface, surrounds at least a portion of both the forward and rear connector bodies. The electrical contacts extend from the rear connector body into the forward connector body. A first of the electrical contacts is electrically coupled to a first conductor of a shielded cable and the second of the electrical contacts is electrically coupled to a second conductor of the shielded cable. The shield interface of the metal frame is electrically coupled to the shield of the shielded cable.

Another aspect of the present disclosure is directed to an electrical contact for a two-conductor-only connector that houses exactly two of the electrical contacts. Each electrical contact comprises a tuning fork receptacle contact at a first end of the electrical contact and an insulation displacement contact (IDC) at a second end of the electrical contact. The IDC is electrically coupled to one of the conductors. The tuning fork receptacle contact includes a pair of opposing spring arms that define exactly two contact zones, e.g. a disengagement zone and a fully engaged zone. The disengagement zone permits an arc between the tuning fork receptacle contact and a pin contact received by the tuning fork receptacle contact without damaging a final contact point of the pin contact when received at the fully engaged zone.

Another aspect of the present disclosure is directed to a method of connectorizing exactly one pair of conductors comprising a first and second conductor. The method comprises: (a) inserting a first and second electrical contact into a connector housing, wherein each of the first and second electrical contacts include a first end having a tuning fork receptacle contact and a second end having an insulation displacement contact (IDC); (b) securing a metal frame to the connector housing, the metal frame surrounding at least a portion of the connector housing; (c) electrically coupling the first conductor to the IDC of the first electrical contact and electrically coupling the second conductor to the IDC of the second electrical contact; and (d) electrically coupling a shielding element of the metal frame to a shield of the shielded cable.

DETAILED DESCRIPTION

A family of connectors to accommodate a single twisted pair of conductors is disclosed herein. The family of connectors includes a free connector, a fixed connector, and an adapter; the free and/or fixed connectors can be modified to accommodate various patch cord and mounting configurations. In certain embodiments, the one or more of the family of connectors adopts an LC fiber optic style connector configuration and an LC fiber optic footprint configuration. In certain examples, one or more of the family of connectors adopts an LC fiber optic style connector configuration but in a footprint that is larger or smaller than the footprint of the LC fiber optic footprint. Other configurations may also be adopted.

Figure 1A:
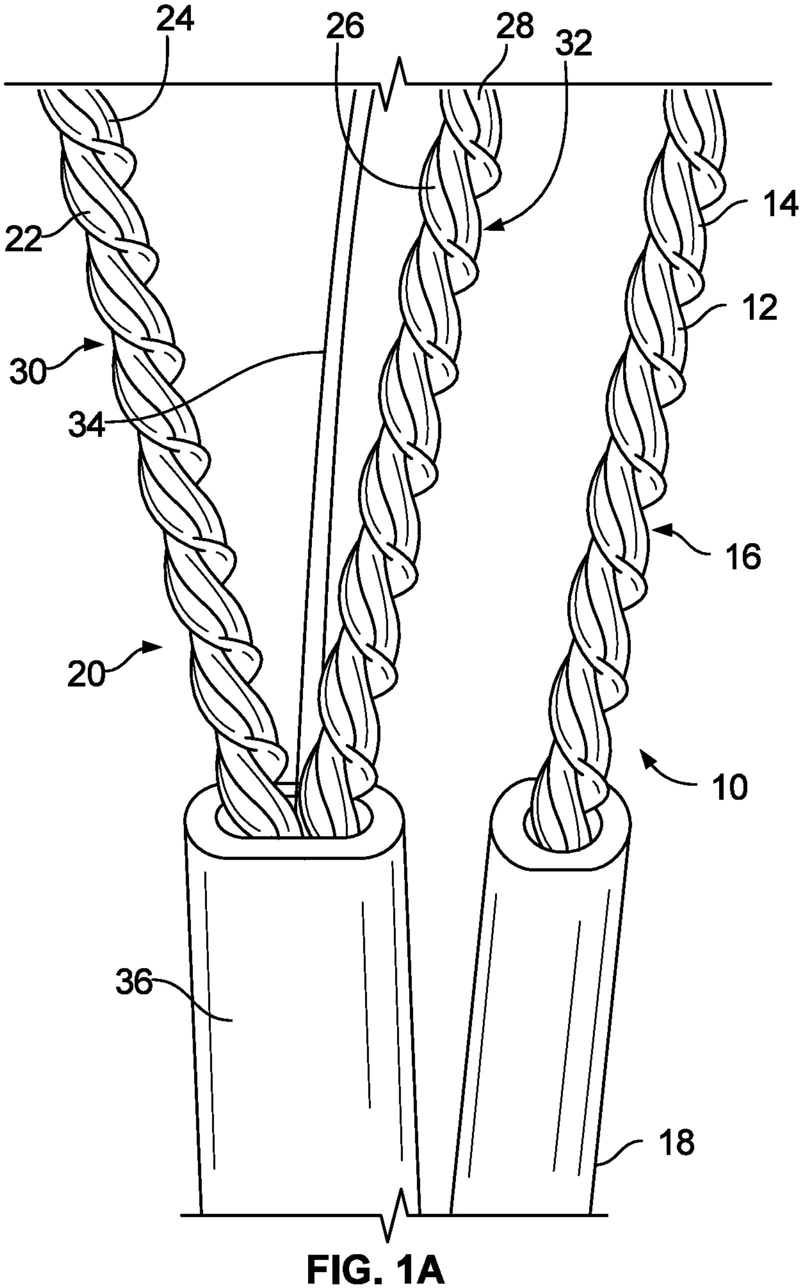
FIGS. 1A-1B illustrate example embodiments of cables having single twisted pairs of conductors.
Figure 1B:
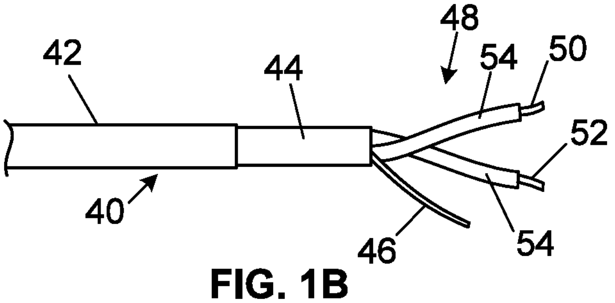

FIG. 1A illustrates two example embodiments of cables containing one or more single twisted pairs of conductors. The first cable 10 includes first and second conductors 12, 14 that are twisted together to form a single twisted pair 16. The conductors 12, 14 are enclosed by a protective jacket 18. The second cable 20 includes first through fourth conductors 22, 24, 26, 28. Conductors 22 and 24 are twisted together to form a first single twisted pair 30, and conductors 26 and 28 are twisted together to form a second single twisted pair 32. The twisted pairs 30 and 32 are separated by a separator 34, and are encased in a protective jacket 36. In certain example embodiments, the cables 10, 20 include a number of twisted pairs greater than two. In certain example embodiments, each single twisted pair of conductors, e.g., 16, 30, 32, is configured for data transmission up to 600 MHz (ffs) and has a current carrying capacity up to 1 A. Each single twisted pair of conductors, e.g., 16, 30, 32, can be connectorized with the various embodiments or combination of embodiments of free connectors and fixed connectors as described herein. The connectorized twisted pairs can be coupled with an adapter as described herein. FIG. 1B is an example of a shielded cable 40. The shielded cable 40 includes an outer jacket 42, a foil shield 44, a drain wire 46, and a single twisted pair 48 of conductors 50 and 52; each of the conductors 50 and 52 is provided with insulation 54.

Figure 2A:
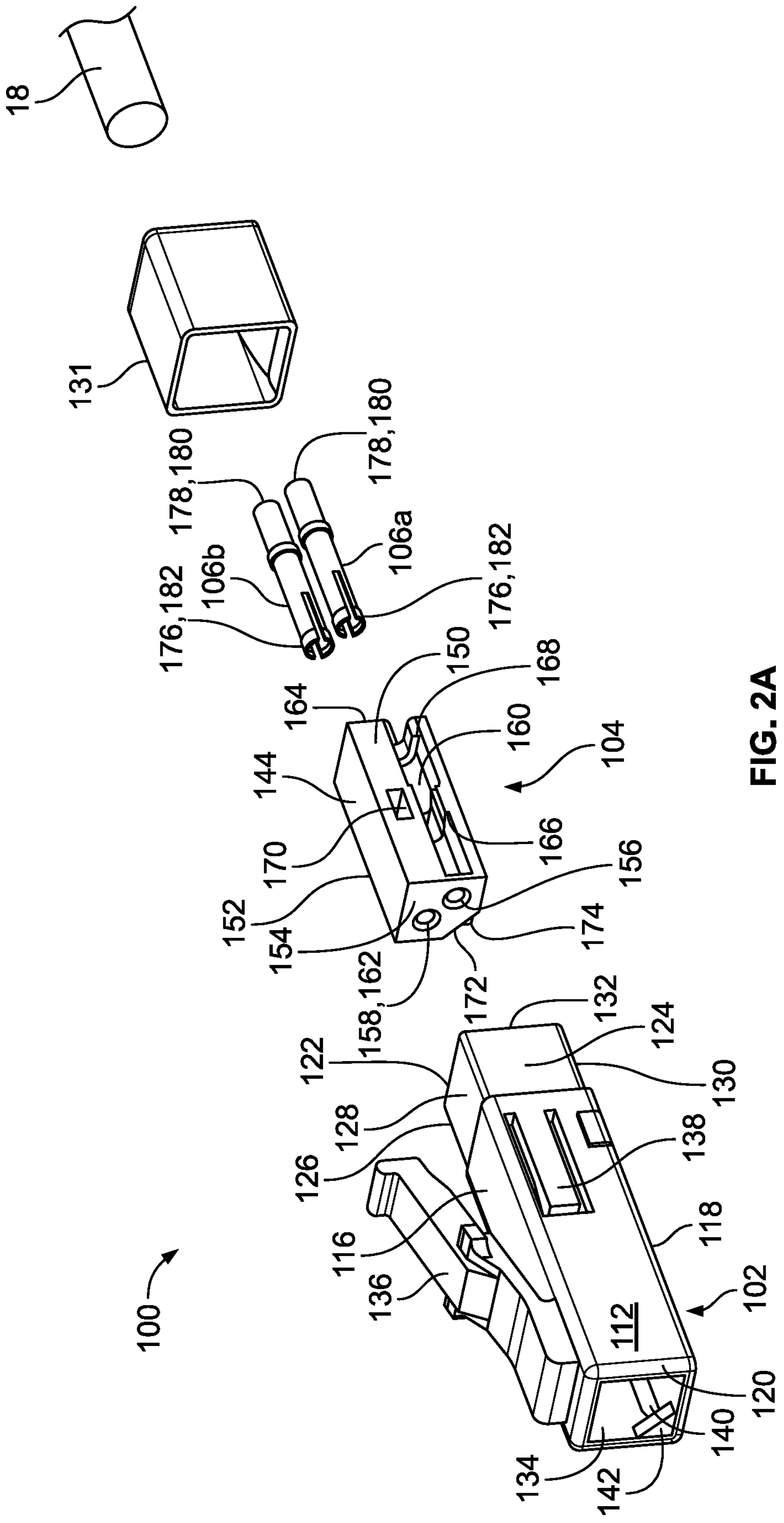
FIGS. 2A and 2B provide a perspective view of an example embodiment of an unassembled and an assembled free connector, respectively.
Figure 2B:
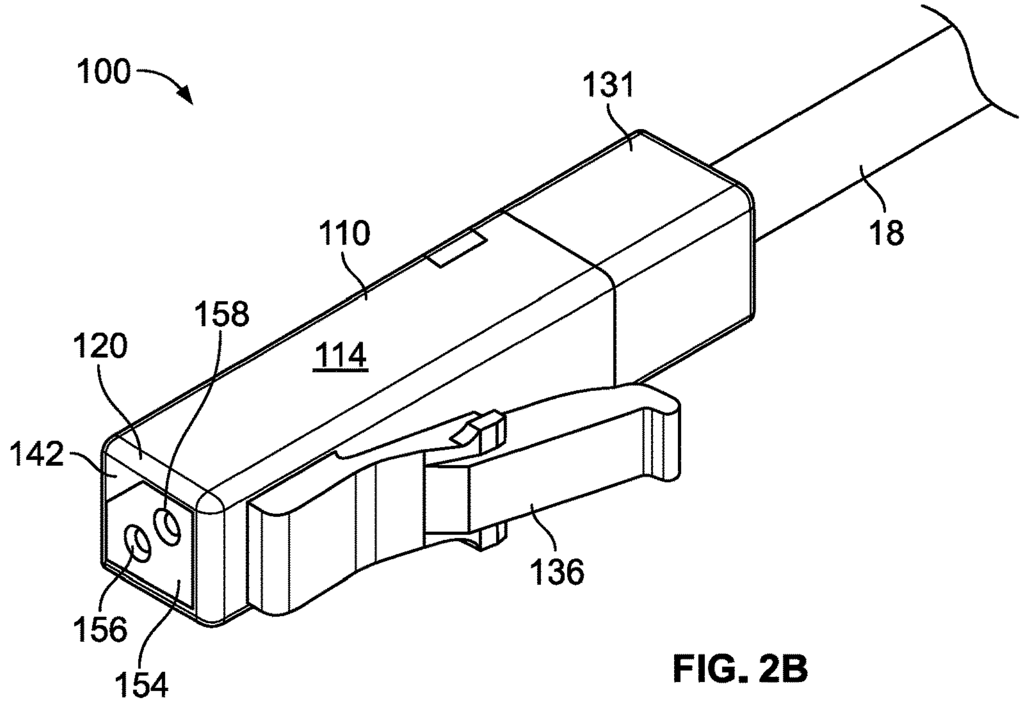

Referring to FIGS. 2A and 2B, an example embodiment of an unassembled and assembled free connector 100, respectively, are illustrated. In certain embodiments, the free connector 100 is in the style of an LC connector that is used with optical fibers. In certain embodiments the free connector 100 can adopt the LC connector footprint, e.g. the shape and size of the LC connector. In certain embodiments, the free connector 100 is of the LC style (e.g. similar in appearance, for example, a small form factor with a substantially square elongate connector body and a snap latch on the connector body) but in a larger or smaller footprint than the LC connector. In certain embodiments, the free connector 100 varies in other dimensions and/or features from the LC connector style and/or footprint.

Figure 3:
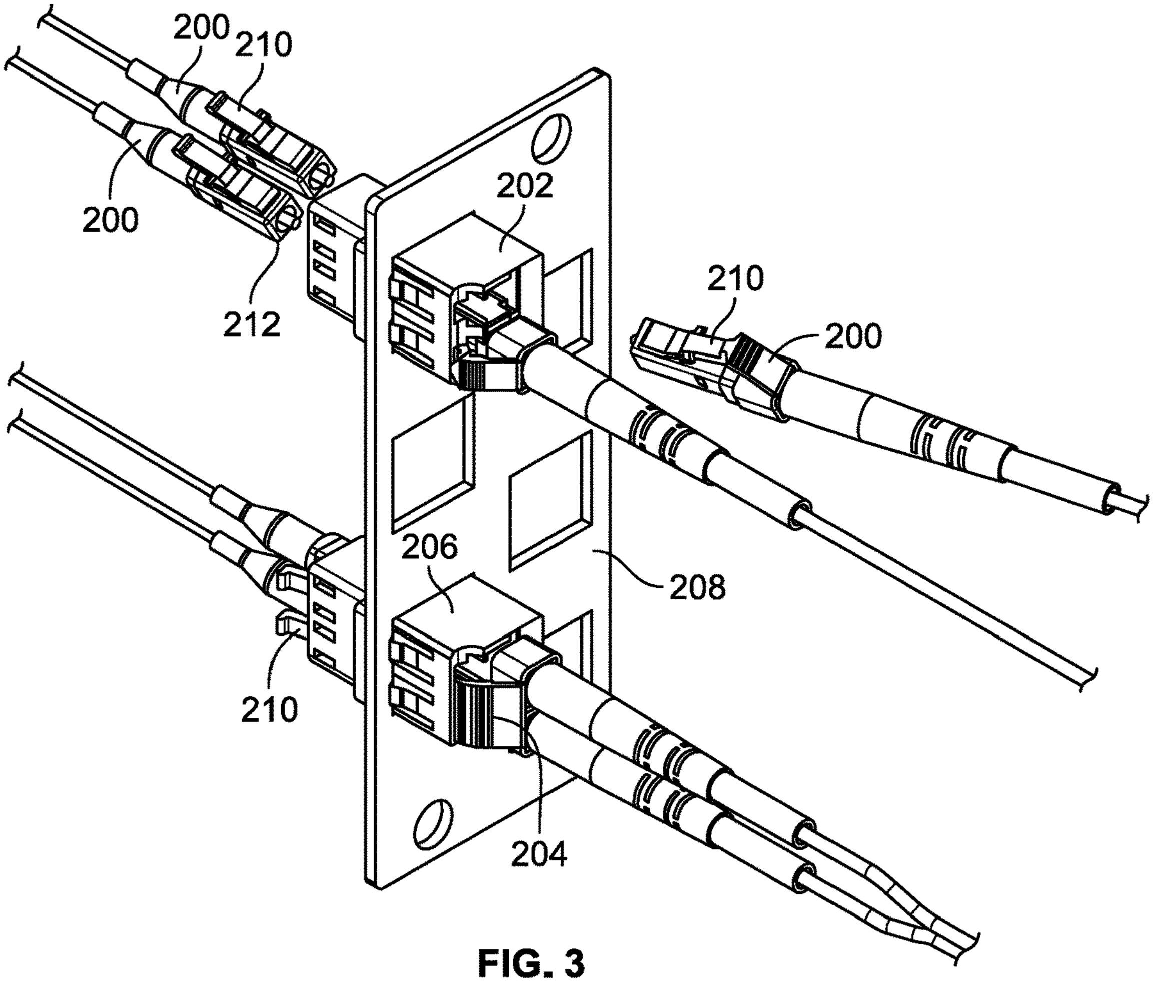
FIG. 3 illustrates an example of LC connectors configured for use with optical fibers.
Figure 4A:
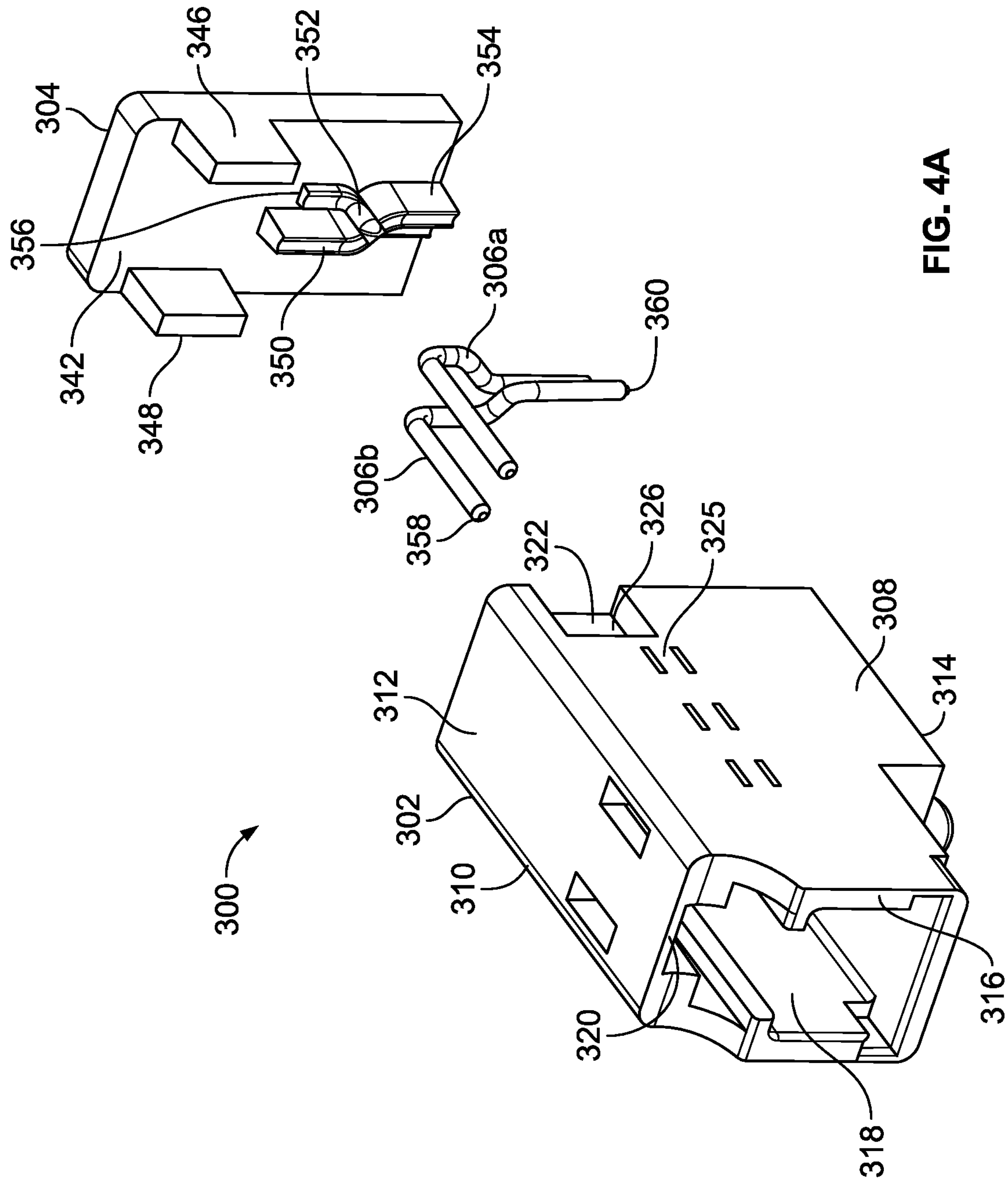
FIGS. 4A-4C provide a forward perspective view of an unassembled fixed connector, a rearward perspective view of the unassembled fixed connector, and a perspective view of an assembled fixed connector, respectively.
Figure 4B:
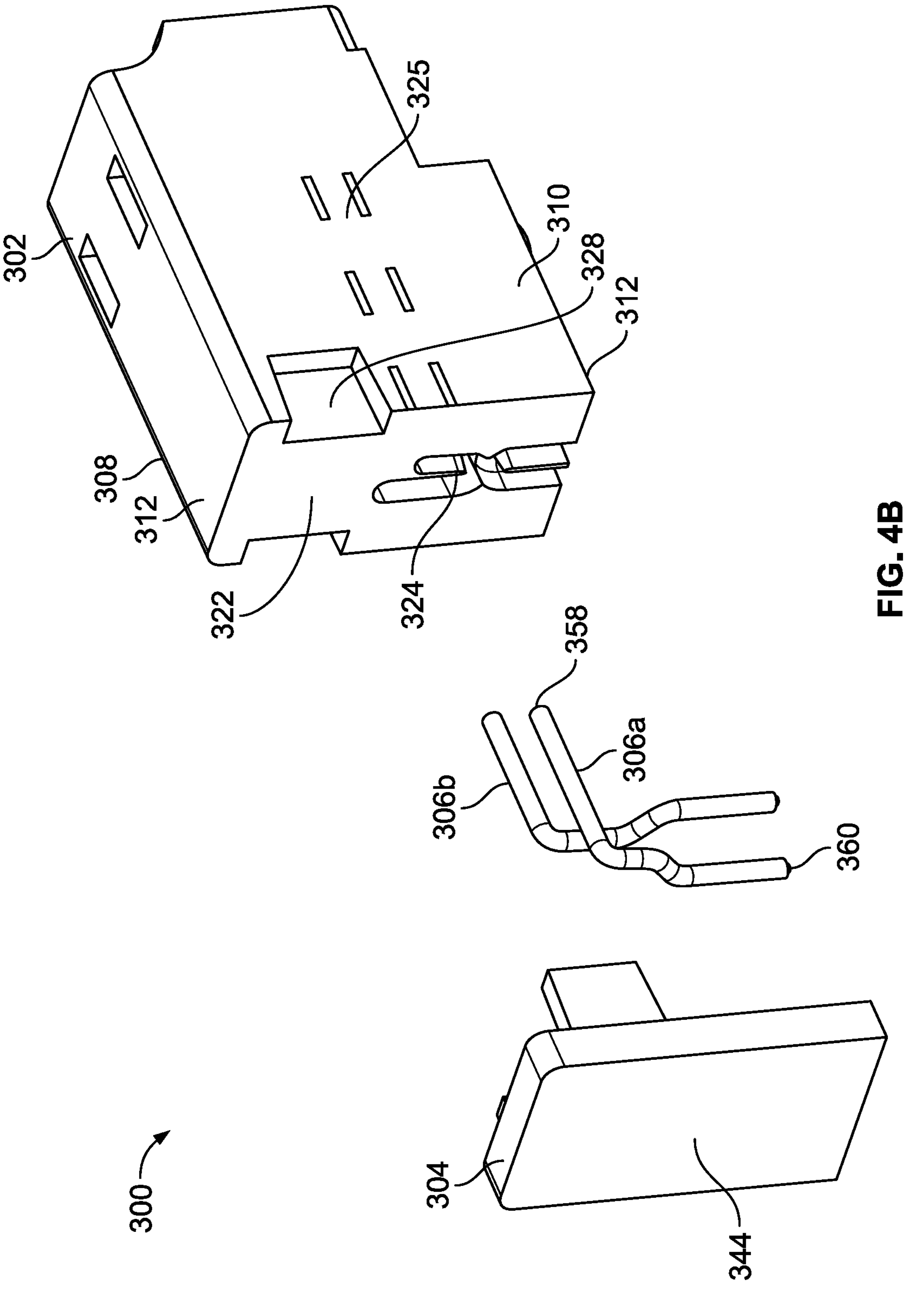
Figure 4C:
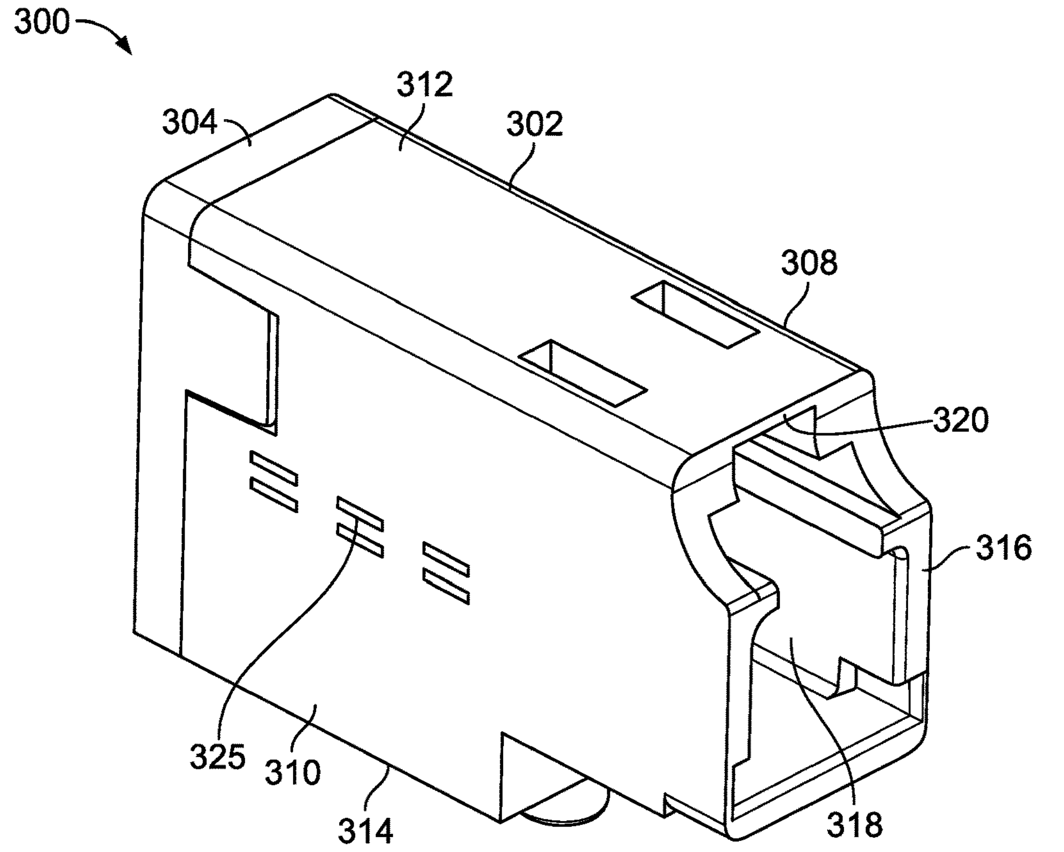

Referring to FIG. 3 an example of a simplex LC connector 200 and adapter 202, as well as a duplex LC connector 204 and adapter 206, are illustrated relative to a panel 208. A snap latch 210 is used to maintain the coupling of a connector to an adapter. The LC family of connectors, adapters and active device receptacles are generally known as small form factor connectors for use with optical fibers (1.25 mm ferrule) in high density applications, e.g., in-building communication systems. A front face 212 of a simplex LC connector is generally square having outer dimensions of 4.42 mm by 4.52 mm. The IEC (International Electrotechnical Commission) standard for an LC connector can be identified as IEC 61754-20; the noted IEC standard is hereby incorporated by reference.

Referring once again to FIGS. 2A and 2B, the free connector 100 generally includes a connector housing 102, a connector insert 104 and a pair of socket contacts 106*a*, 106*b*.

The connector housing 102 of the free connector 100 includes an elongate body portion 110 having first and second side walls 112, 114 connected by upper and lower walls 116, 118, respectively, to establish a square or substantially square forward face 120. The connector housing 102 further includes a rear portion 122 that extends rearward from the elongate body portion 110. The rear portion 122 has side walls 124, 126 connected by upper and lower walls 128, 130, respectively, to establish a square or substantially square rear face 132 of the connector housing 102. The outer dimensions of the rear portion 122 are reduced from the outer dimensions of the elongate body portion 110 to accommodate a rear cover 131 or boot to enclose the rear face 132 of the connector housing 102. In certain embodiments, the rear cover 131 includes a strain-relief feature. A central channel 134 of a consistent or varying cross-section extends through the connector housing 102 from the forward face 120 to the rear face 132. In instances, where the connector housing 102 is varying from the LC style connectors, the exterior and/or interior cross-sections of the connector housing 102 can assume a shape (e.g. round, oval, rectangular, triangular, hexagonal, etc.) that is different from a squared shape.

The connector housing 102 includes a snap latch 136 on the upper wall 116 of the elongate body portion 110. The snap latch 136 can be positioned proximate the forward face 120 of the connector housing 102 as illustrated or can be positioned further rearward along the upper wall 116 as appropriate to enable a releasable interface or coupling with a corresponding fixed connector or adapter, described below. In certain example embodiments, at least one of the side walls 112, 114 includes a cantilevered latch 138 that interfaces with the connector insert 104 to retain the connector insert 104 within the central channel 134 when inserted therein.

In certain example embodiments, the connector housing 102 includes a keying feature that is provided within the central channel 134 to ensure that the connector insert 104 is inserted into the connector housing 102 in a correct orientation. In the example embodiment of FIGS. 2A and 2B, the keying feature comprises a chamfer 140 that extends along a lengthwise portion, or the entire length, of a lower corner of the central channel 134; a complementary keying feature is provided on the connector insert 104, described below.

In certain example embodiments, the connector housing 102 includes a stop feature to help ensure proper forward positioning and/or prevent over-insertion of the connector insert 104. In the example embodiment of FIGS. 2A and 2B, the stop feature includes a solid triangular portion 142 that interfaces with a stop feature of the connector insert 104, described below. The connector housing 102 may be of a unitary configuration and can be manufactured through an appropriate molding process, e.g. insert molding. Other keying and/or stop features may be used without departing from the spirit or scope of the disclosure.

The connector insert 104 includes a body portion 144 having first and second side walls 146, 148 connected by upper and lower walls, 150, 152, respectively. A forward face 154 of the body portion 144 includes two apertures 156, 158 behind which extend first and second channels 160, 162, respectively. The first and second channels 160, 162 extend from the forward face 154 out through a rear face 164. The body portion 144 is configured to be received within the central channel 134 of the connector housing 102 such that the forward face 154 of the body portion 144 is proximate the forward face 120 of the connector housing. In certain examples, when inserted into the connector housing 102, the entirety of the connector insert 104 is maintained within the elongate body portion 110 of the connector housing 102.

In certain examples, each of the first and second channels 160, 162 of the connector insert 104 includes one or more bosses 166 and a lip edge 168 proximate the rear face 164. When the socket contacts 106*a*, 106*b* are inserted in their respective first and second channels 160, 162, each boss 166 operates to position the socket contacts 106*a*, 106*b*, so as to be axially aligned with the apertures 156, 158 of the forward face 154. The boss 166 also operates to establish an interference fit between the socket contacts 106*a*, 106*b* and their respective first and channels 160, 162 to help maintain the socket contacts 106*a*, 106*b* within the first and second channels. The lip edge 168 also aids in positioning each socket contact 106*a*, 106*b*, so as to place each socket contact 106*a*, 106*b* forward most in their respective first and second channels 160, 162 proximate the forward face 154 of the connector insert 104, and to prevent the socket contacts 106*a*, 106*b*, from being pulled rearward out of their respective first and second channels 160, 162 and out of the connector insert 104 itself. Other features and/or elements can also, or alternatively, be used to retain the socket contacts 106*a*, 106*b* within the first and second channels 160, 162 without departing from the spirit of the disclosure.

In certain examples, the apertures 156, 158 and respective first and second channels 160, 162 are stacked vertically or positioned side-by-side horizontally. However, in order to minimize the crosstalk between adjacent contact pairs when a plurality of connectors 100 are deployed near one another, in certain examples, the apertures 156, 158 and respective first and second channels 160, 162 are provided in an offset configuration (see FIGS. 2A and 2B) so as to present the inserted socket contacts 106*a*, 106*b* in a cross-talk neutralizing position relative to the other connectors (e.g. minimize or prevent cross-talk from adjacent connectors to the socket contacts 106*a*, 106*b*).

In certain examples, at least one of the side walls 146, 148 of the connector insert 104 includes a ramped tab 170 that protrudes outwardly therefrom. When inserting the connector insert 104 within the connector housing 102, the ramped tab 170 allows the connector insert 104 to pass the cantilevered latch 138 of the connector housing 102 for full insertion and subsequently engages the cantilevered latch 138 preventing rearward movement or removal of the connector insert 104 from the connector housing 102. Other features and/or elements can also, or alternatively, be used to retain the connector insert 104 within the connector housing 102 without departing from the spirit or scope of the disclosure.

In certain examples, the connector insert 104 includes a keying feature that is configured to interface with the keying feature of the connector housing 102. In the example of FIGS. 2A and 2B, the keying feature comprises a chamfer 172 configured to interface with the chamfer 140 of the connector housing 102. The chamfer 172 can extend along a portion of the connector insert 104 or along a full length of the connector insert 104. The keying feature ensures proper orientation of the connector insert 104 within the connector housing 102.

In certain examples, the connector insert 104 includes a stop feature. In the example of FIGS. 2A and 2B, the stop feature comprises a boss 174 recessed from the forward face 154 of the connector insert 104 and configured to interface with the stop feature of the connector housing 102, e.g., the solid triangular portion 142. The recession of the boss 174 from the forward face 154 enables the forward face 154 of the connector insert 104 to be positioned flush with the stop feature, e.g., the solid triangular portion 142, of the connector housing 102 thereby presenting the combined forward face 154 of the connector insert 104 and the stop feature of the connector housing 102 as a generally unified planar surface. The connector insert 104 may be of a unitary configuration and can be manufactured through an appropriate molding process, e.g. insert molding. Other keying and/or stop features may be used without departing from the spirit or scope of the disclosure.

Each of the socket contacts 106*a*, 106*b* includes a tip contact 176 and a ring contact 178. Each socket contact 106*a*, 106*b* comprises a hollow cylinder having a rear end 180 and a forward end 182. An internal diameter 184 of the rear end 180 of each socket contact 106*a*, 106*b*, can be sized to receive a respective one of the conductors 12, 14 (or 22, 24, or 26, 28, see FIG. 1) of the twisted pair 16 (or 30 or 32, see FIG. 1) extending from the cable 18 (or 36, see FIG. 1). In certain embodiments, the internal diameter 184 is such that an interference fit between conductor 12, 14 and socket contact 106*a*, 106*b* is established to provide a good mechanical and electrical connection. In certain embodiments, the rear end 180 of the socket contacts 106*a*, 106*b* are crimped onto the conductors 12, 14. In certain embodiments, the conductors 12, 14 are soldered to the socket contacts 106*a*, 106*b*. The twist of the twisted pair 16 can be maintained up to the point of the conductors 12, 14 being coupled to the socket contacts 106*a*, 106*b*; the ability to maintain the twist in the conductors 12, 14 helps to minimize or prevent cross-talk from adjacent connectors to the socket contacts 106*a*, 106*b* improving operation of the connector 100. The forward end 182 of each socket contact 106*a*, 106*b* is sized to receive the pin contacts or conductors of a mating connector, e.g. fixed connector 300 described below; and can include one or more longitudinal slits 186.

The free connectors 100 can be configured in a simplex form or combined in a duplex form similar to that available with LC fiber optic connectors (see FIG. 1); forms including more than two free connectors 100 are also possible.

FIGS. 4A-4C and FIG. 5 illustrate example embodiments of fixed connectors 300 that are configured to interface with the free connectors 100. In certain embodiments, the fixed connector 300 is in the style of an LC connector that is used with optical fibers. In certain embodiments, the fixed connector 300 can adopt the LC connector footprint, e.g. the shape and size of the LC connector (e.g. the LC adapter or LC active device receptacle). In certain embodiments, the fixed connector 300 is of the LC style but in a larger or smaller footprint than LC connector. In certain embodiments, the fixed connector 300 varies in other dimensions and/or features from the LC connector style and/or footprint.

The fixed connector 300 is a two-piece component comprising a body portion 302 and a rear panel 304; the rear panel 304 enables placement of pin conductors 306*a*, 306*b* within the body portion 302.

The body portion 302 includes first and second side walls 308, 310 connected by upper and lower walls 312, 314. The first and second side walls 308, 310, and the upper and lower walls 312, 314 frame an open forward portion 316 that presents a port 318 within the body portion 302 that is configured to receive the free connector 100. A notch 320 proximate the upper wall 312 is configured to interface with the snap latch 136 to removably retain the free connector 100. A rear plate 322 of the body portion 302 fills that gap between walls 308, 310, 312, 314 save for a pin cavity 324 and pin channels 325 extending therefrom. The pin channels 325 are configured to receive the pin conductors 306*a*, 306*b* while the pin cavity 324 is configured to house the portion of the pin conductors 306*a*, 306*b* not within the pin channels and to interface with the rear panel 304. First and second notches 326, 328 extend through first and second side walls 308, 310, respectively, to the rear plate 322 and are configured to interface with the rear panel 304.

Figure 5:
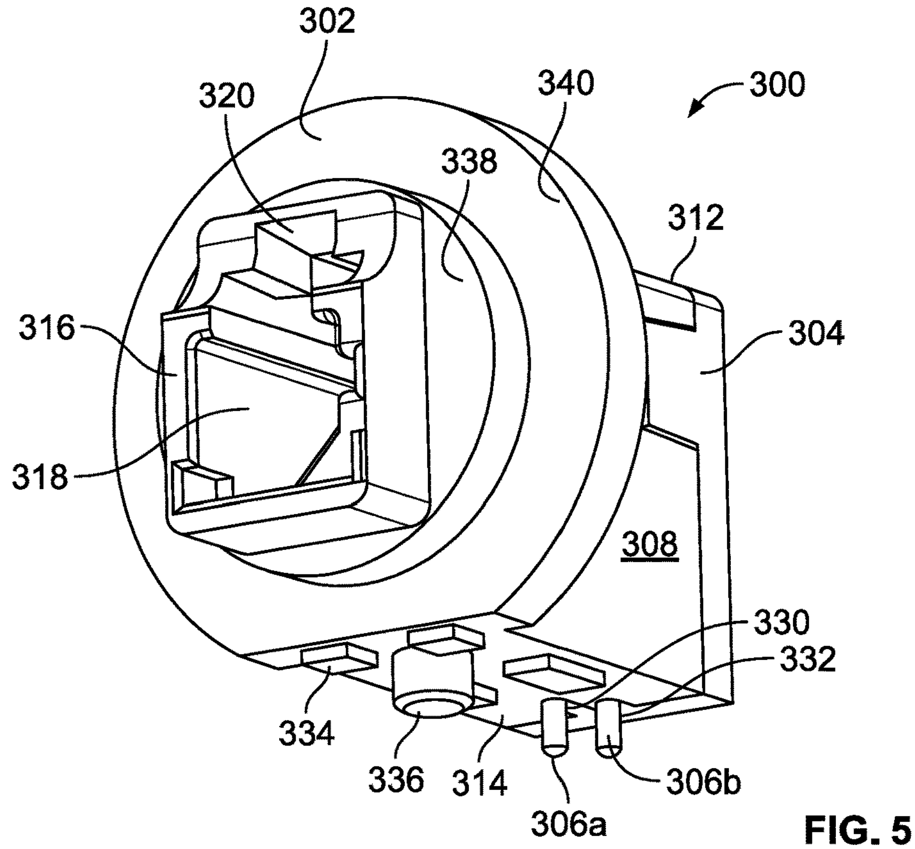
FIG. 5 is a perspective view of an assembled fixed connector with a bulkhead mounting feature.

Referring to FIG. 5, the lower wall 314 of the body portion 302 includes first and second openings 330, 332 through which the pin conductors 306*a*, 306*b* extend when the fixed connector 300 is assembled. One or more stabilizing pads 334 and/or mounting features 336 can also be provided on the lower wall 314 enabling the mounting of the fixed connector 300 and the electrical coupling of the pin conductors 306*a* 306*b* to a circuit board or other circuit structure. FIG. 5 further illustrates that the body portion 302 of the fixed connector can include one or more flanges, e.g. first flange 338 and second flange 340 proximate the open forward portion 316. The flanges 338, 340 are for bulkhead mounting.

The rear panel 304 includes a forward face 342 and a planar rear face 344. The forward face 342 is provided with a pair of forward extending tabs 346, 348 that are configured to interface with the first and second notches 326, 328 to fixedly, or removably, secure the rear panel 304 to the body portion 302 through an interference fit. In certain embodiments, a latching mechanism can be used additionally or alternatively to the interference fit to secure the rear panel 304. The forward face 342 is further provided with a forward extending upper stabilizer 350 curving toward a central location 352 and a forward extending lower stabilizer 354 curving toward the same central location 352. A pin stabilizer 356 is provided to either side of the upper stabilizer 350.

The pin conductors 306*a*, 306*b* each include a first end 358 and a second end 360. Each pin conductor 306*a*, 306*b* is bent to approximate a right angle between the first and second ends 358, 360 so that the first end 358 extends through the rear plate 322 and into the port 318. While within the port 318, the first ends 358 are to be received in the forward end 182 of the socket contacts 106*a*, 106*b* to make an electrical connection therewith when the free connector 100 is inserted into the port 318. The second end 360 of each of the pin conductors 306*a*, 306*b* extends through the lower wall 314. The first ends 358 of the pin conductors 306*a*, 306*b* are arranged to be offset from one another consistent with the offset of the socket contacts 106*a*, 106*b* while that second ends 360 of the pin conductors 306*a*, 306*b* are crossed proximate the right angle bend; the offset and crossing of the pin conductors 306*a*, 306*b* helps to minimize, or prevent, cross-talk between the pin conductors 306*a*, 306*b* and the pin conductors of vertically or horizontally proximate like connectors. In certain embodiments, the pin conductors 306*a*, 306*b* can be stacked horizontally or vertically to correspond to a placement of the socket contacts 106*a*, 106*b*. In certain embodiments, the pin conductors 306*a*, 306*b* are of equivalent lengths while in other embodiments the pin conductors 306*a*, 306*b* are of differing lengths.

Additional information about pin conductors and their positioning to minimize, or prevent, cross-talk can be found in U.S. Pat. No. 9,407,043 entitled "Balanced Pin and Socket Connectors" and U.S. Pat. No. 9,590,339 entitled "High Data Rate Connectors and Cable Assemblies that are Suitable for Harsh Environments and Related Methods and Systems." Each of the noted patents is hereby incorporated by reference.

When assembling the fixed connector 300, the first ends 358 of each of the pin conductors 306*a*, 306*b* are inserted into pin cavity 324, and corresponding pin channels 325, in their offset positions; a divider 362, which comprises a portion of the rear plate 322, separates the second ends 360 of the pin conductors 306*a*, 306*b* within the pin cavity 324. The rear panel 304 is then secured to the body portion 302 of the fixed connector 300. The second ends 360 of the pin conductors 306*a*, 306*b* pass through the central location 352 at the rear panel 304 where the upper and lower stabilizers 350, 354 help maintain/fix the position of the pin conductors 306*a*, 306*b* relative to the body portion 302; the upper and lower stabilizers 350, 354 are received within the pin cavity 324. In certain embodiments, an interference fit occurs between the upper and lower stabilizers 350, 354 and the pin cavity 324 to assist in securing the rear panel 304 to the body portion 302 of the fixed connector 300. The pin stabilizers 356 press against each of the pin conductors 306*a*, 306*b* to ensure that they are fully, forwardly positioned within the pin channels of the fixed connector 300 as well as to maintain/fix their position.

The fixed connectors 300 can be configured in a simplex form or combined in a duplex form similar to that available with LC fiber optic connectors (see FIG. 1); forms including more than two fixed connectors 300 are also possible.

Figure 6:
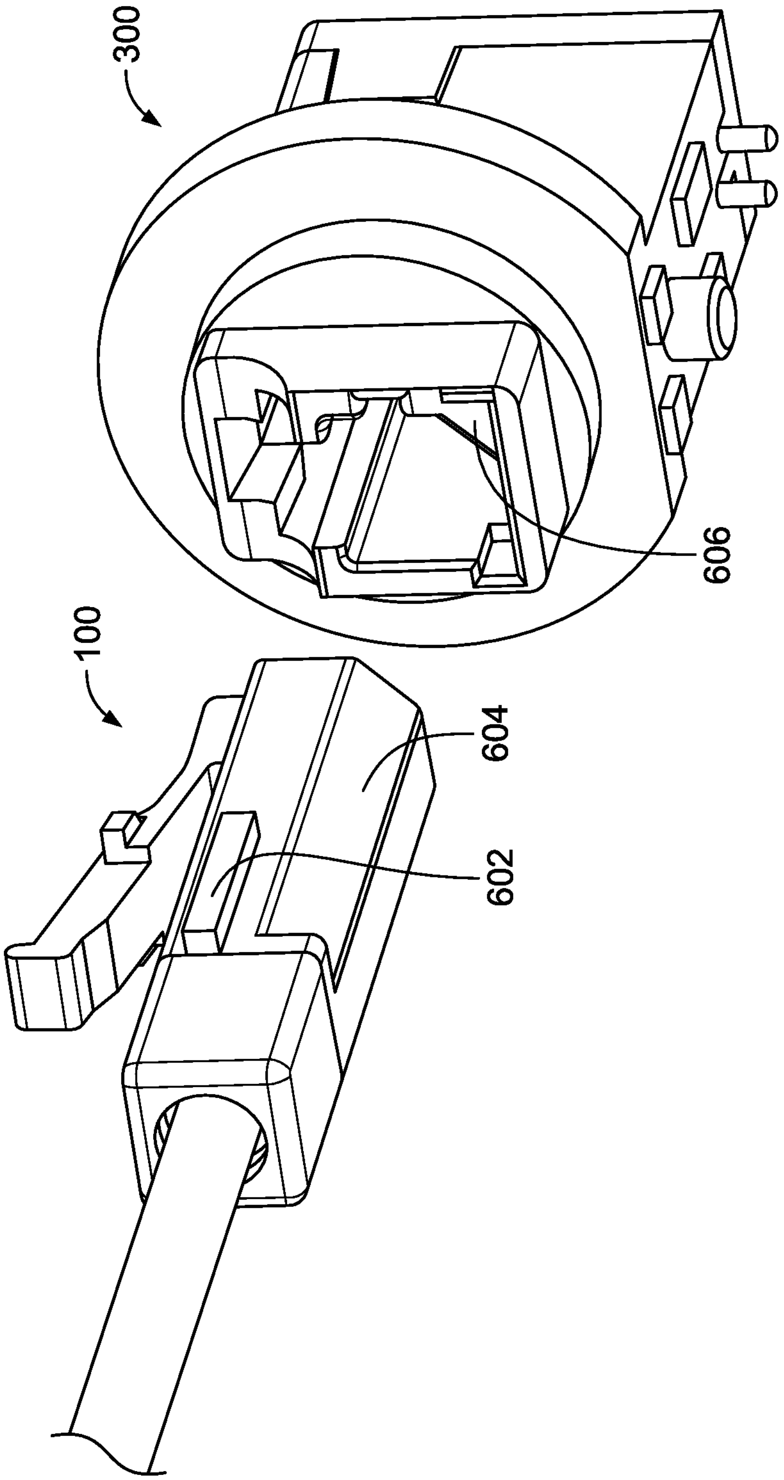
FIG. 6 is a perspective view of an assembled free connector and an assembled fixed connector.

In certain embodiments, when the free connector 100 and/or fixed connector 300 are configured in the LC style and/or footprint, one or both of the connectors 100, 300 can be provided with a blocking/keying feature, to prevent the insertion of the free connector 100 into an actual LC fiber optic adapter or LC fiber optic active device receptacle and/or to prevent an actual LC fiber optic connector from being inserted into the fixed connector 300. In the example of FIG. 6, the free connector 100 is provided with a blocking/keying feature in the form of rectangular protuberance 602 extending outward from the connector housing 102; the protuberance 602 will prevent insertion of the of the free connector 100 into LC fiber optic adapter or LC fiber optic active device receptacle. Further, in the example of FIG. 6, the free connector 100 includes a chamfer 604 along a portion of a corner of the connector housing 102 that is accommodated by a blocking/keying feature in the form of a triangular panel 606 in a corner of the port 318. The triangular panel 606 of the fixed connector 300 allows the free connector 100 to enter the port 318; however, the squared housing configuration of an LC fiber optic connector will be blocked from entering the port 318 of the fixed connector 300.

Figure 7:
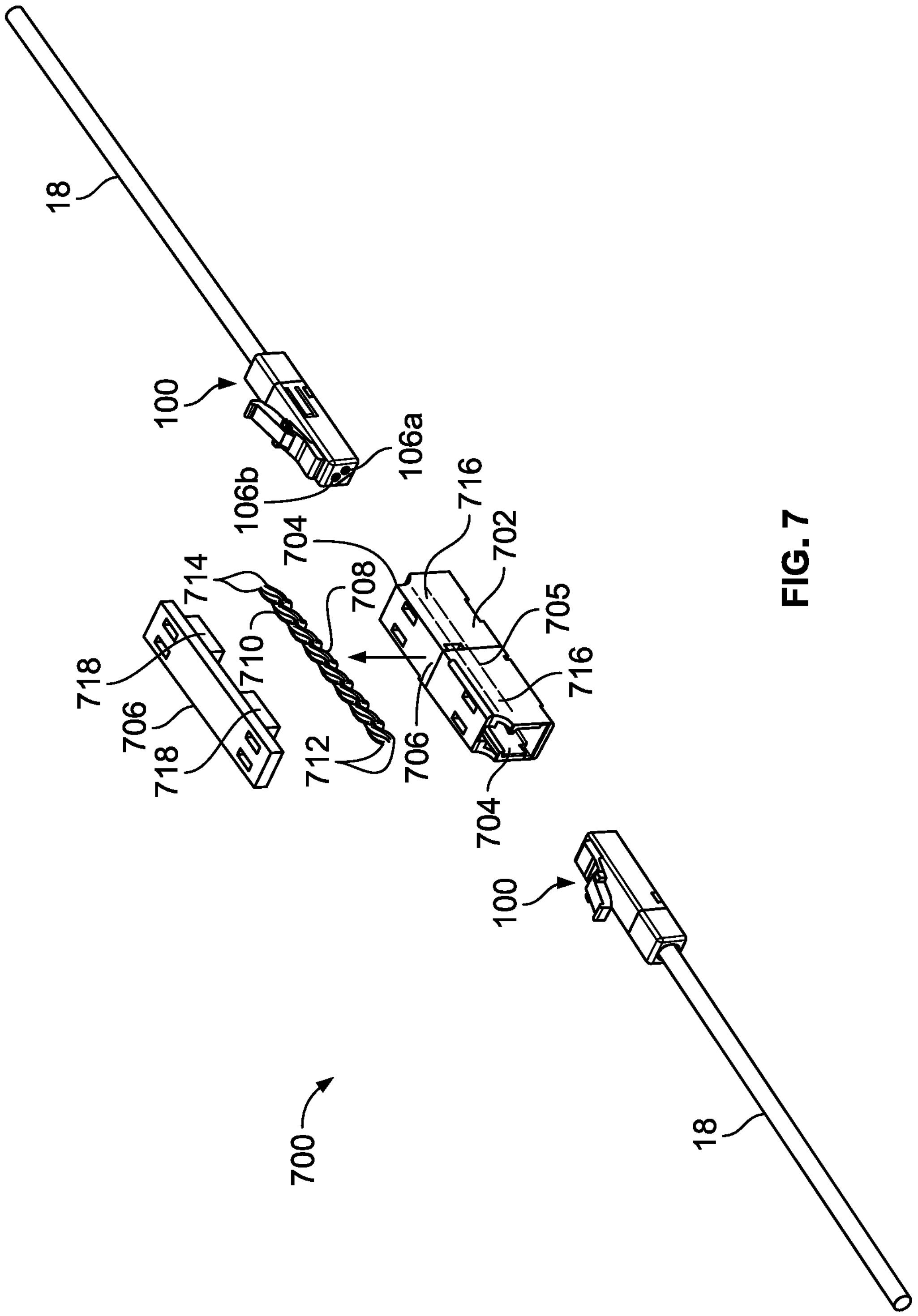
FIG. 7 is a perspective view of an adapter and a pair of cables that have each been connectorized with a free connector.

FIG. 7 illustrates a single twisted pair adapter 700. The adapter 700 is configured to enable an in-line connection between a first free connector 100*a* and a second free connector 100*b*. For example, simplex and/or duplex adapters 700 can be used in wall plate application (similar to standard electrical wall outlet) or a plurality of adapters 700 can be used in a bulkhead configuration for high density applications.

The adapter 700 generally comprises a pair of fixed connectors 300 that are modified to be electrically and mechanically coupled to one another rather than being individually coupled to a circuit board. In certain embodiments, the adapter 700 comprises a two-piece component having a continuous body portion 702 that defines two ports 704 and an upper (or lower) panel 706 that is configured for coupling to the body portion 702. The body portion 702 defines an upper (or lower) channel 705 into which can be placed a single twisted pair of conductors 708, 710 where each has a pin contact first end 712 and a pin contact second end 714 that can be inserted into corresponding pin channels 716 formed in the body portion 702. The upper panel 706 can be configured with various outward extending stabilizing features to help position and/or maintain the position of the pin contacts 712, 714 in an offset orientation corresponding to the socket contacts 106*a*, 106*b* of the free connector 100 that will be received in each of the ports 704. The upper panel 706 can include outward extending tabs 718 or other type of mechanism for coupling the upper panel 706 to the body portion 702.

Figure 8A:
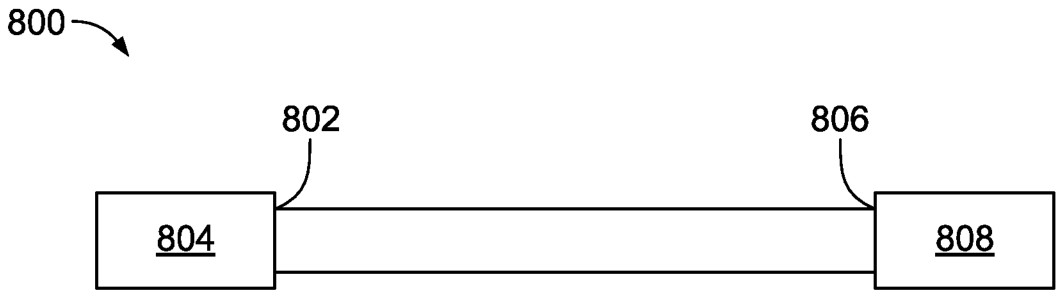
FIGS. 8A-8C illustrate examples of patch cords that can be configured utilizing free connector and modified connectors.
Figure 8B:
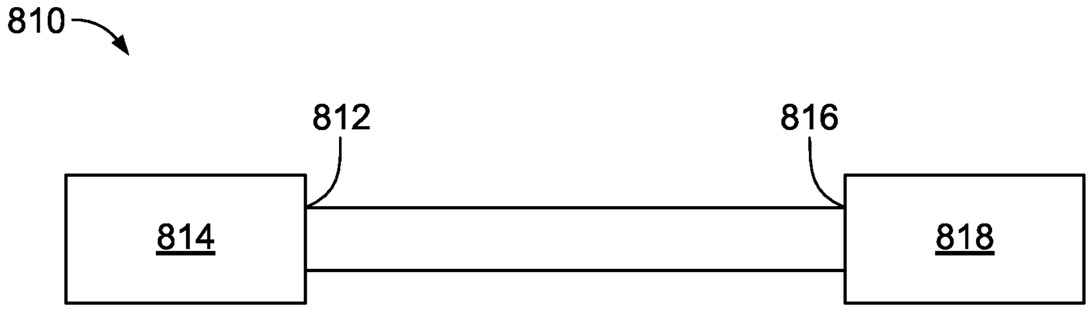
Figure 8C:

FIGS. 8A-8C illustrate various patch cord configurations that can be manufactured using the free connector 100 and a modified fixed connector 300. In the patch cord examples, the fixed connector 300 is configured for coupling with a cable having a single twisted pair of conductors rather than being configured for coupling to a circuit board. As shown, a patch cord 800 includes a first end 802 with a first free connector 804 and a second end 806 with a second free connector 808, see FIG. 8A. FIG. 8B illustrates a patch cord 810 having a first end 812 with a first free connector 814 and a second end 816 with a first fixed connector 818. FIG. 8C illustrates a patch cord 820 having a first end 822 with a first fixed connector 824 and a second end 826 with a second fixed connector 828.

Figure 9D:
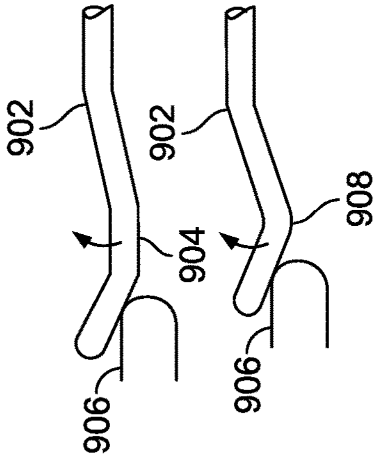
FIGS. 9A-9E illustrate example configurations of socket contacts incorporating a socket spring configuration.
Figure 9E:
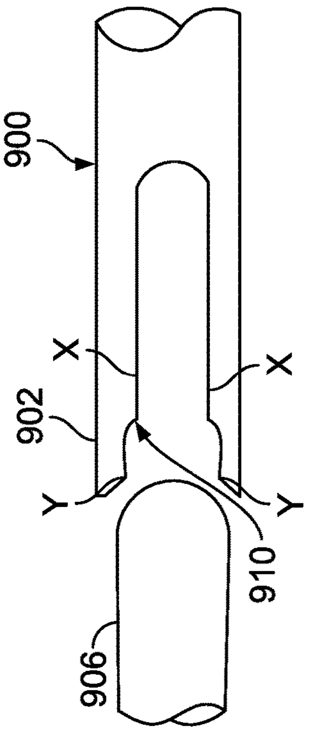
Figure 9A:
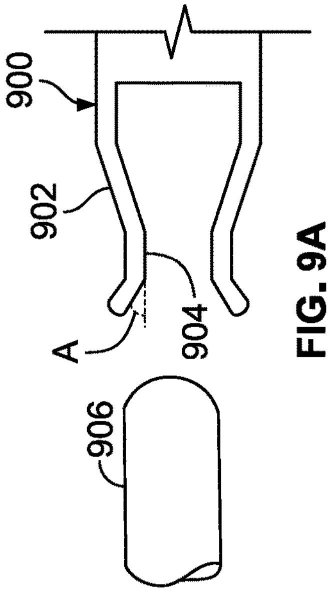
Figure 9B:
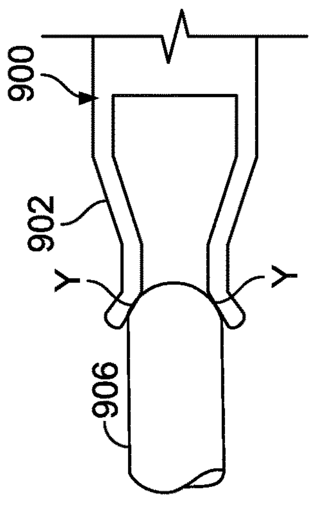
Figure 9C:
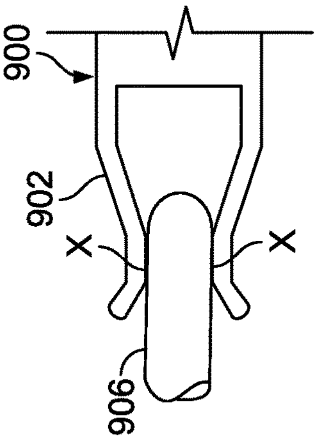

FIGS. 9A-9E illustrate various example embodiments of a socket contact 900 that can be used in the various configurations/embodiments described herein, for example, in place of socket 106*a*, 106*b*. As shown in FIGS. 9A-9C, a forward end 902 of the socket contact 900 includes a socket spring configuration that has a leading entry angle, e.g. angle A, and a flat transition 904 such that when a pin 906 is fully mated with the socket contact 900 the final contact point X is in a different location as the insertion/withdrawal point of contact Y. A rearward portion, now shown, of the contact 900 can include a ring contact (e.g., see ring 178 of socket contact 106*a* in FIG. 2A) or other appropriate contact configuration. In certain embodiments, the flat transition 904 is replaced with a rounded transition 908, see FIG. 9D. In certain embodiments, see FIG. 9E, the socket contact 900 is provided with a socket spring configuration wherein the forward end 902 is provided with a stepped surface 910 such that the final mated contact point X of the pin contact 906 is a in a different location as the insertion/withdrawal point Y of the pin contact 906.

Figure 10A:
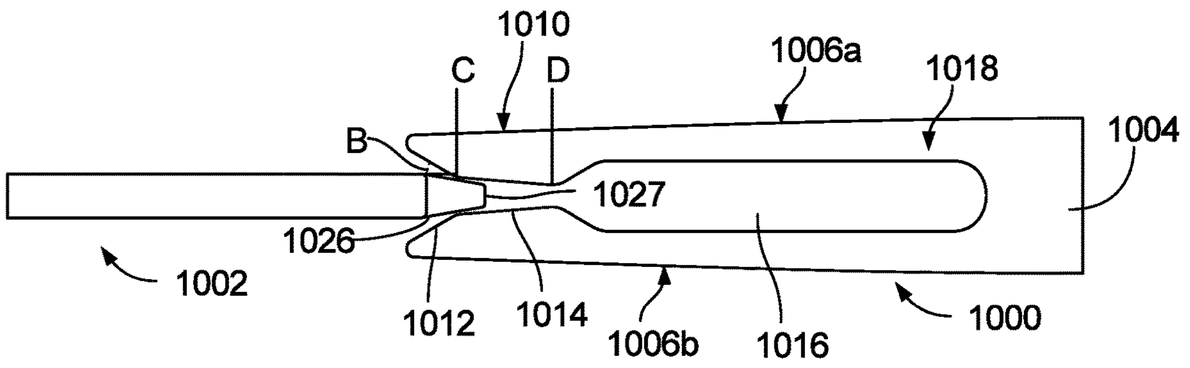
FIGS. 10A-10B are a side view and a perspective view, respectively, illustrating mating contacts including a pin contact and tuning fork receptacle contact.
Figure 10B:
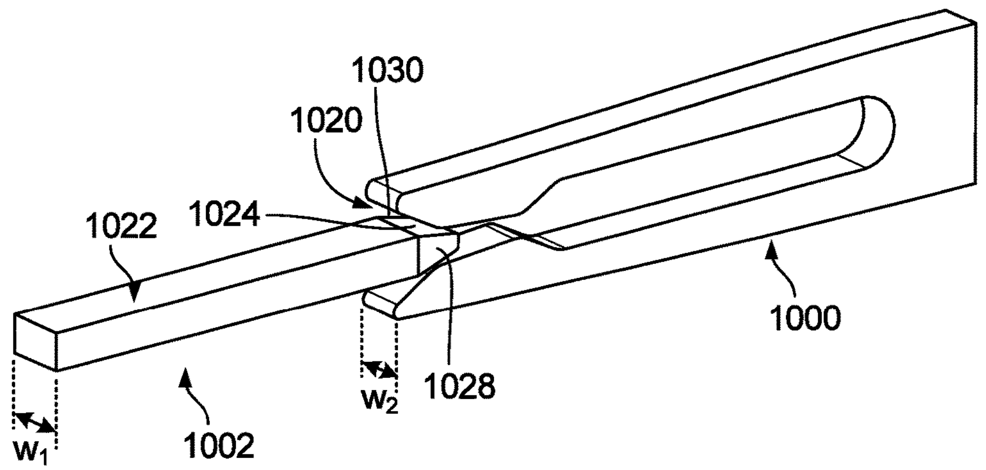

FIGS. 10A-10B illustrate various example embodiments of pin contacts and mating tuning fork receptacle contacts that can be used in the various configurations/embodiments described herein. In certain embodiments, the pin contacts and tuning fork receptacle contacts are of the same or similar conductive material while in other embodiments the pin contacts and tuning fork receptacles are different conductive materials. For example, tuning fork receptacle contact 1000 can be used in place of sockets 106*a*, 106*b* while pin contact 1002 can be used in place of pin conductors 306*a*, and 306*b*. As shown in FIGS. 10A-10B, the tuning fork receptacle contact 1000 includes a rear portion 1004 connecting first and second spring arms 1006*a*, 1006*b*. Each of the spring arms 1006*a*, 1006*b* includes a forward end 1010 having an entry portion 1012 that has a leading entry angle, e.g. angle B, and a tapering transition portion 1014 from the entry portion 1012 at a point C to a point D. Beyond point D, the forward end 1010 tapers to an open channel 1016 within a central portion 1018 of the tuning fork receptacle contact 1000. Two tuning fork receptacle contacts 1000 are used in the various connector embodiments described herein, wherein each of the tuning fork receptacle contacts 1000 can be electrically coupled to a conductor, e.g., conductors 10, 12, in any suitable manner. In certain embodiments, the The pin contact 1002 includes a forward portion 1020 and a rear portion 1022 that can be electrically coupled to a conductor, e.g. conductor 10, in any suitable manner. The forward portion 1020 includes a first tapered face 1024 and a second tapered face 1026 opposite the first tapered face 1024. The forward portion 1020 further includes first and second tapered sides 1028, 1030 that connect the first tapered face 1024 and second tapered face 1026 to form a four-sided pyramid shape with a flattened apex 1027; the flattened apex 1027 having a rectangular or square cross-section; however other pin geometries, e.g., round, triangular, etc., are possible. In certain examples, the first and second sides tapered sides 1028, 1030 have bases that are narrower or wider than the bases of the first and second tapered faces 1024, 1026 thereby providing the rear portion 1022 of the pin contact 1002 with a rectangular cross-section while in other examples all sides and faces have equivalent bases providing the rear portion 1022 of the pin contact 1002 with a substantially square cross-section. A rectangular or square cross-section provides the rear portion 1022 of the pin contact 1002 a broader surface to make contact with the tuning fork receptacle contact 1000 should either the pin contact 1002 or the tuning fork receptacle contact 1000 become bent or warped in some way that might alter their original alignment; note that in certain embodiments a width $w_1$ of the pin contact 1002 is wider than a width $w_2$ of each respective spring arm 1006*a*, 1006*b*. Two pin contacts 1002 are used in the various connector embodiments describe herein.

Figure 11A:
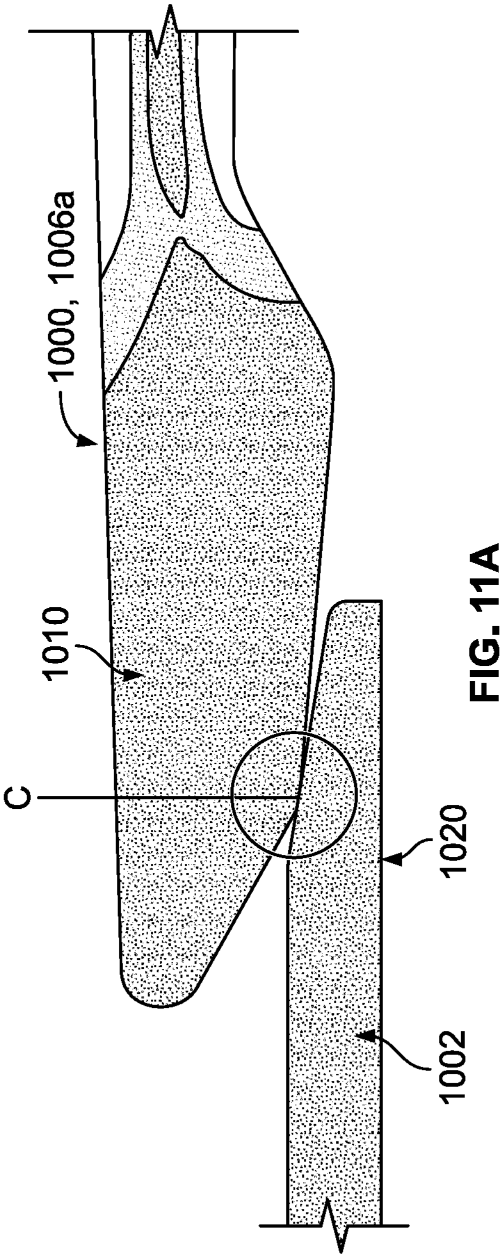
FIGS. 11A-11H illustrate various side views of the pin contact and tuning fork receptacle contact of FIGS. 10A-10B.
Figure 11B:
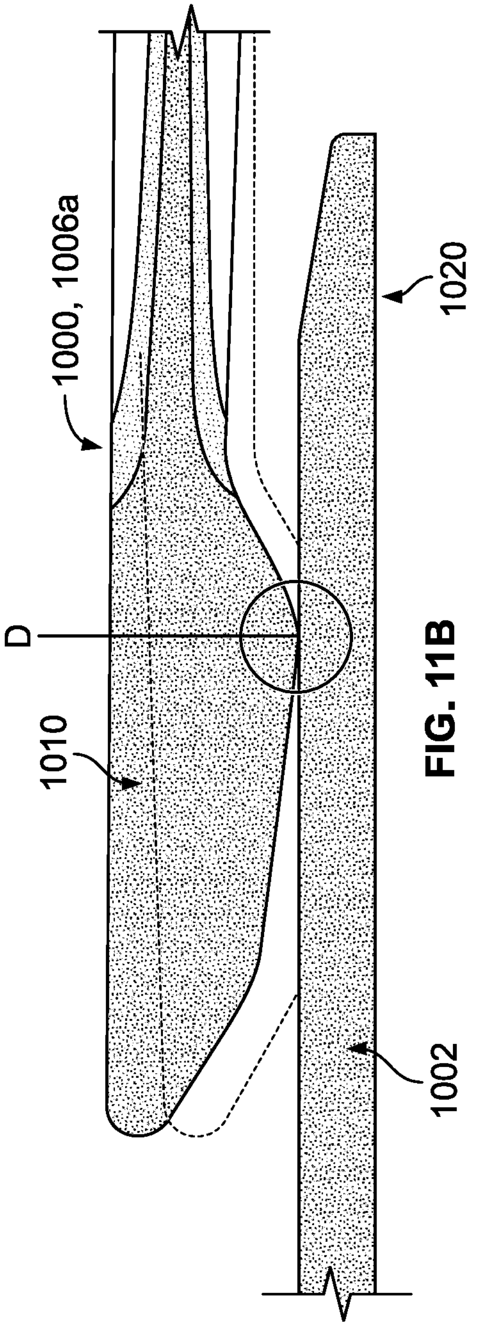
Figure 11C:
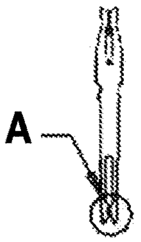
Figure 11C:
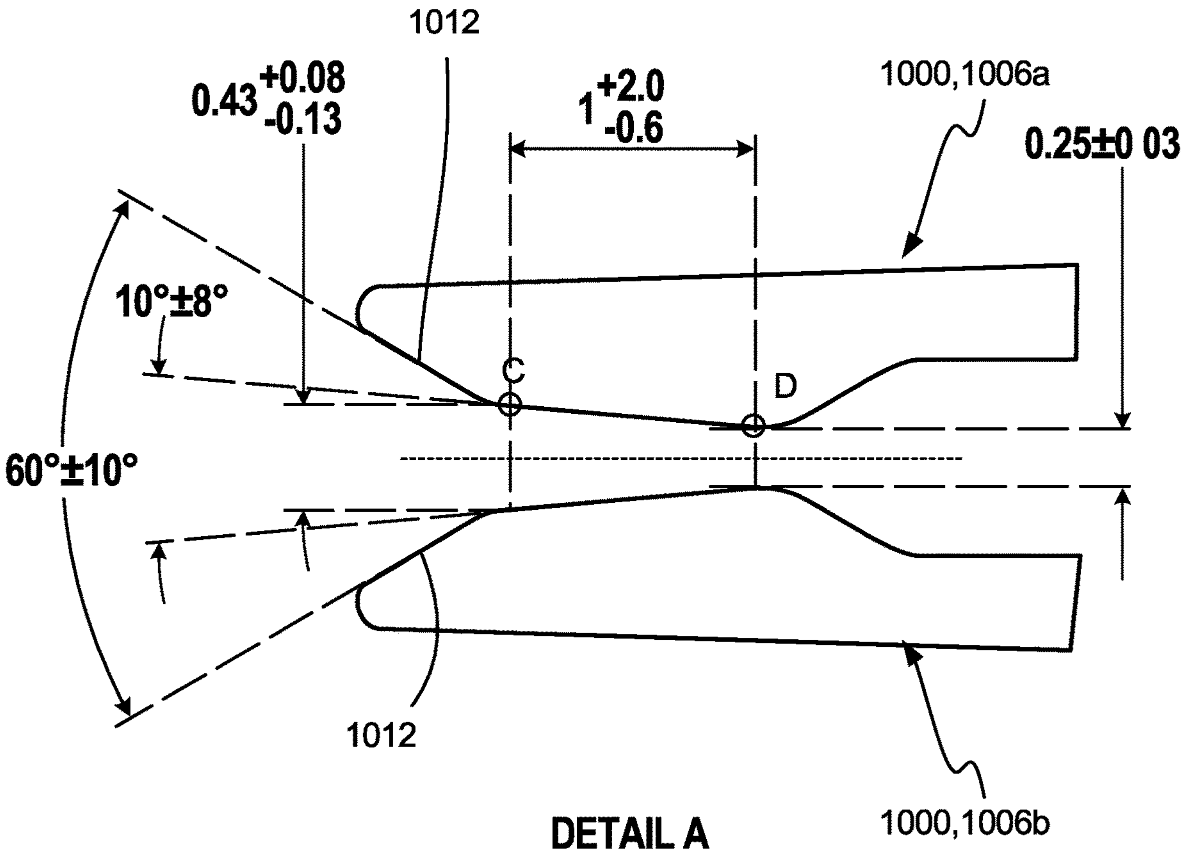

Referring to FIGS. 11A and 11B, the position of the forward portion 1020 of the pin contact 1002 is shown relative to the forward end 1010 of the spring arm 1006*a* of the tuning fork receptacle contact 1000. As illustrated, the tapered surfaces of the tuning fork receptacle connector 1000 and the pin contact 1002 are designed such that the tuning fork receptacle contact 1000 is provided with two contact zones, e.g. a disengagement zone where the forward portion 1020 of the pin contact 1002 is in contact with point C of the tuning fork receptacle contact 1000 as illustrated in FIG. 11A and a fully engaged zone where the rear portion 1022 of the pin contact 1002 is in contact with the tuning fork receptacle contact 1000 at point D as illustrated in FIG. 11B. While the first and second spring arms 1006*a*, 1006*b* are illustrated as having aligned contact points C and D, in other embodiments the contact points C and D on the first spring arm 1006*a* can be offset from the contact points C and D on the second spring arm 1006*b*. The two contact zones, and particularly, the disengagement zone, help to protect against an arcing "spark" that can occur when the plug, e.g., the pin contact 1002, is inserted/removed from the receptacle, e.g. the tuning fork receptacle contact 1000; the disengagement zone enables an arc to occur prior to full insertion of the pin contact 1002 such that the final contact point, e.g. point D, which is vital for transmission of data, is not damaged. Arcing, if not addressed within the contact design, can cause damage to the contact and prevent data transmission through the plug and receptacle. FIG. 11C provides a side dimensioned view of the forward end 1010 of each of the spring arms 1006*a*, 1006*b*, with dimensions in mm and angles in degrees. As shown, the entry portions 1012 the spring arms 1006*a*, 1006*b* are present an opening separated by approximately 60°±10° that narrows to an opening of approximately 10°±8° whereby a distance between the spring arms, contact point C of the disengagement zone is approximately 0.43 mm 0.08 mm to 0.43 mm±0.13 mm. A distance between contact point C and contact point D is approximately 1.0 mm±0.6 mm to 1.0 mm±2.0 mm. A contact point D of the fully engaged zone the spring arms 1006*a*, 1006*b* are separated by distance of approximately 0.25 mm±0.03 mm.

Figures 11D, 11E, 11F, 11G, 11H:
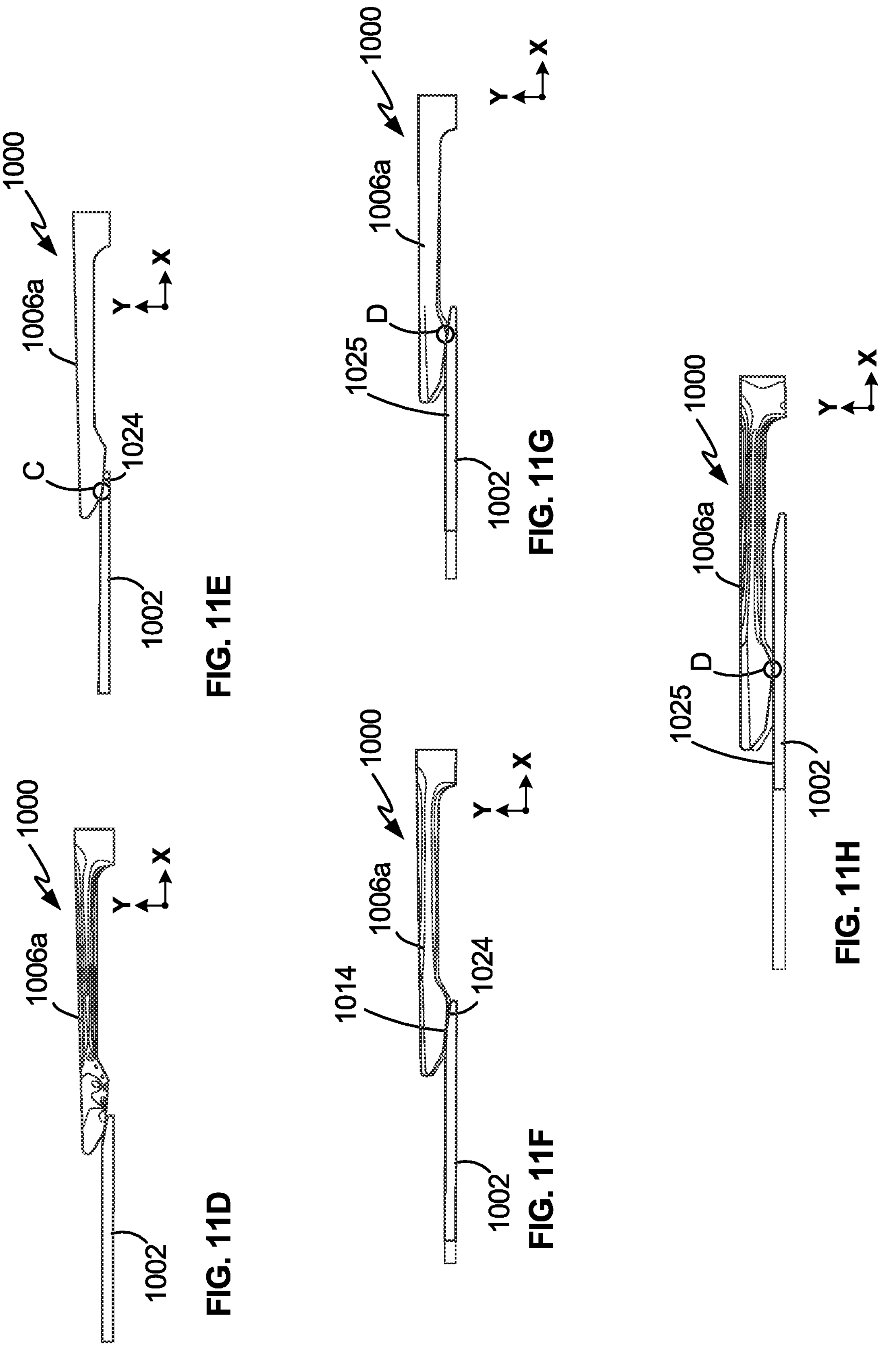

FIGS. 11D-11H illustrate the deflections of spring arm 1006*a* (with corresponding motions by spring arm 1006*a* not shown) as pin contact 1002 in inserted into the tuning fork receptacle contact 1000. FIG. 11D illustrates the pin contact 1002 prior to contact with the tuning fork receptacle contact 1000. FIG. 11E illustrates the pin contact 1002 as it makes initial contact with the tuning fork receptacle contact 1000 at contact point C in the disengagement; notably the initial contact occurs on tapered face 1024 of the pin contact 1002. FIG. 11F illustrates the pin contact 1002 as it moves past initial contact point C with the spring arm 1006*a* with the tapering transition portion 1014 of spring arm 1006*a* moving along the tapered face 1024 of the pin contact 1002. FIG. 11G illustrates the pin contact 1002 reaching contact point D of the fully engaged zone wherein contact point D on the spring arm 1006*a* rides on the planar upper surface 1025 of the pin contact 1002. FIG. 11H illustrates the pin contact 1002 fully inserted within the tuning fork receptacle contact 1000 with a single contact point maintained between the pin contact 1002 and the spring arm 1006*a* at contact point D.

Figure 13:
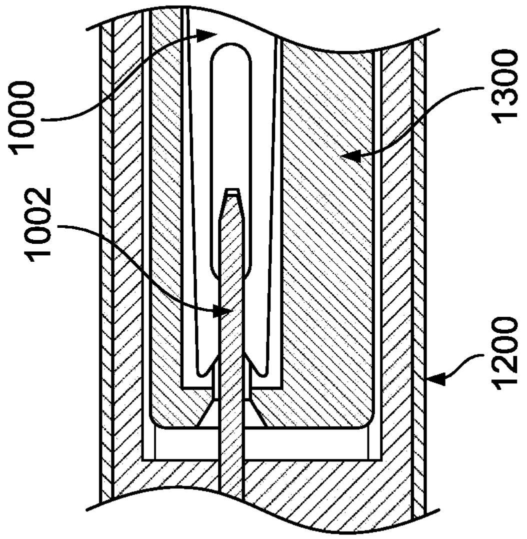
FIG. 13 is a cross-sectional taken along line A-A of FIG. 12.
Figure 12:
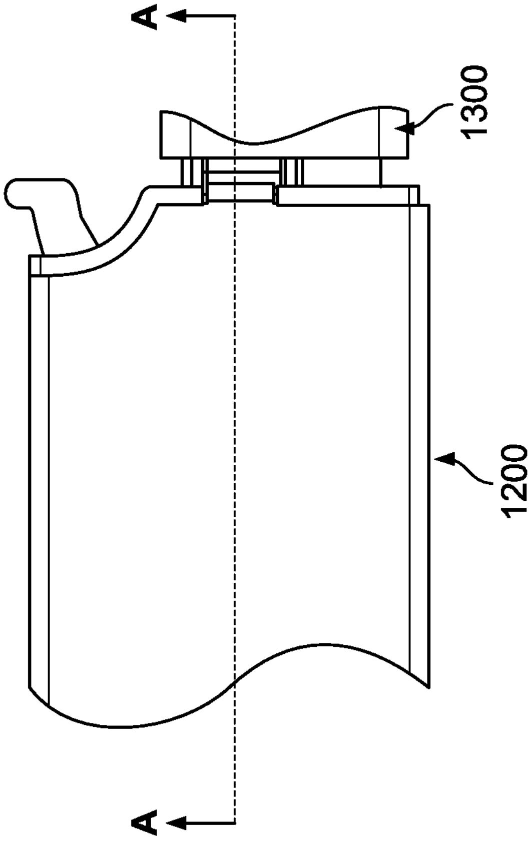
FIG. 12 is a side view of an exemplary fixed connector mated employing the pin contacts of FIGS. 10A-10B with an exemplary free connector employing the tuning fork receptacle contacts of FIGS. 10A-10B.

Referring to FIGS. 12 and 13, a fixed connector 1200 employing two pin contacts 1002 is mated with a free connector 1202 employing two tuning fork receptacle contacts 1000 wherein the pin contacts 1002, one of which is illustrated in FIG. 13, are fully engaged with the tuning fork receptacle contacts 1000, one of which is illustrated in FIG. 13. It should be noted that the pin contacts 1002 and/or tuning fork receptacle contacts 1000 can also be used in an adapter configuration, patch cord configuration or any other connector configuration described herein.

Figures 14, 15:
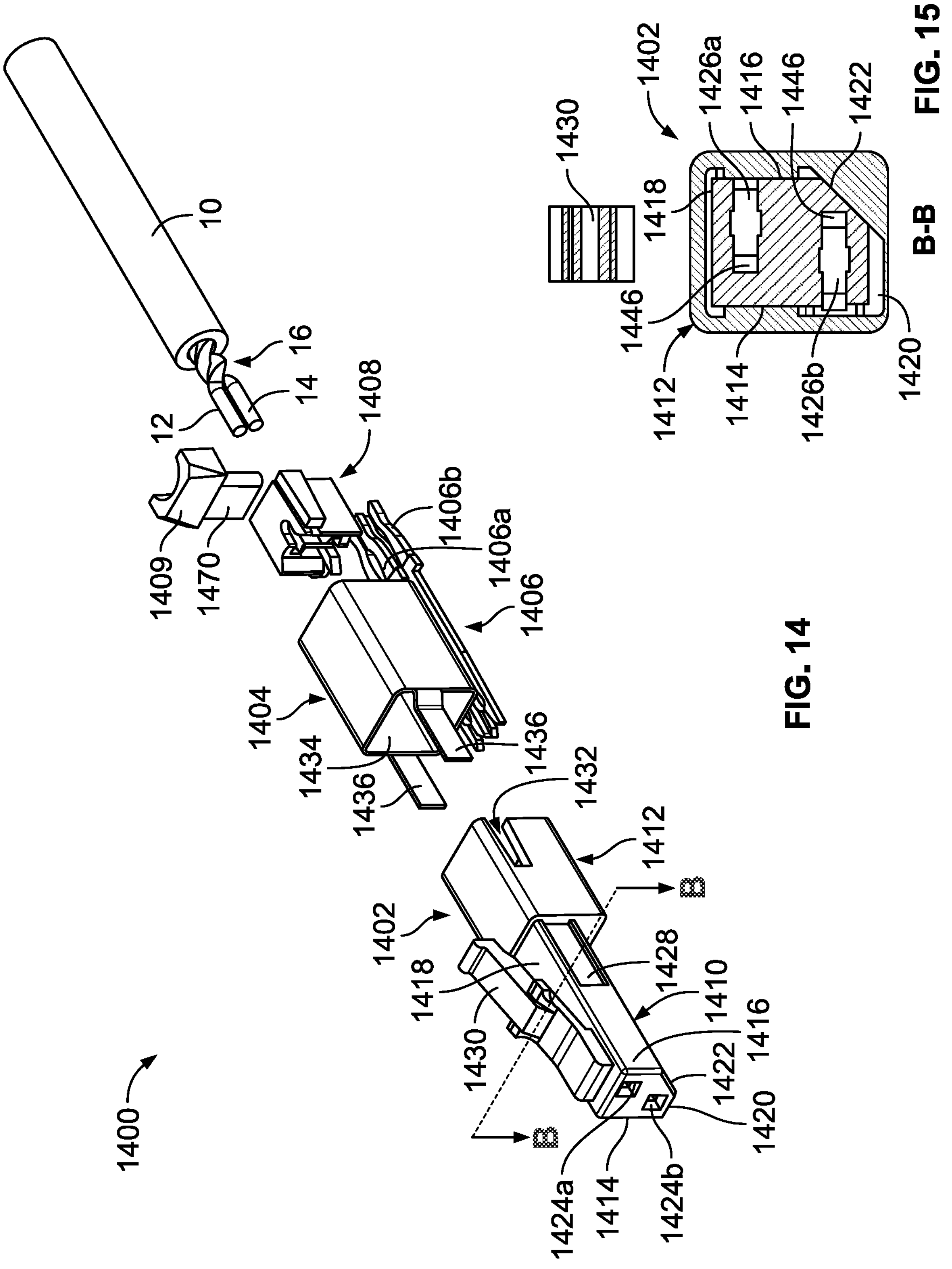
FIG. 14 is a perspective view of an example embodiment of a free connector.
FIG. 15 is a cross-sectional view taken along line B-B of FIG. 14.

Referring to FIGS. 14 and 15 another example embodiment of a free connector 1400 is illustrated. In this embodiment, the free connector 1400 includes a forward connector body 1402, a metal frame 1404, a pair of electrical contacts 1406*a*, 1406*b*, and a rear connector body 1408. In certain example, the free connector 1400 additionally includes a strain relief device 1409. The free connector 1400 can be coupled to a single twisted pair of conductors, e.g. conductors 12 and 14 of the single twisted pair 16 of cable 10.

The forward connector body 1402 includes an elongate forward portion 1410 and a rear receiving portion 1412.

The elongate forward portion 1410 includes a first side face 1414 and a second side face 1416 as well as an upper face 1418 connecting the first side face 1414 and the second side face 1416. A lower face 1420 connected to the first side face 1414 is connected to the second side face 1416 via a chamfered face 1422. A forward face 1422 of the forward connector body 1402 includes a pair of openings 1424*a*, 1424*b* corresponding to contact receiving channels 1426*a*, 1426*b*; the openings 1424*a*, 1424*b* receive pin contacts of the fixed connector 1500 (see FIG. 19). In certain embodiments, a recess 1428 is provided on each side face 1414, 1416 to interface with the metal frame 1404; however, other manners of interfacing with the metal frame 1404 can also be used. In certain embodiments, the forward connector body 1402 also includes a cantilevered latch 1430.

In certain embodiments, the openings 1424*a*, 1424*b* have a center-line to center-line horizontal spacing of 1.2 mm and a center-line to center-line vertical spacing of 2.7 mm, e.g. a vertical to horizontal ration of 2.25:1 or a horizontal to vertical ratio of 0.44 to 1. In certain embodiments, a vertical height of the elongate forward portion 1410 is designed to be greater than the vertical height of a standard LC connector by an amount of greater than or equal to 1 mm; the change in vertical height preventing the free connector 1400 from being coupled with a standard LC fixed connector (jack/receptacle).

In certain embodiments, a horizontal width of the elongate forward portion 1410 is designed to be the same width of a standard LC connector enabling a density of a certain plurality of free connectors 1400 to be the same as the density of a same certain plurality of standard LC connectors such as in a panel setting where multiple connectors are provided in a single panel. In certain embodiments, a horizontal width of the free connector 1400 is alternatively, or additionally, greater (e.g. ≥1 mm) than the horizontal width of a standard LC connector to prevent the free connector 1400 from being coupled with a standard LC connector while the vertical height of the free connector 1400 is maintained as consistent with the vertical height of a standard LC connector. In certain examples, the chamfered face 1422 also prevents the free connector 1400 from being inserted within a standard LC connector.

The rear receiving portion 1412 of the forward connector body 1402 is unitary (e.g., molded as single unit) with the elongate forward portion 1410 of the forward connector body 1402. The rear receiving portion 1412 defines a central cavity 1432 that provides rear access to the contact receiving channels 1426*a*, 1426*b* of the elongate forward portion 1410. The central cavity 1432 receives the rear connector body 1408.

The metal frame 1404 of the free connector 1400 is a metal shell having a central cavity 1434 that is slideable over the rear receiving portion 1412 of the forward connector body 1402. The metal frame 1404 is held in place about the rear receiving portion 1412 through use of a pair of flex tabs 1436 that interface with the recesses 1428 of the elongate forward portion 1410 of the forward connector body 1402. Note that the metal frame 1404 is not in contact with the pair of electrical contacts 1406*a*, 1406*b*. The metal frame 1404 helps to prevent crosstalk between multiple free connectors 1400 that are in close proximity to one another, e.g. in a high density connector panel.

Figure 16:
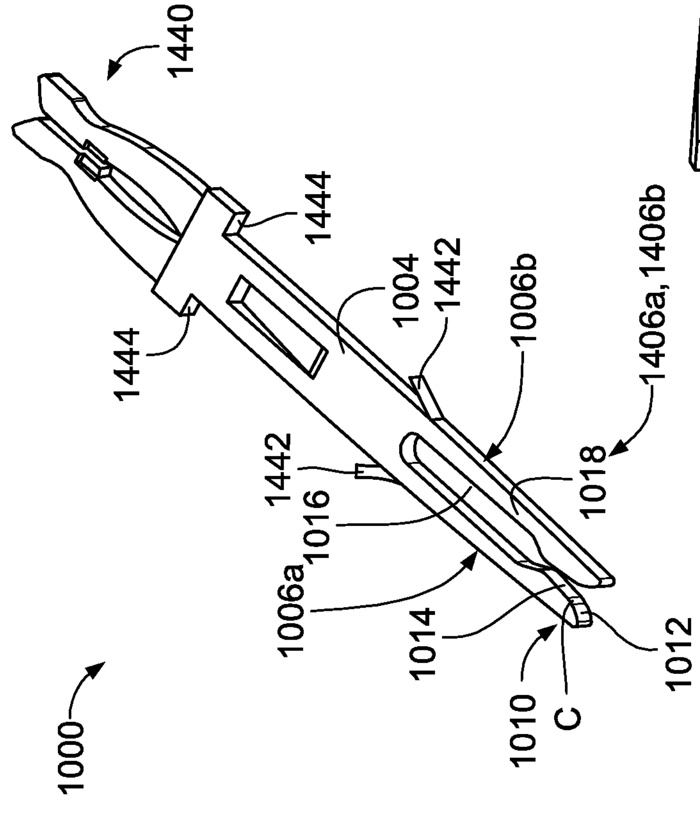
FIG. 16 is a perspective view of an example embodiment of an electrical contact.

The pair of electrical contacts 1406*a*, 1406*b* are illustrated in FIG. 14 with a single electrical contact illustrated in FIG. 16. A forward portion of each of the electrical contacts 1406*a*, 1406*b* comprises a tuning fork receptacle contact 1000, which is illustrated and described in relation to FIGS. 10A-13, while a rear portion of each of the electrical contacts 1406*a*, 1406*b* comprises an insulation displacement contact (IDC) 1440. In certain examples, the IDC 1440 includes a sharpened blade(s) that forces its way through insulation surrounding a conductor eliminating the need to strip the conductor while in other examples the conductor is stripped of insulation prior to placing the conductor in the IDC 1440. Each of the electrical contacts 1406*a*, 1406*b* includes a shoulder 1444 intermediate the tuning fork receptacle contact 1000 and the IDC 1440. The shoulder 1444 interfaces with a stop 1446 (see FIG. 15) within the elongate forward portion 1410 of the forward connector body 1402. In certain embodiments, each of the electrical contacts 1406*a*, 1406*b* includes one or more tangs 1442 to help retain each of the tuning fork receptacle contacts 1000 within their respective contact receiving channels 1426*a*, 1426*b*.

As noted with reference to FIGS. 10A-10B and FIG. 16, the tuning fork receptacle contact 1000 includes a rear portion 1004 connecting first and second spring arms 1006*a*, 1006*b*. Each of the spring arms 1006*a*, 1006*b* includes a forward end 1010 having an entry portion 1012 that has a leading entry angle, e.g. angle B, and a tapering transition portion 1014 from the entry portion 1012 at a point C to a point D. Beyond point D, the forward end 1010 tapers to an open channel 1016 within a central portion 1018 of the tuning fork receptacle contact 1000.

Figure 17:
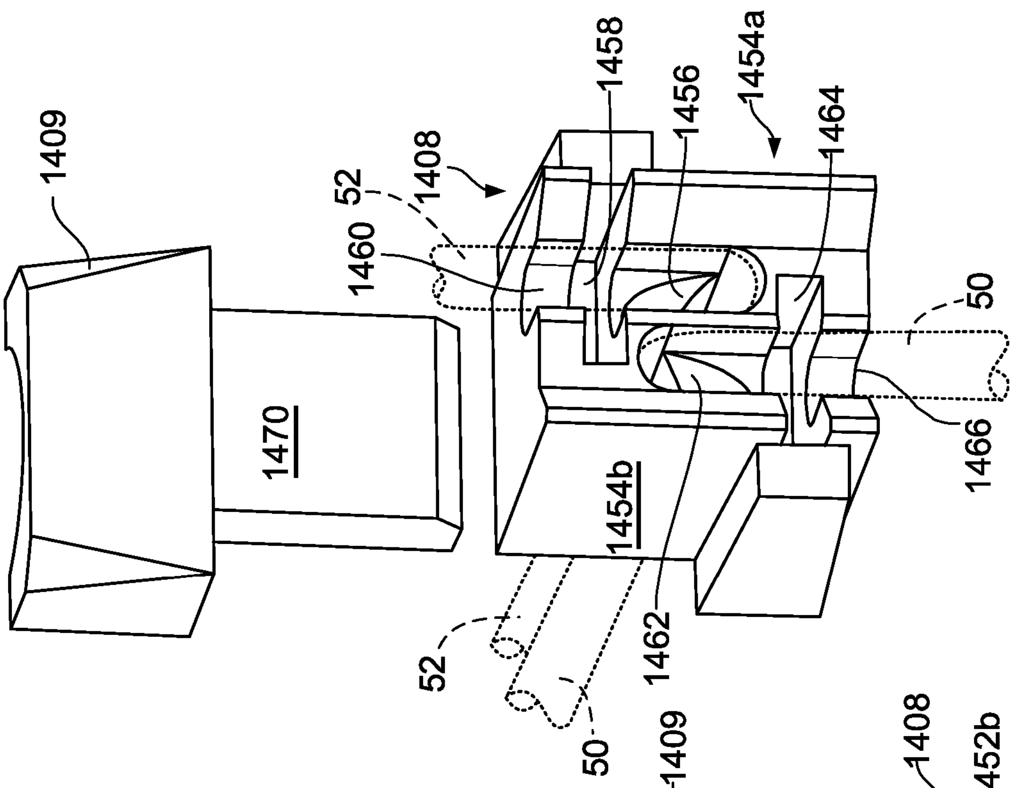
FIG. 17 is a forward perspective view of an example embodiment of a strain relief device.
Figure 18:
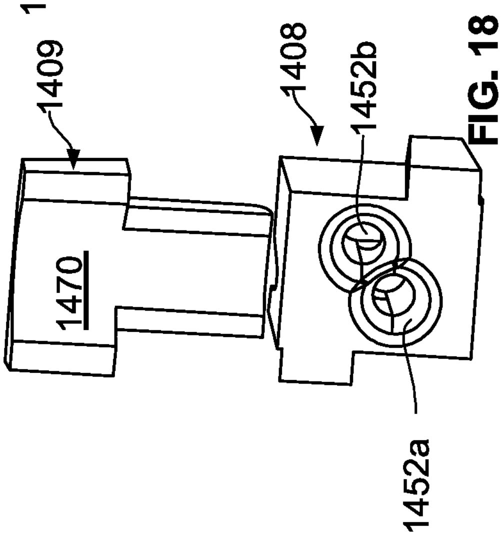
FIG. 18 is a rear perspective view of the strain relief device of FIG. 17.

Referring to FIGS. 14, 17 and 18, the rear connector body 1408 of the free connector 1400 serves to enclose the forward connector body 1402. In certain examples, the rear connector body 1408 seats against the forward connector body 1402 while, in other examples, the rear connector body 1408 seats against the metal frame 1404. The rear perspective view of the rear connector body 1408, provided in FIG. 18, illustrates that first and second channel openings 1452*a*, 1452*b* are provided to receive first and second conductors 12, 14. The channel openings 1452*a*, 1452*b* are offset to accommodate the offset positioning of the contact receiving channels 1426*a*, 1426*b* and their respective electrical contacts 1406*a*, 1406*b* (e.g., a nominal center-line to center-line horizontal offset of 1.2 mm and a center-line to center-line vertical offset of 2.7 mm). In certain examples, the first and second channel openings are countersunk to accommodate the flexing of conductors 10, 12 when coupling/coupled to the electrical contacts 1406*a*, 1406*b*.

The forward perspective view of the rear connector body 1408, provided in FIG. 17, illustrates that the rear connector body 1408 is essentially divided into a first half 1454*a*, to accommodate the upper positioned electrical contact 1406*a* and a second half 1454*b* to accommodate the lower positioned electrical contact 1406*b*. The first half 1454*a* of the rear connector body 1408 includes an upward channel 1456 that is contoured to direct the end of a conductor upward (e.g., a 90 deg. bend) to extend through a contact-receiving slot 1458 and beyond an upper recess 1460. The IDC contact 1440 of the electrical contact 1406*a* can then be inserted into the contact-receiving slot 1458 to establish an electrical interface with the conductor. The second half 1454*b* of the rear connector body 1408 includes a downward channel 1462 that is contoured to direct the end of a conductor downward (e.g., a 90 deg. bend) to extend through a contact-receiving slot 1464 and beyond a lower recess 1466. The IDC contact 1440 of the electrical contact 1406*b* can then be inserted into the contact-receiving slot 1464 to establish an electrical interface with the conductor.

The strain relief device 1409, shown in FIGS. 14, 17 and 18, includes an upper portion 1470 and a lower portion (not shown), which is essentially identical to the upper portion 1470 and interfaces with the upper portion 1470 to completely surround the cable 10 when the conductors 12, 14 are coupled to the electrical contacts 1406*a*, 1406*b*. In certain examples, the strain relief device 1409 comprises a component distinct from all other components of the free connector 1400. In certain examples, the strain relief device 1409 is molded unitary with the rear connector body 1408. In certain examples, the strain relief device 1409 is of metal and is manufactured unitary with the metal frame 1404.

Figure 19:
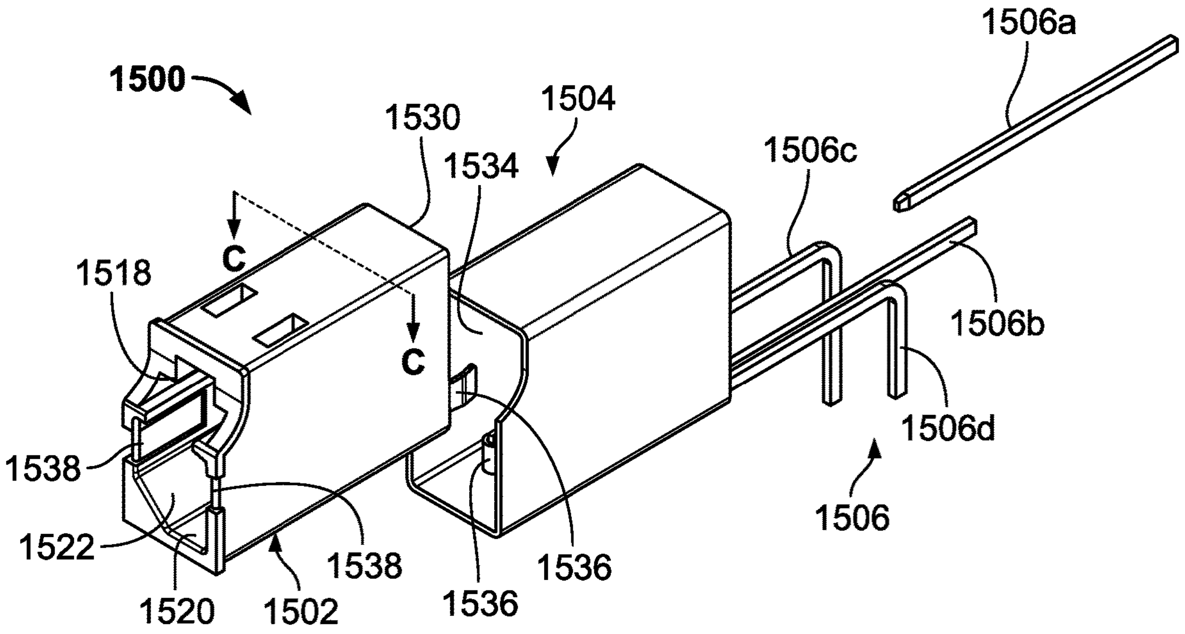
FIG. 19 is a perspective view of an example embodiment of a fixed connector; two alternative pin configurations are illustrated.
Figure 20:
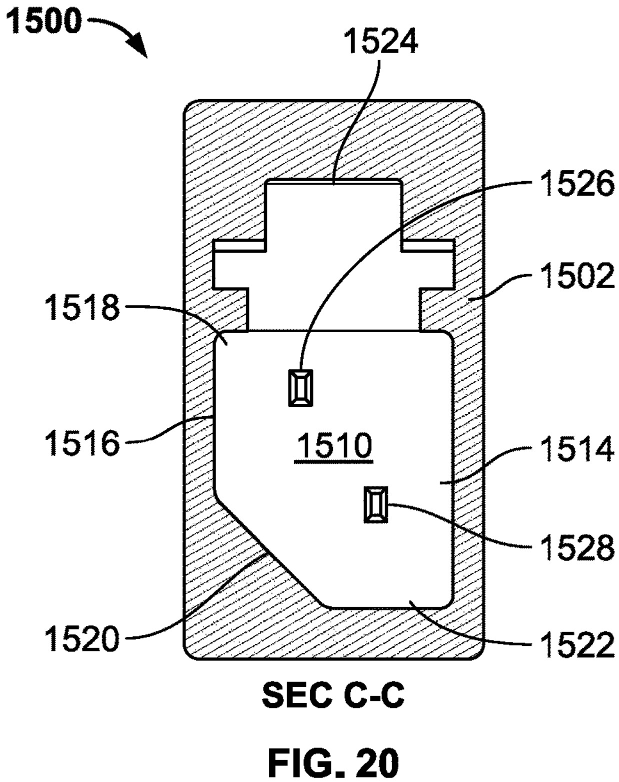
FIG. 20 is cross-sectional view taken along line C-C of FIG. 19.

An example embodiment of a fixed connector 1500, suitable to mate with the free connector 1400 (or other connectors described herein), is illustrated in FIGS. 19 and 20. The fixed connector 1500 generally includes a housing body 1502, a metal frame 1504, and a pair of pin contacts 1506; FIG. 19 illustrates that the pin contacts 1506 can comprise straight pin contacts 1506*a*, 1506*b*, or, alternatively, can comprise bent pin contacts 1506*c*, 1506*d*, e.g. bent 90 degrees, to accommodate a board mounting of the fixed connector 1500.

The housing body 1502 of the fixed connector includes a forward central channel 1510 that receives the free connector 1400. The forward central channel 1510 includes a first side face 1514 and a second side face 1516 connected by an upper face 1518. A lower face 1520 and chamfered face 1522 serve to also connect the first side face 1514 and the second side face 1516. The faces of the forward central channel 1510 correspond to those of the elongate forward portion 1410 of the free connector 1400. A notch 1524 is provided within the housing body 1502 to interface with the cantilevered latch 1430 of the free connector 1400. As shown in the FIG. 20, the housing body 1502 includes first and second openings 1526, 1528 to channels into which the pin contacts 1506 are inserted; when fully inserted, the pin contacts 1506 extend into the forward central channel 1510. The horizontal and vertical center-line-to-center-line spacing of the pin contacts and openings 1526, 1528 correspond to those found in the free connector 1400, e.g. nominal 1.2 mm and 2.7 mm respectively. In certain embodiments, the pin contacts 1506 are overmolded in the housing body 1502. In certain embodiments, the pin contacts 1506 are inserted after molding of the housing body 1502; a rear connector body (not shown) can be used to seal a rear face 1530 of the housing body 1502 if necessary.

The metal frame 1504 of the fixed connector 1500 is a metal shell having a central cavity 1534 that is slideable over the housing body 1502. The metal frame 1504 is held in place about the housing body 1502 through use of a pair clips 1536 that interface with side notches 1538 of the housing body 1502. Note that the metal frame 1504 is not in contact with the electrical contacts 1506. The metal frame 1504 helps to prevent crosstalk between multiple fixed connectors 1500 that are in close proximity to one another, e.g. in a high density connector panel.

The pin contacts 1506 of the fixed connector correspond to the pin contacts 1002. Referring back to FIGS. 10A-10B, each pin contact 1002 includes a forward portion 1020 and a rear portion 1022 that can be electrically coupled to a conductor, e.g. conductor 10, in any suitable manner. The forward portion 1020 includes a first tapered face 1024 and a second tapered face 1026 opposite the first tapered face 1024. The forward portion 1020 further includes first and second tapered sides 1028, 1030 that connect the first tapered face 1024 and second tapered face 1026 to form a four-sided pyramid shape with a flattened apex 1027; the flattened apex 1027 having a rectangular or square cross-section. In certain examples, the first and second sides tapered sides 1028, 1030 have bases that are narrower or wider than the bases of the first and second tapered faces 1024, 1026 thereby providing the rear portion 1022 of the pin contact 1002 with a rectangular cross-section while in other examples all sides and faces have equivalent bases providing the rear portion 1022 of the pin contact 1002 with a substantially square cross-section. A rectangular or square cross-section provides the rear portion 1022 of the pin contact 1002 a broader surface to make contact with the tuning fork receptacle contact 1000 should either the pin contact 1002 or the tuning fork receptacle contact 1000 become bent or warped in some way that might alter their original alignment. However, in certain embodiments the pin contact 1002 is of a circular or oval cross-section. In certain embodiments, the pin contact 1002 is provided with a bullet-nose forward portion 1020 rather than the pyramid-style forward portion 1020 that is illustrated.

Referring again to FIGS. 11A and 11B, the position of the forward portion 1020 of the pin contact 1002 is shown relative to the forward end 1010 of the spring arm 1006*a* of the tuning fork receptacle contact 1000. As illustrated, the tapered surfaces of the tuning fork receptacle connector 1000 and the pin contact 1002 are designed such that the tuning fork receptacle contact 1000 is provided with two contact zones, e.g. a disengagement zone where the forward portion 1020 of the pin contact 1002 is in contact with point C of the tuning fork receptacle contact 1000 as illustrated in FIG. 11A and a fully engaged zone where the rear portion 1022 of the pin contact 1002 is in contact with the tuning fork receptacle contact 1000 at point D as illustrated in FIG. 11B. In certain embodiments, an introductory, or lead-in, angle of approximately 30 degrees is provided from the most forward portion of the tuning fork receptacle contact 1000 to point C while a transfer angle from point C to point D on the tuning fork receptacle contact 1000 is in the range of 10-15 degrees. As such, the forward portion 1010 of the tuning fork receptacle contact 1000 transitions from a first plane defined by the introductory angle and a second plane defined between points C and D. Note that as the pin contact 1002 travels into the tuning fork receptacle contact 1000 the pin contact 1002 is in continuous contact with the tuning fork receptacle contact 1000 from the initial contact point C to the final contact point D causing the forward portion 1010 of the tuning fork receptacle contact 1000 to flex outward. Further, note that contact points C and D are radiused to provide a smooth and continuous transition. In certain embodiments, projections (e.g. bumps) can be provided at contact points C and D. In certain embodiments, a single plane from the forward most portion of the tuning fork receptacle contact 1000 to contact point D is provided, e.g. contact point C is eliminated.

While the first and second spring arms 1006*a*, 1006*b* are illustrated as having aligned contact points C and D, in other embodiments the contact points C and D on the first spring arm 1006*a* can be offset from the contact points C and D on the second spring arm 1006*b*. The two contact zones, and particularly, the disengagement zone, help to protect against an arcing "spark" that can occur when the plug, e.g., the pin contact 1002, is inserted/removed from the receptacle, e.g. the tuning fork receptacle contact 1000; the disengagement zone enables an arc, should it occur prior to full insertion (or upon final withdrawal) of the pin contact 1002 such that the final contact point, e.g. point D, which is vital for transmission of data, is not damaged. Arcing, if not addressed within the contact design, can cause damage to the contact and prevent data transmission through the plug and receptacle.

Figure 21:
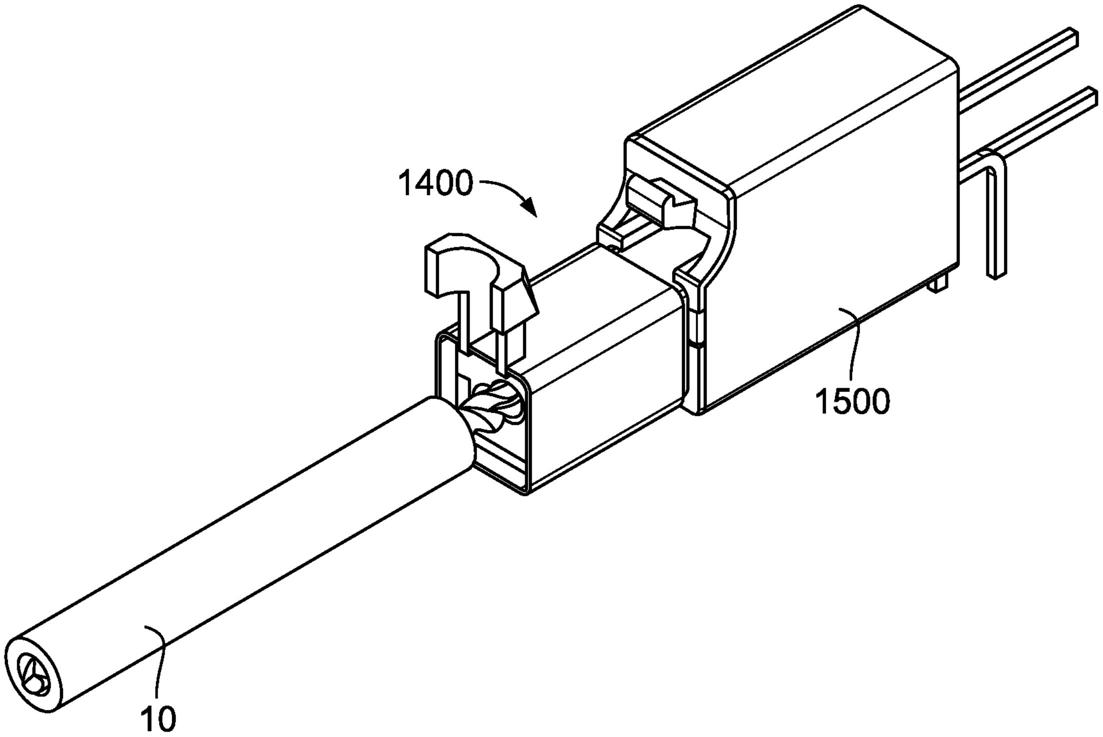
FIG. 21 is a perspective view of the fixed connector of FIG. 19 mated with the free connector of FIG. 14.
Figure 22:
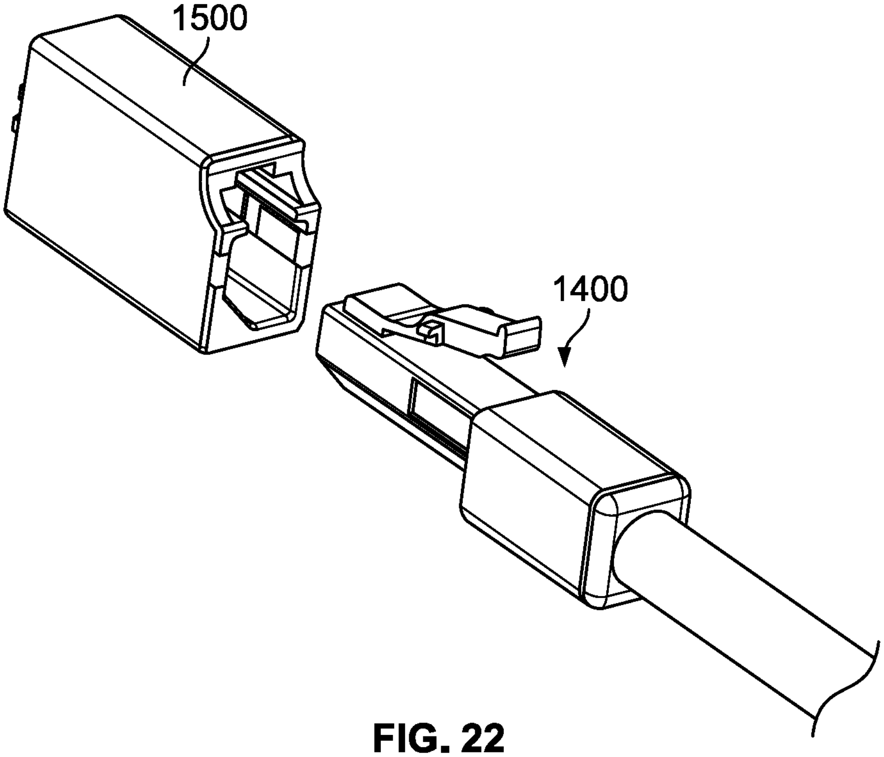
FIG. 22 is a perspective view of the fixed connector of FIG. 19 unmated from the free connector of FIG. 14.

FIGS. 21 and 22 illustrate the free connector 1400 and the fixed connector 1500 in a mated configuration and an unmated configuration, respectively.

Figure 23A:
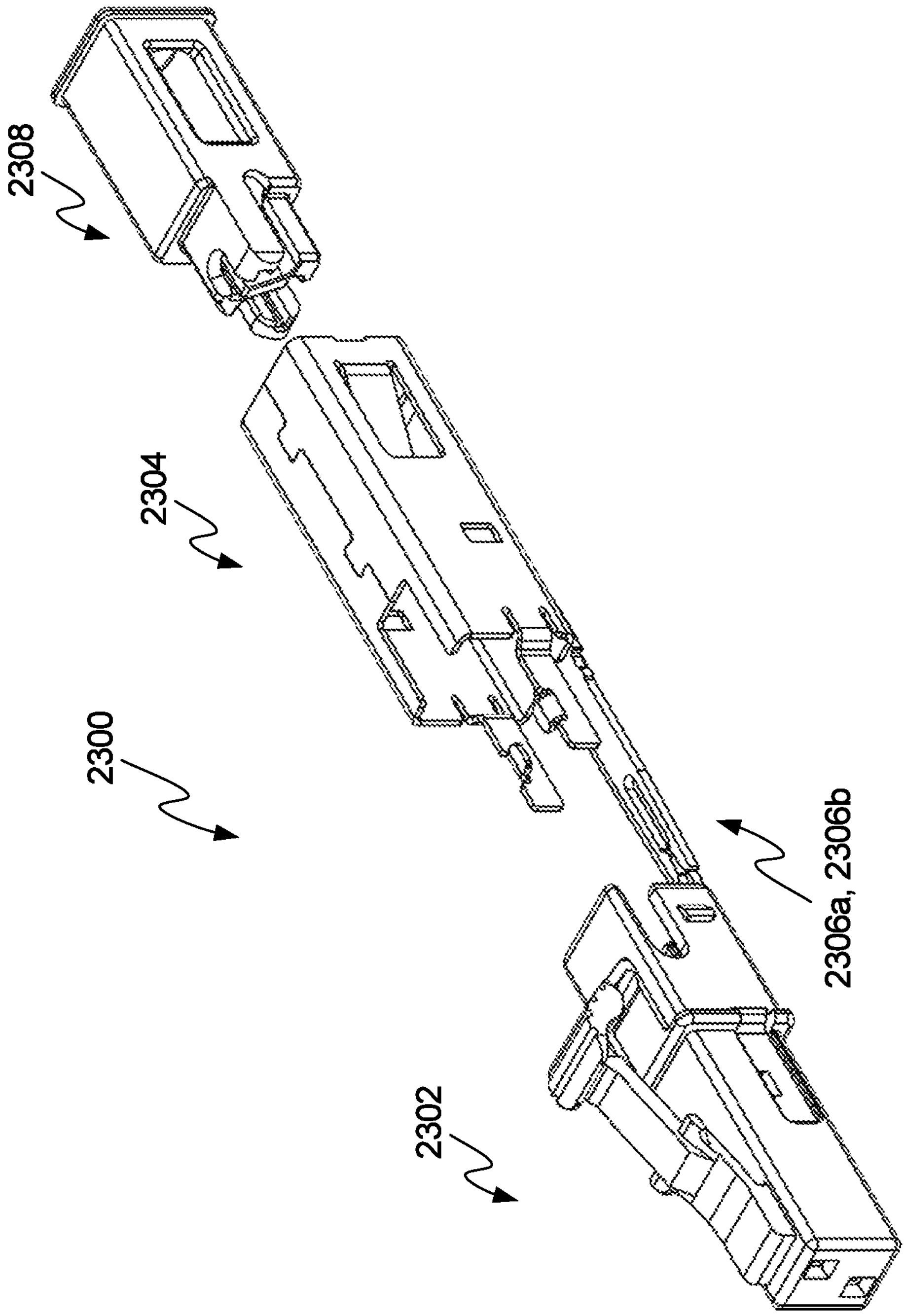
FIGS. 23A-23C include an exploded perspective view of an embodiment of a free connector, an assembled perspective view of the free connector and a partially assembled perspective view of the free connector, respectively.
Figure 23B:
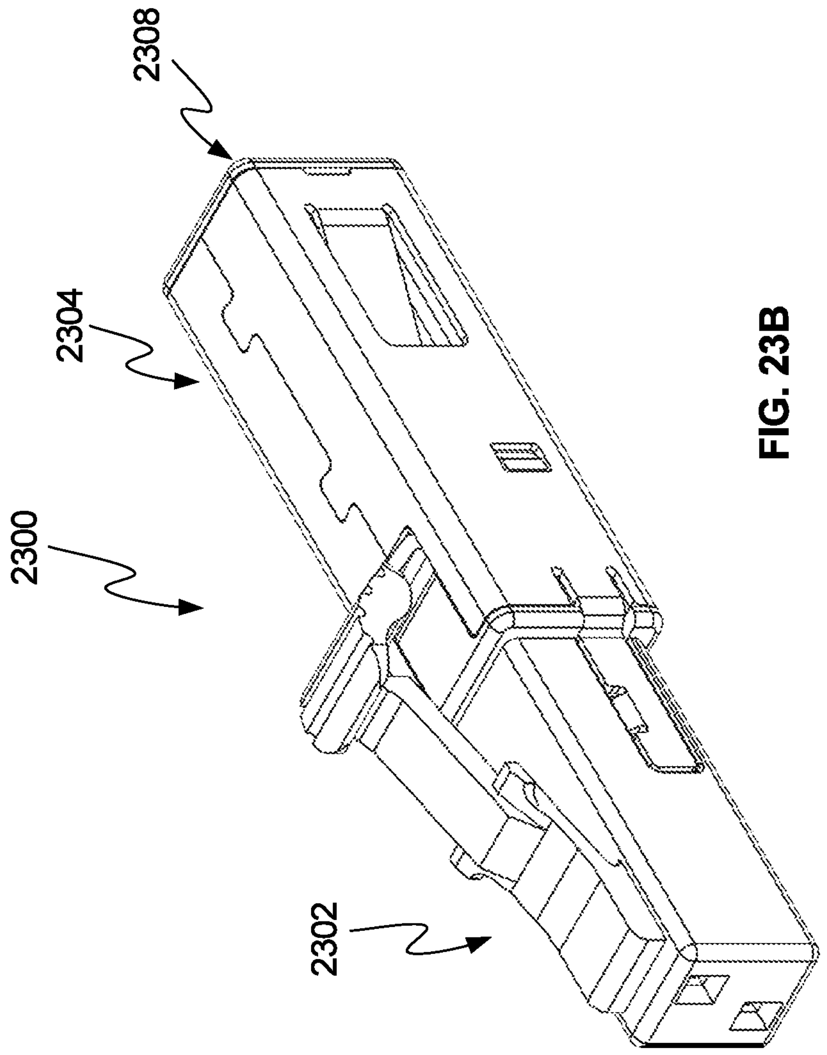
Figure 23C:
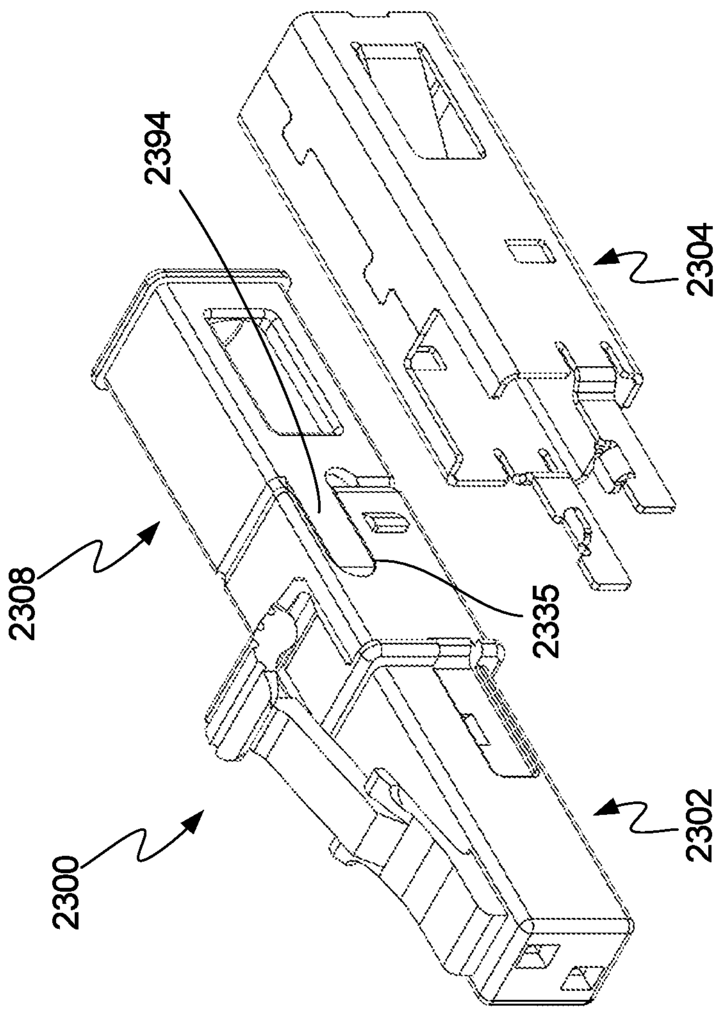

Referring now to FIGS. 23A-23C, another example embodiment of a free connector 2300 is illustrated. Free connector 2300 includes a forward connector body 2302, a metal frame 2304, a pair of electrical contacts 2306*a*, 2306*b* and a rear connector body 2308. Free connector 2300 can be coupled to a single twisted pair of conductors, e.g., conductors 12 and 14 of the single twisted pair 16 of cable 10.

Figure 24A:
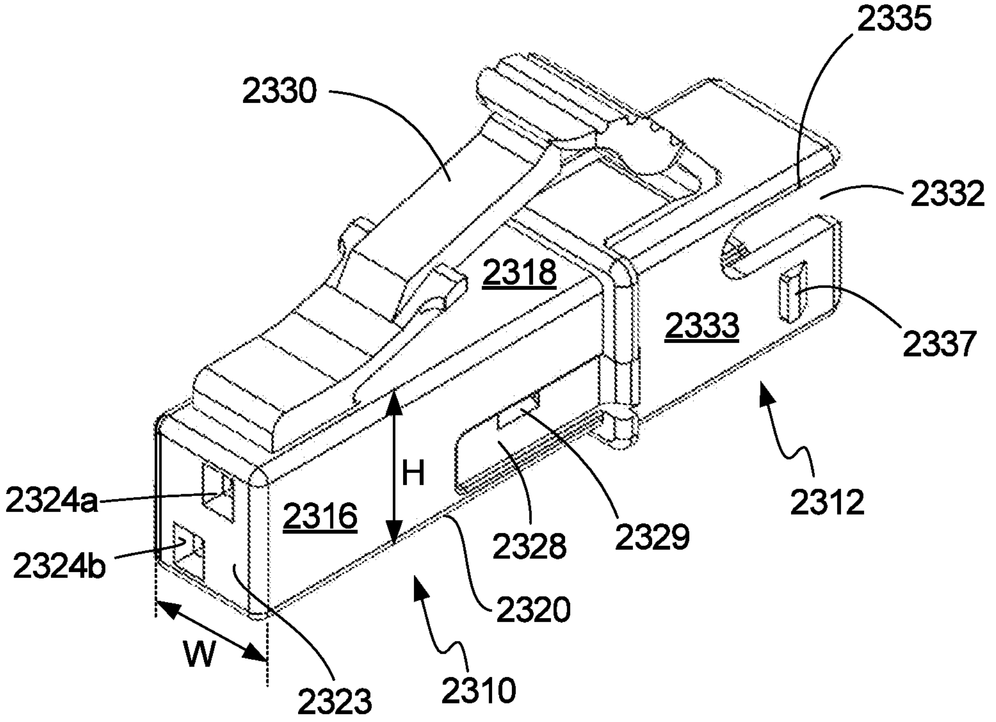
FIGS. 24A-24F include a first side perspective view of a forward connector body for the free connector of FIGS. 23A-23C, a second side perspective view of the forward connector body, a front view of the forward connector body, a rear view of the forward connector body, a sectional view of the forward connector body and a rear perspective view of the forward connector body, respectively.
Figure 24B:
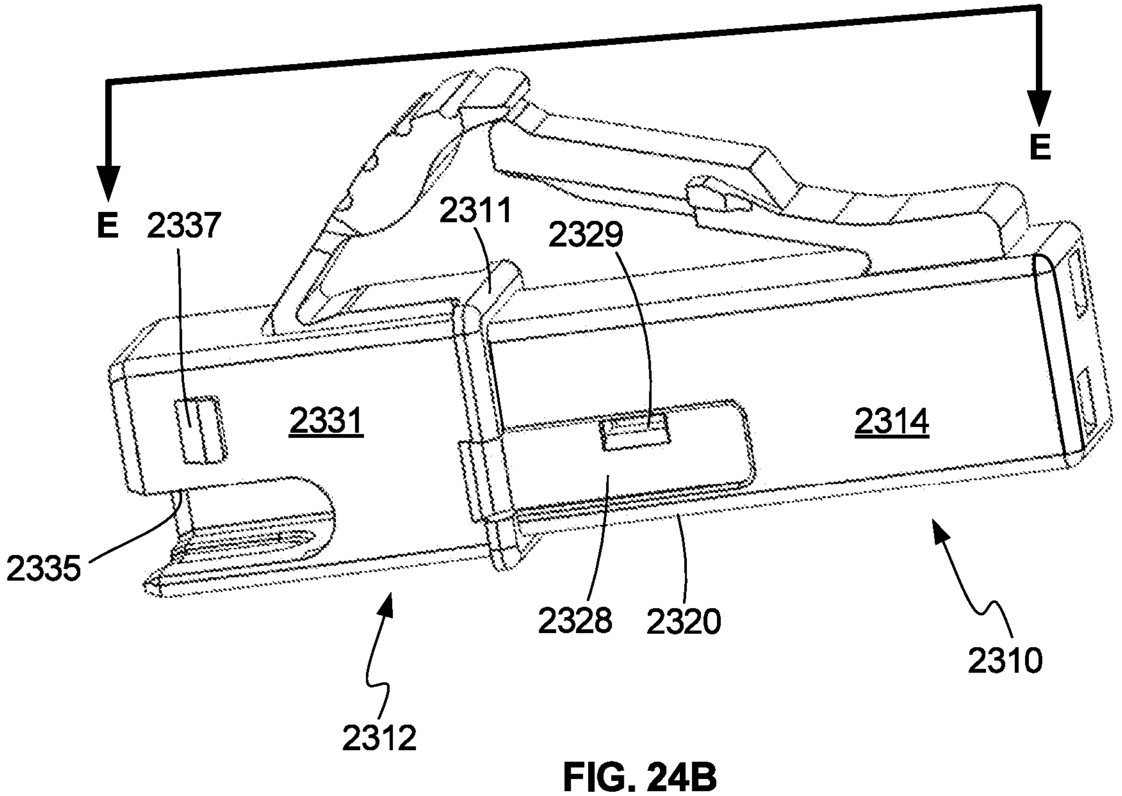

Referring to FIGS. 24A-24B, the forward connector body 2302 includes an elongate forward portion 2310 and a rear receiving portion 2312 that is separated by a shoulder 2311.

The elongate forward portion 2310 includes a first side face 2314 and a second side face 2316 as well as an upper face 2418 connecting the first side face 2314 and the second side face 2316. A lower face 2420 additionally connects the first side face 2314 and the second side face 2316. A forward face 2323 of the forward connector body 2302 includes a pair of openings 2324*a*, 2324*b* corresponding to contact receiving channels 2326*a*, 2326*b*; the openings 2324*a*, 2324*b* receive pin contacts that electrically interface with the tuning fork contacts 2306*a*, 2306*b*. In certain embodiments, a recess 2328 is provided on each side face 2314, 2316 of the elongate forward portion 2310 to interface with and retain the metal frame 2304. Each recess 2328 includes a recessed notch 2329 to receive an interfacing tab 2344 of the metal frame 2304 to further ensure that the metal frame 2304 remains secured to the forward connector body 2302. However, other manners of interfacing with the metal frame 2304 can also be used. The elongate forward portion 2310 of the forward connector body 2302 also includes a cantilevered latch 2330.

In certain embodiments, the center of each opening 2324*a*, 2324*b* is offset from a vertical center line of the forward face 2323 by a distance A of 0.6 mm (center-to-center of 1.2 mm) and is offset from a horizontal center line of the forward face 2323 by a distance B of 1.35 mm (center-to-center of 2.7 mm). Further, the elongate forward portion 2310 of the free connector 2300, including the forward face 2323, has a width W of ~4.5 mm and a height H of ~5.6 mm. Notably, a fiber optic LC connector has a square forward face with dimension s of 4.5 mm×4.5 mm. As such the free connector 2300 has a width similar to the LC connector but a slightly larger height, e.g., ≥1 mm, to prevent the free connector 2300 from being inserted into an LC fixed connector (or LC adapter) yet provide a size similar to an LC connector enabling similar density of free connectors in virtually the same amount of space that can accommodate a corresponding density of LC connectors such as in connector panel setting.

The rear receiving portion 2312 of the forward connector body 2302 is unitary (e.g. molded as a single unit) with the elongate forward portion 2310 of the forward connector body 2302. The rear receiving portion 2312 defines a central cavity 2332 that provides rear access to the contact receiving channels 2326*a*, 2326*b* of the elongate forward portion 2310; the central cavity 2332 is provided with a chamfered keying feature 2329 to assist in the aligning the rear connector body 2308. Each side face 2331, 2333 of the rear receiving portion 2312 includes a slot 2335 to interface with the rear connector body 2308 and an outward extending tab 2337 to interface with the metal frame 2304.

The metal frame 2304 of the free connector 2300 comprises a metal shell body 2340 having a central cavity 2334 that is slideable over the rear receiving portion 2312 of the forward connector body 2302. The metal frame 2304 is held in place about the rear receiving portion 2312 through use of a pair of flex tabs 2342 that interface with corresponding recesses 2328 of the forward connector body 2302. Each of the flex tabs 2342 includes in inward facing tab 2344 to interface with recessed notch 2329 of the forward connector body 2302. Each side face 2346, 2348 of the metal frame 2304 includes an opening 2350 to interface with outward extending tab 2337 of the forward connector body 2302. Each point of interface between the metal frame 2304 and the forward connector body 2302 assists in securing the metal frame 2304 to the forward connector body 2302. Each side face 2346, 2348 of the metal frame 2304 is additionally equipped with an inward directed beam 2352 (e.g. shield beam) to establish an electrical interface with a cable shield (foil or drain wire) of the cable carrying the single pair of conductors (e.g., see FIG. 1B). A bottom face 2354 of the metal frame 2304 includes a cut-out 2356 to interface with a latch 2376 on the rear connector body 2308. Note that, while the metal frame 2304 includes a shield beam for interfacing with a shield of a shielded cable, the metal frame 2304 can also be utilized in conjunction with a non-shielded cable. In the instance of a non-shielded cable, the metal frame provides additional structural support to the connector 2300.

Figure 24C:
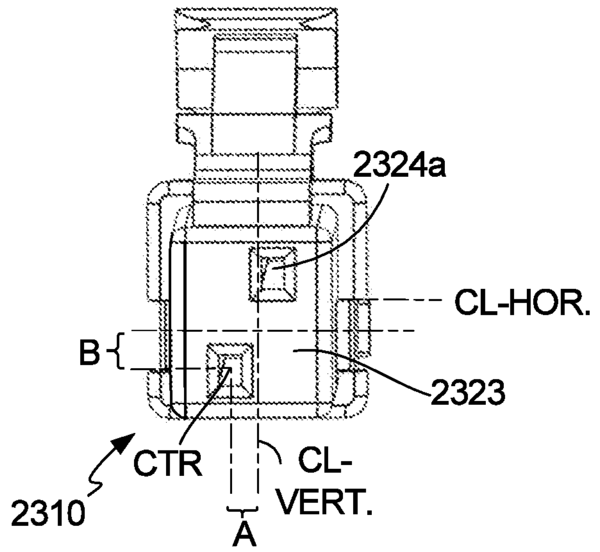
Figure 24D:
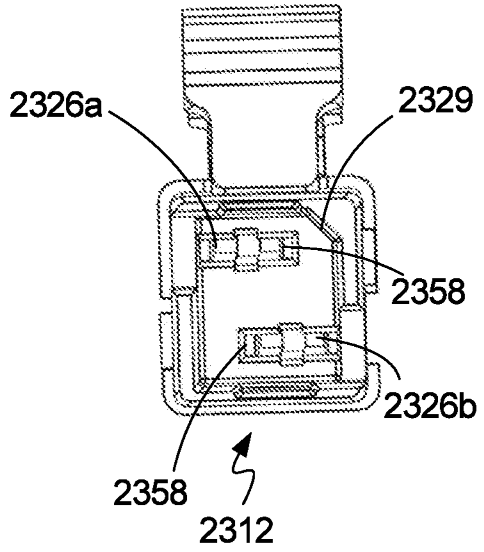
Figure 24E:
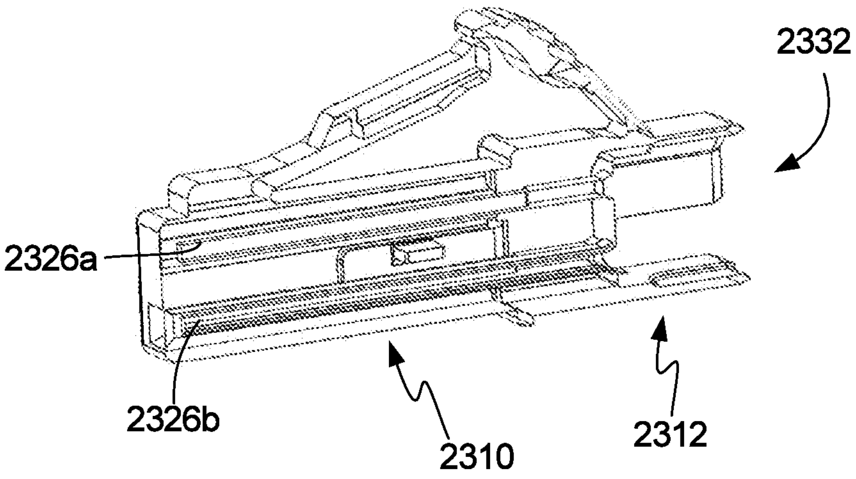
Figure 24F:
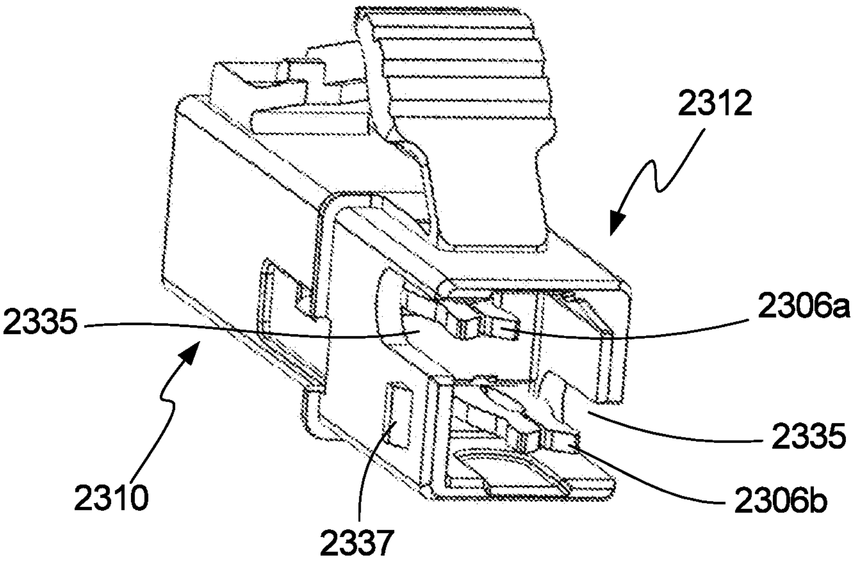
Figure 25A:
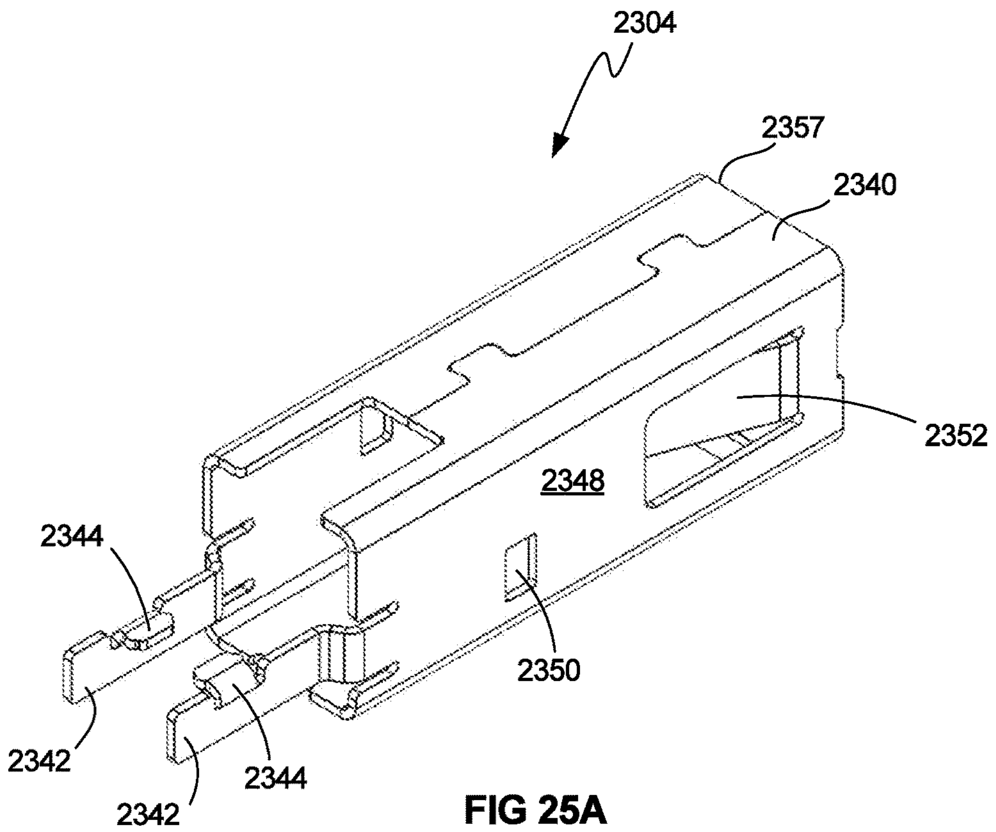
FIGS. 25A-25D include a perspective view of a metal frame of the free connector of FIGS. 23A-23C, a forward perspective view of the metal frame, a side view of the metal frame and a bottom perspective view of the metal frame, respectively.
Figure 25B:
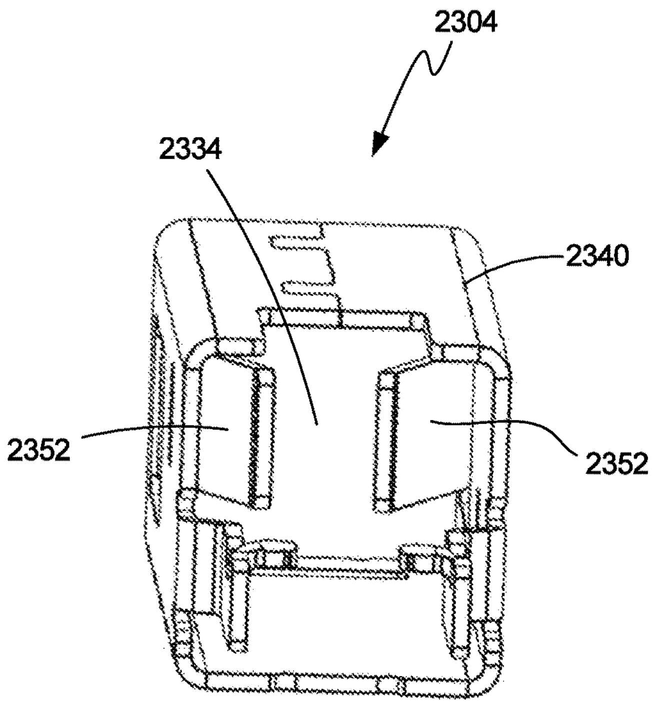
Figure 25C:
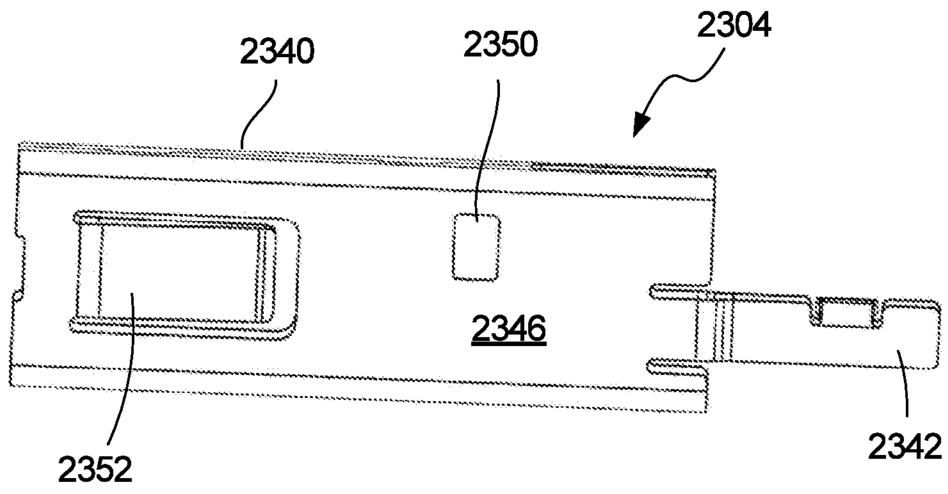
Figure 25D:
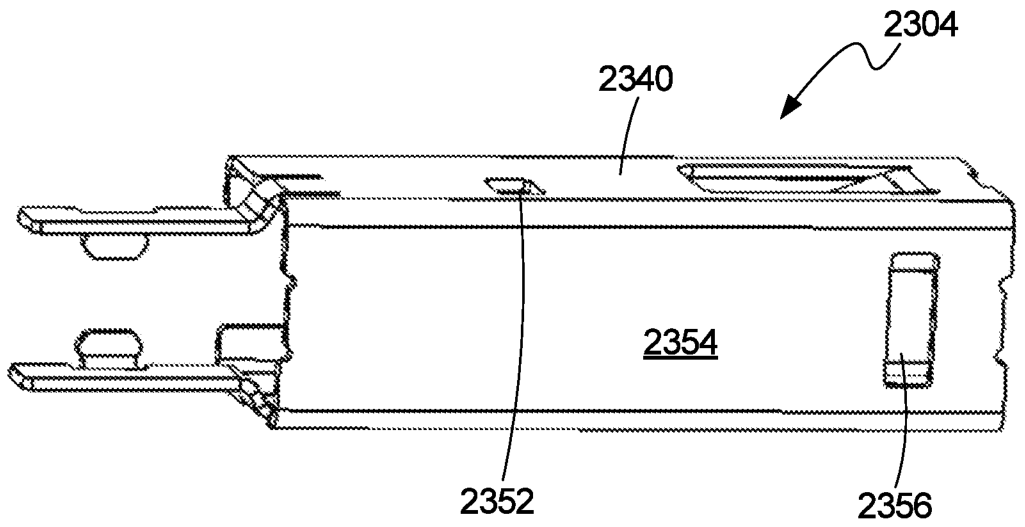
Figure 26:
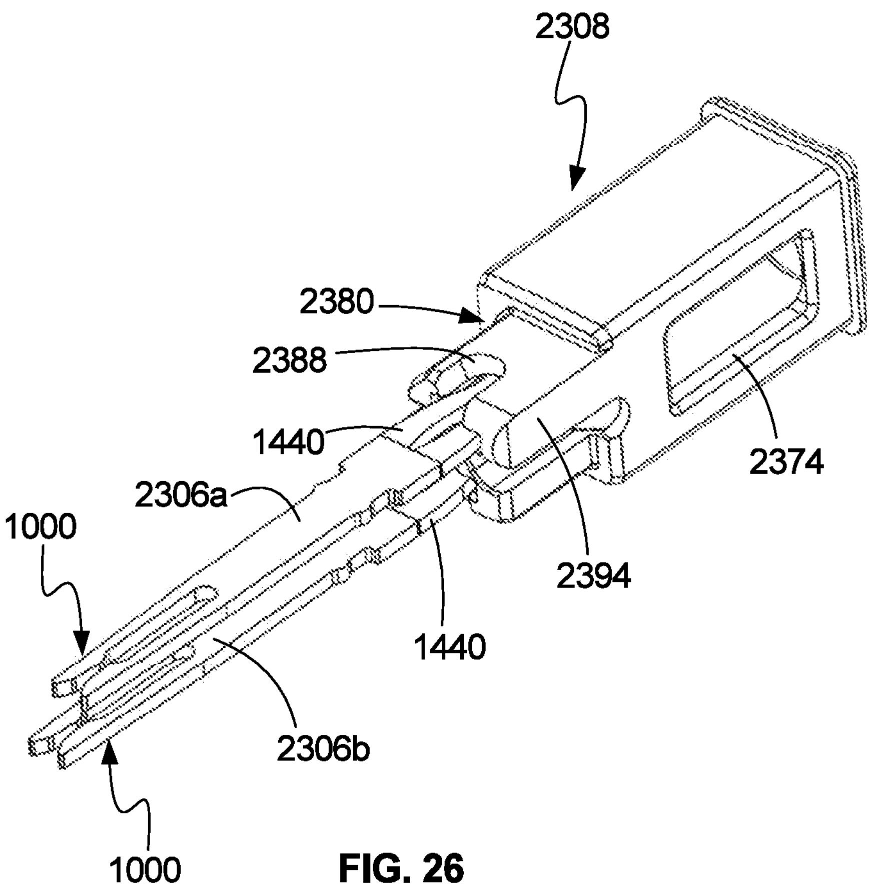
FIG. 26 is a perspective view of a rear connector body of the free connector of FIGS. 23A-23C with electrical contacts.
Figure 27A:
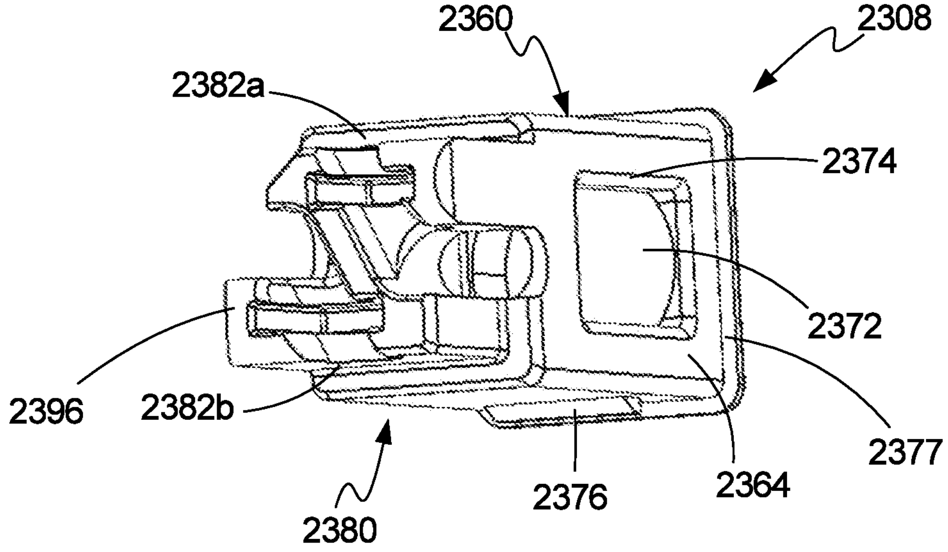
FIGS. 27A-27D include a perspective view of the rear connector body FIG. 26, a front view of the rear connector body, a rear view of the rear connector body and a bottom perspective view of the rear connector body, respectively.
Figure 27B:
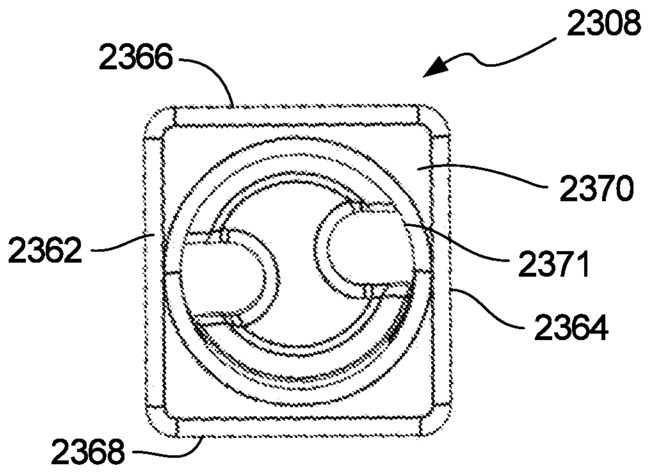
Figure 27C:
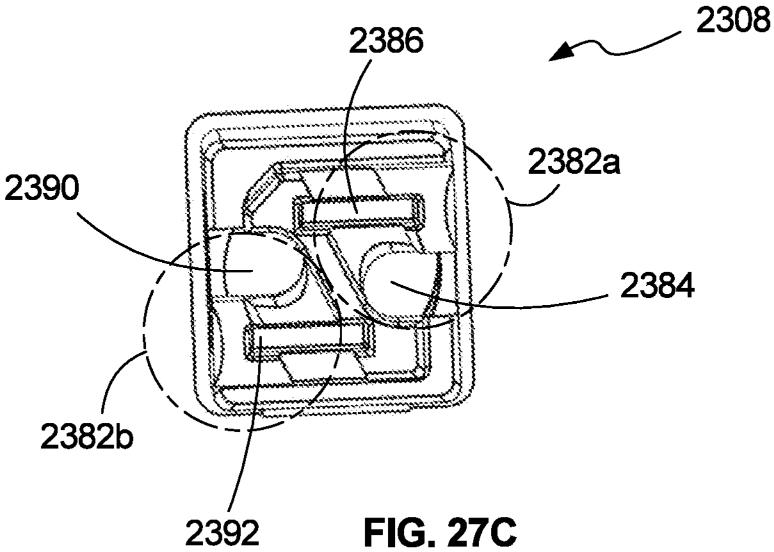
Figure 27D:
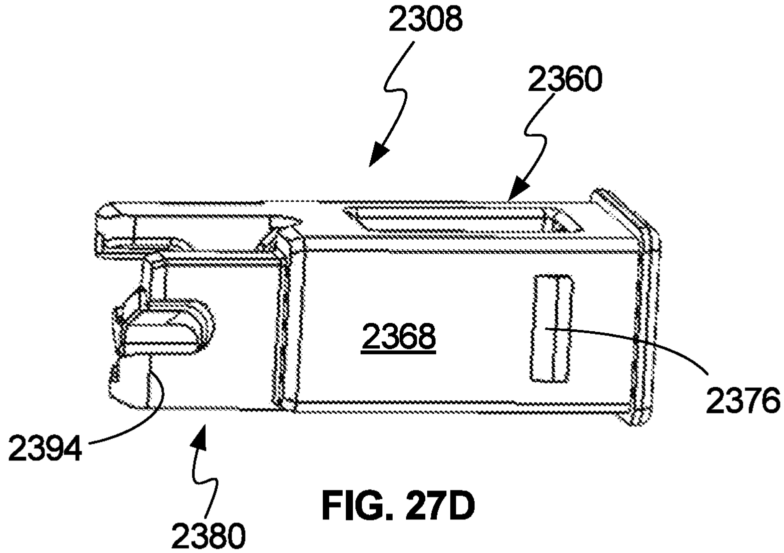

Electrical contacts 2306*a*, 2306*b* (see FIG. 23A and correspond to electrical contacts 1406*a*, 1406*b* of FIGS. 14 and 16; note that the forward portion of each of the electrical contacts 1406*a*, 1406*b* comprises a tuning fork receptacle contact 1000, which is illustrated and described in relation to FIGS. 10A-13, while the rear portion of each of the electrical contacts 1406*a*, 1406*b* comprises an insulation displacement contact (IDC) 1440. In certain examples, the IDC 1440 includes a sharpened blade(s) that forces its way through insulation surrounding a conductor eliminating the need to strip the conductor while in other examples the conductor is stripped of insulation prior to placing the conductor in the IDC 1440. Each of the electrical contacts 1406*a*, 1406*b* includes a shoulder 1444 that interfaces with a stop 2358 (see FIG. 24D) within the elongate forward portion 2310 of the forward connector body 2302. In certain embodiments, each of the electrical contacts 1406*a*, 1406*b* includes one or more tangs 1442 to help retain each of the tuning fork receptacle contacts 1000 within their respective contact receiving channels 2326*a*, 2326*b* of the forward connector body 2302.

As noted with reference to FIGS. 10A-10B and FIG. 16, the tuning fork receptacle contact 1000 includes a rear portion 1004 connecting first and second spring arms 1006*a*, 1006*b*. Each of the spring arms 1006*a*, 1006*b* includes a forward end 1010 having an entry portion 1012 that has a leading entry angle, e.g., angle B, and a tapering transition portion 1014 from the entry portion 1012 at a point C to a point D. Beyond point D, the forward end 1010 tapers to an open channel 1016 within a central portion 1018 of the tuning fork receptacle contact 1000. Details regarding the specific angles and dimensions of the forward end 1010 of the spring arms 1006*a*, 1006*b* are provided in FIG. 11C.

Referring to FIG. 26 and FIGS. 27A-27D, the rear connector body 2308 of the free connector 2300 is illustrated. The rear connector body 2308 includes a rear body portion 2360 having a first side face 2362 and a second side face 2364 connected by an upper face 2366 and a lower face 2368. A rear face 2370 of the rear body portion 2360 includes an opening 2371 that defines a central cavity 2372 into which is inserted a pair of conductors (e.g., conductors 12, 14). Each of the first and second side face 2362, 2364 is provided with an elongate opening 2374; when the rear connector body 2308 is interfaced with the metal frame 2304 the inward directed beams 2352 of the metal frame 2304 will extend through the respective elongate openings 2374 into the central cavity 2372 of the rear connector body 2308 to establish an electrical interface with the foil (or drain wire) of the conductor within. A latch 2376 on the lower face 2368 of the rear body portion 2360 is provided to interface with cut-out 2356 of the metal frame 2304 to secure the rear connector body 2308 to the metal frame 2304. A lip edge 2377 of the rear body portion 2360 seats against a rear face 2357 of the metal frame 2304.

The rear connector body 2308 of the free connector 2300 includes a contact receiving portion 2380 that extends forward from the rear body portion 2360. The contact receiving portion 2380 is essentially divided into a first half 2382*a* to accommodate the upper positioned electrical contact 2306*a* and a second half 2382*b* to accommodate the lower positioned electrical contact 2306*b*. The first half 2382*a* of the contact receiving portion 2380 includes an upward channel 2384 that is contoured to direct the end of a conductor upward (e.g., a 90 deg. bend) to extend through a contact receiving slot 2386 and beyond an upper recess 2388. (See FIG. 17 for example of conductors in position). The second half 2382*b* of the contact receiving portion 2380 includes a downward channel 2390 that is contoured to direct the end of a conductor downward (e.g., a 90 deg. bend) to extend through a contact receiving slot 2392 and beyond a lower recess 2394. The IDC contact 1440 of the electrical contact 2306*a* can then be inserted into contact receiving slot 2386 to establish an electrical interface with the conductor extending there through while the IDC contact 1440 of the electrical contact 2306*b* can be inserted into contact receiving slot 2392 to establish an electrical interface with the conductor extending there through. The IDC contact 1440 applies a normal force to the respective conductor and cuts through both the insulation of the conductor and a portion of the conductor itself to create the electrical interface. Note that the electrical interface is established without requiring crimping of the conductor to the electrical contact, i.e. the electrical interface is crimp-less. The upward channel 2384 is, in part, defined by an upper outward extending arm 2394 while the downward channel 2390 is, in part, defined by a lower outward extending arm 2396. Each of upper outward extending arm 2394 and lower outward extending arm 2396 interface with respective corresponding slots 2335 of the forward connector body 2302 (best seen in FIG. 23C) when the free connector 2300 is assembled to assist in aligning and stabilizing the rear connector body 2308 relative to the forward connector body.

In certain embodiments, the rear connector body 2308 of the free connector has channels, e.g. upward channel 2384 and downward channel 2390 that are sized to accommodate a specific gauge of a conductor. As such, a plurality of rear connector bodies 2308, each designed to accommodate a different conductor gauge, may be used interchangeably with the forward connector body 2302, metal frame 2304 and contacts 2306*a*, 2306*b*. To facilitate the interchangeability, the different rear connector bodies 2308 are color-coded or otherwise designated to indicate which conductor gauge is suitable to the respective rear connector body 2308.

As noted herein, the metal frame 2304 of the free connector 2300 includes inner directed beams 2352 that comprise shield beams. Each of the shield beams 2352, one on each side of the metal frame 2304 of the free connector 2300, apply a normal force to the foil and/or drain wire of a conductor; in certain embodiments the drain wire may only be on one conductor side or may be on both conductor sides. Note that the cable jacket surrounding the pair of conductors coupled to the electrical contacts 2306*a*, 2306*b* of the free connector 2300 will be within the rear connector body 2308 of the free connector 2300 and the foil shield of the cable (and/or the drain wire) will be folded back on the outside surface of the cable jacket such that the conductive surface of the foil (and/or the drain wire) will be facing the shield beams 2352. During assembly of the free connector 2300, insertion of the rear connector body 2308 into the metal frame 2304 and forward connector body 2302 will cause the shield beams 2352 to move outward then return inward to extend through elongate openings 2374 of the rear connector body 2308 to make contact with the shield foil (and/or drain wire) of the cable (e.g., cable 10) and establish a grounding path. In some cables sizes, the shield beams 2352 may additionally function as a locking feature to prevent the rear connector body 2308 from moving rearward. In certain embodiments, the metal frame 2304 serves as only as a structural element of the free connector 2300 in that, in certain applications, shielding of the connector is not required.

The free connector 2300 is designed to interface with a fixed connector or adapter, similar to those described herein, that incorporate cooperating dimensions and keying features. Further, the free connector 2300 can be incorporated in a patch cord and can be incorporated into any suitable configuration requiring the functionality of the free connector 2300. A fixed connector and/or adapter suitable for interfacing with the free connector 2300 preferably includes pin contacts 1002 (see FIGS. 10A-13), which are configured to interface with the tuning fork receptacle contact 1000 of the electrical contacts 2306*a*, 2306*b* of the free connector 2300.

Figure 28A:
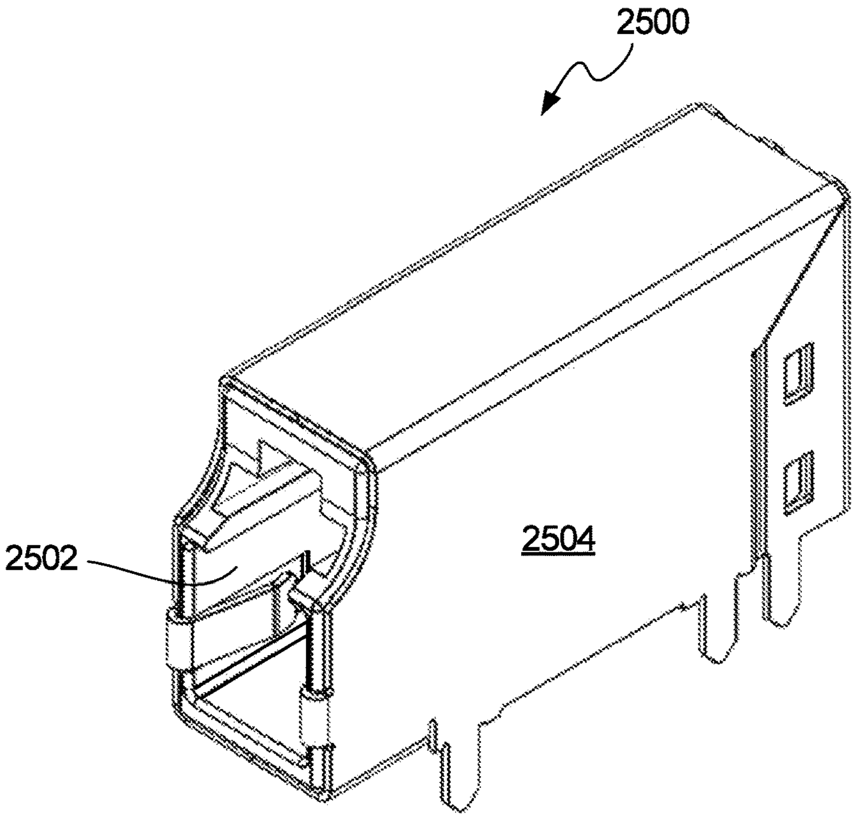
FIGS. 28A-28B include a perspective view of an embodiment of a fixed connector and a front view of the fixed connector, respectively.
Figure 28B:
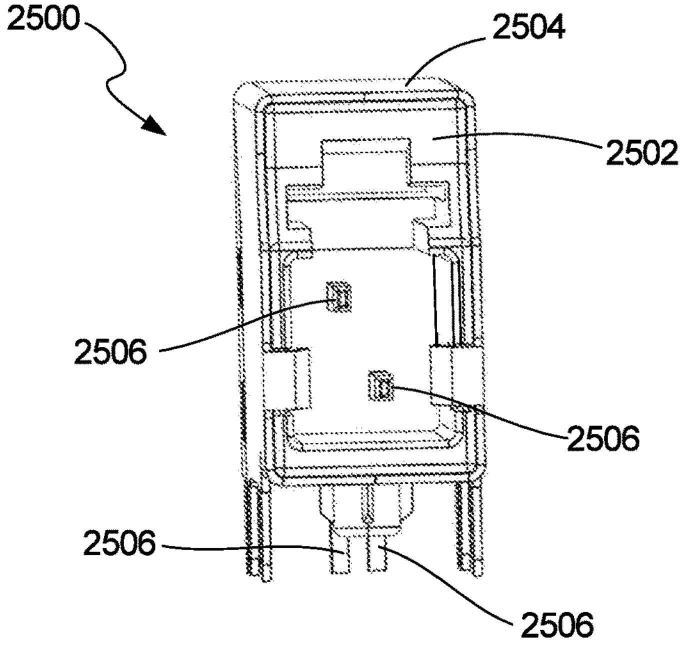
Figure 29A:
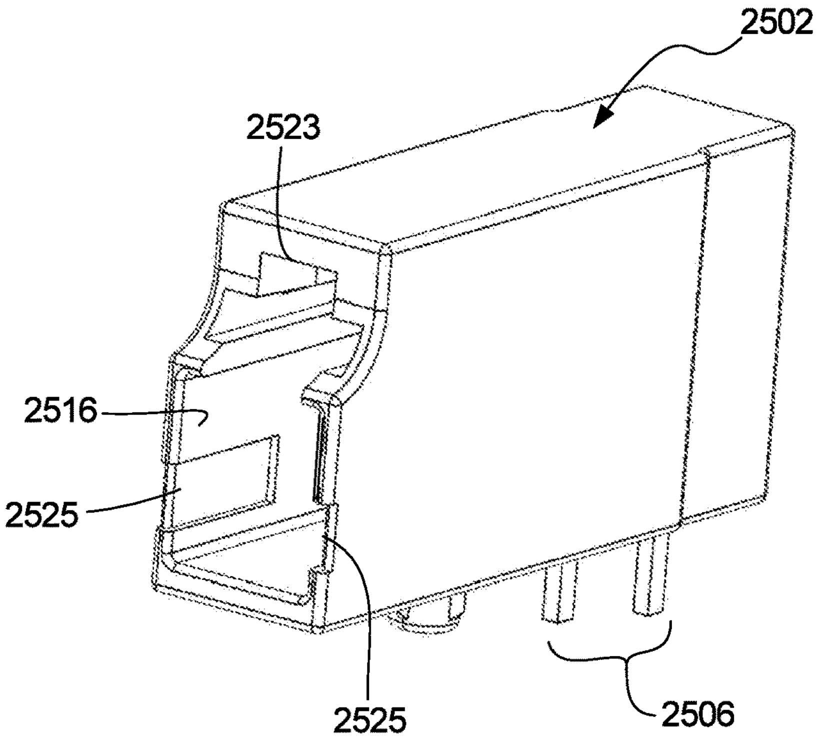
FIGS. 29A-29D include a perspective view of the housing body of the fixed connector of FIG. 28A, a front view of the housing body, a rear perspective view of the housing body, and a sectional view of the housing body taken along line D-D of FIG. 29C, respectively.
Figure 29B:
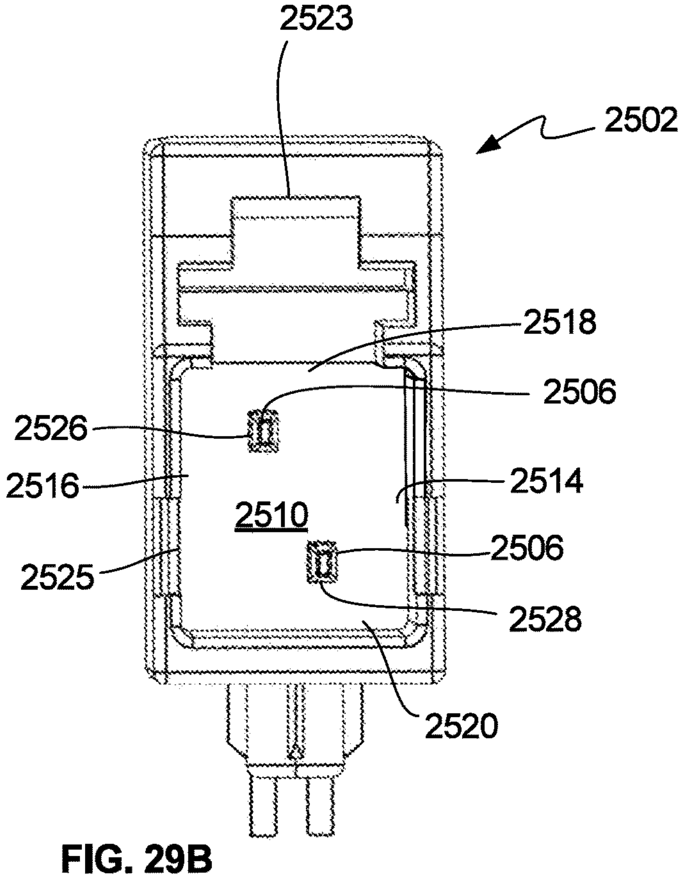
Figure 29C:
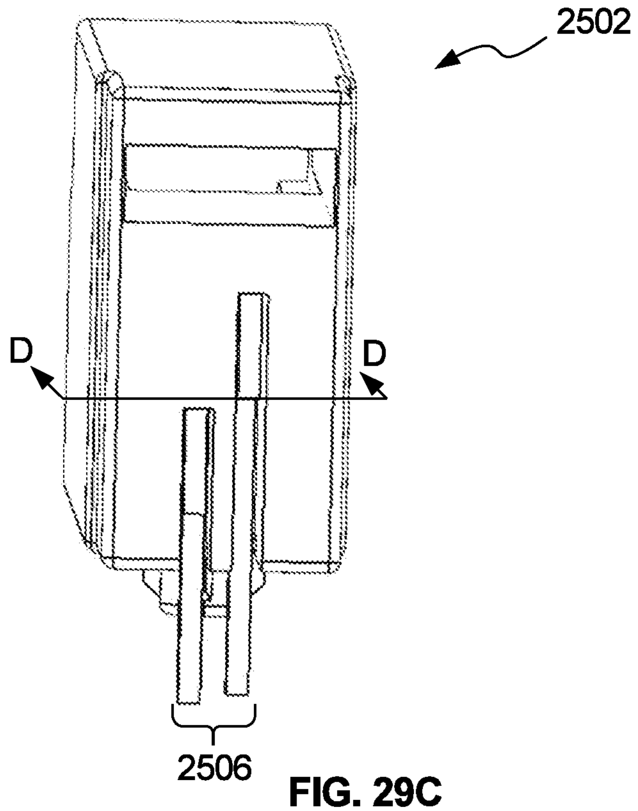
Figure 29D:
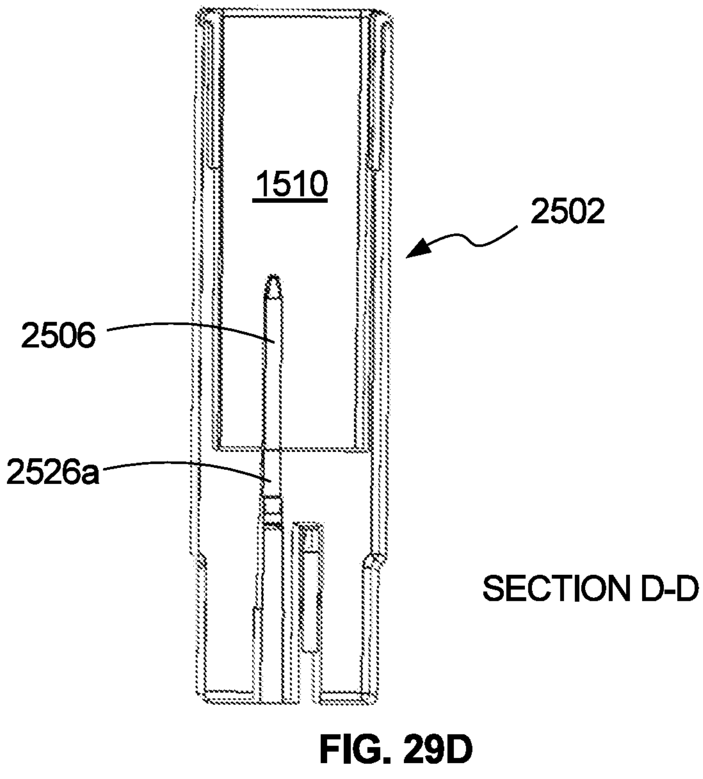

An example of a fixed connector 2500, suitable to mate with free connector 2300 is illustrated in FIGS. 28A-28B. The fixed connector 2500 generally includes a housing body 2502, a metal frame 2504 and a pair of pin contacts 2506*a*, 2506*b* (straight or bent for board mounting). A forward end 2503 and a rearward end 2505 further define the fixed connector 2500.

Referring to FIGS. 29A-29D, the housing body 2502 of the fixed connector 2500 includes a forward face 2509 and a forward central channel 2510 that receives the free connector 2300. The forward central channel includes a first side face 2514 and a second side face 2516 connected by an upper face 2518 and a lower face 2520. The extended height of the free connector 2300 prevents it from being inserted into a fixed LC fiber optic connector. A chamfer 604 and a panel 606 as described above can be used as a key to prevent a free LC fiber optic connector from being inserted into a fixed connector 2500. A notch 2523 is provided within the housing body 2502 to interface with the cantilevered latch 2330 of the free connector 2300. Further, side recesses 2525 in each of first side face 2514 and second side face 2516 serve as an interface element for the metal frame 2504; the use of a recessed interface element in one or more of the faces enables the ability to maintain desired dimensions of the channel 2510 so as not to interfere with insertion of the free connector 2300. A mounting pin 2527 extends from the housing body 2502 and through the metal frame 2602 for circuit board mounting of the connector 2500.

The housing body 2502 of the fixed connector 2500 includes first and second openings 2526 and 2528 to channels (e.g., channel 2526*a* in FIG. 29D) into which the pin contacts 2506*a*, 2506*b* are inserted; when fully inserted, the pin contacts 2506*a*, 2506*b* extend into the forward central channel 2510. The horizontal and vertical center-line to center-line spacing of the first and second openings 2526, 2528 correspond to the spacing of the free connector 2300 (see FIG. 24C).

Figure 30A:
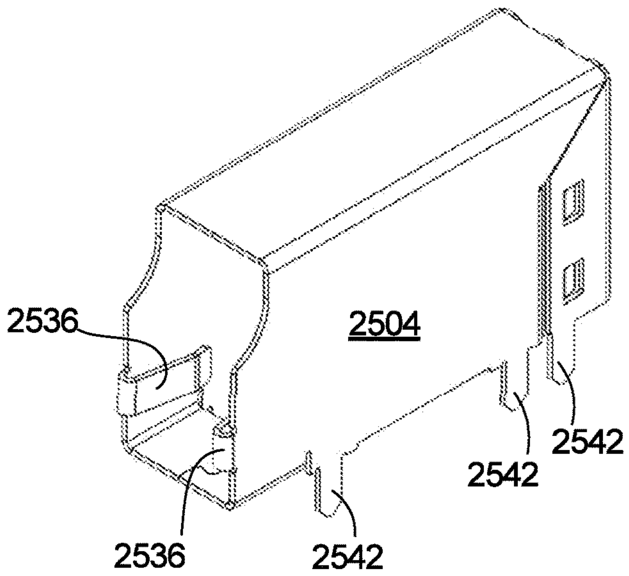
FIGS. 30A-30C include a forward side perspective view of a metal frame of the fixed connector of FIG. 28A, a front view of the metal frame and a rear side perspective view of the metal frame, respectively.
Figure 30B:
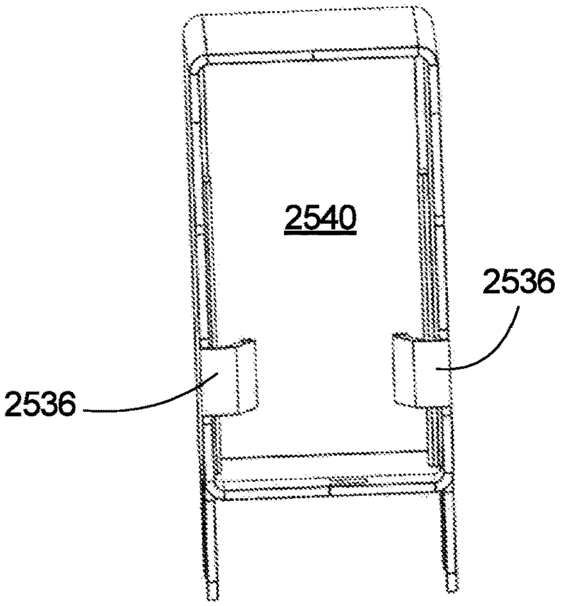
Figure 30C:
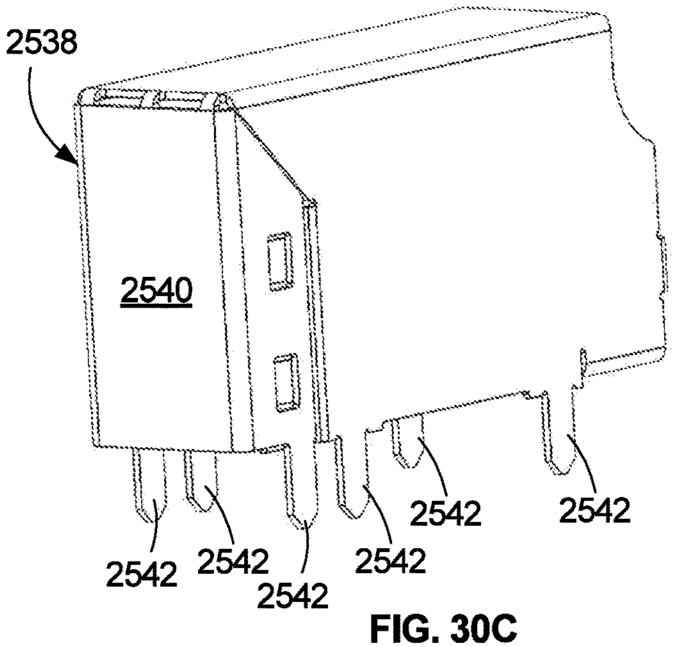

Referring to FIGS. 30A-30C, the metal frame 2504 of the fixed connector 2500 is a metal shell having a forward face 2533 and a central cavity 2534 that is slideable over the housing body 2502. The metal frame 2504 includes a first side face 2508 and a second side face 2510 connected by an upper face 2512 and a lower face 2514. The metal frame 2504 is held in place about the housing body 2502 through use of a pair of clips 2536 that interface with the side recesses 2525. When free connector 2300 is inserted into the fixed connector 2500 the metal flex tabs 2342 of the metal frame 2304 respectively interface with the metal clips 2536 of the fixed connector 2500. In certain embodiments, a back face 2538 of the metal frame is enclosed with a back panel 2540 while in other embodiments that back face 2538 is left open. Further, in certain embodiments, the metal frame 2504 is provide with one or more shield pins 2542 that are insertable into vias in an application where the fixed connector 2500 is board mounted. The metal frame 2504 is not in contact with the electrical contacts 2506*a*, 2506*b*. The metal frame 2504 helps to prevent alien crosstalk between multiple fixed connectors 2500 that are in close proximity to one another, e.g., in a high density connector panel.

Figure 31A:
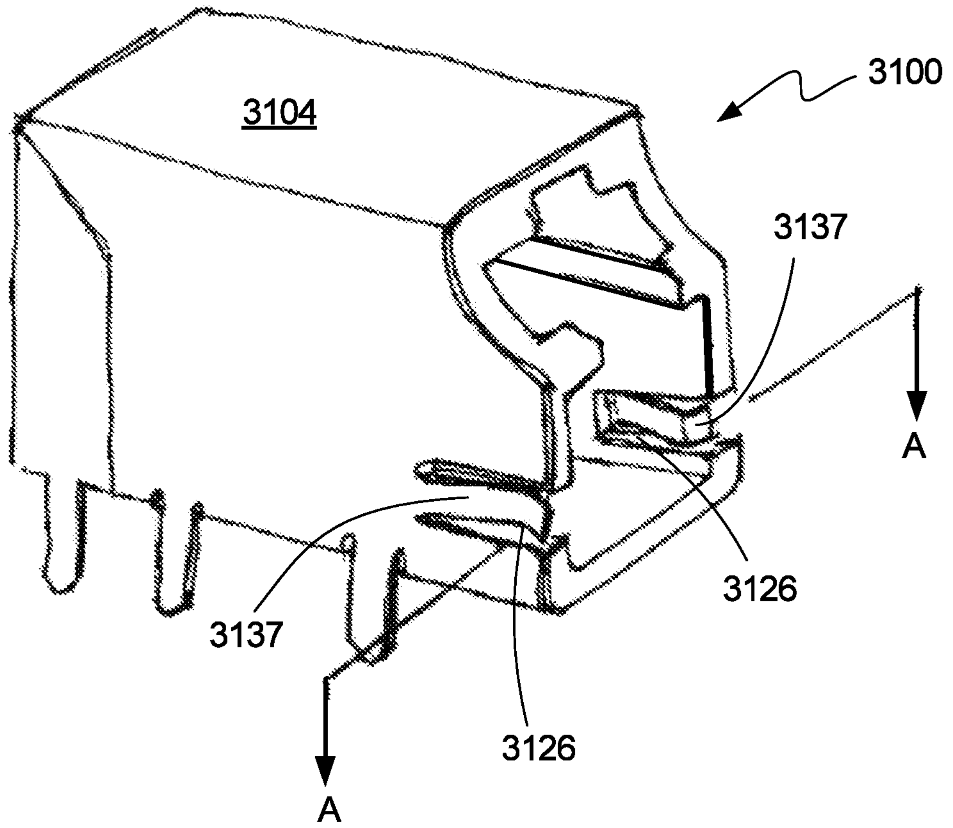
FIGS. 31A-31B include a forward side perspective of an embodiment of a fixed connector and a sectional view of the fixed connector taken along line A-A of FIG. 31A.
Figure 31B:
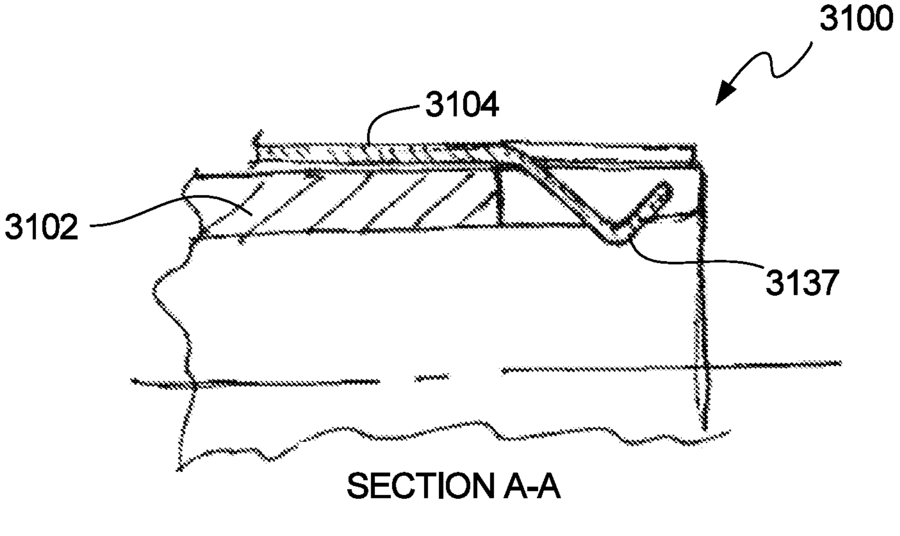

The pin contacts 2506*a*, 2506*b* of the fixed connector 2500 correspond to the pin contacts 1002. Referring back to FIGS. 10A-10B, each pin contact 1002 includes a forward portion 1020 and a rear portion 1022 that can be electrically coupled to a conductor, e.g. conductor 10, in any suitable manner. The forward portion 1020 includes a first tapered face 1024 and a second tapered face 1026 opposite the first tapered face 1024. The forward portion 1020 further includes first and second tapered sides 1028, 1030 that connect the first tapered face 1024 and second tapered face 1026 to form a four-sided pyramid shape with a flattened apex 1027; the flattened apex 1027 having a rectangular or square cross-section. In certain examples, the first and second sides tapered sides 1028, 1030 have bases that are narrower or wider than the bases of the first and second tapered faces 1024, 1026 thereby providing the rear portion 1022 of the pin contact 1002 with a rectangular cross-section while in other examples all sides and faces have equivalent bases providing the rear portion 1022 of the pin contact 1002 with a substantially square cross-section. A rectangular or square cross-section provides the rear portion 1022 of the pin contact 1002 a broader surface to make contact with the tuning fork receptacle contact 1000 should either the pin contact 1002 or the tuning fork receptacle contact 1000 become bent or warped in some way that might alter their original alignment. However, in certain embodiments the pin contact 1002 is of a circular or oval cross-section. In certain embodiments, the pin contact 1002 is provided with a bullet-nose forward portion 1020 rather than the pyramid-style forward portion 1020 that is illustrated FIGS. 31A-31B illustrate another embodiment of a fixed connector 3100. As with the fixed connector 2500, the fixed connector 3100 includes a housing body 3102, a metal frame 3104 and a pair of pin contacts (not shown). However, in the illustrated embodiment, the side recesses 2525 of the fixed connector 2500 comprise open slots 3126 in the fixed connector 3100. Further, in the illustrated embodiment, the metal clips 2536 of the metal frame 2504 instead comprise tension beams 3137 that flex outward to accommodate insertion of the free connector 2300 then return inward, through open slots 3126, to contact the metal flex tabs 2342 of the metal frame 2304 of the free connector 2300.

Figure 32:
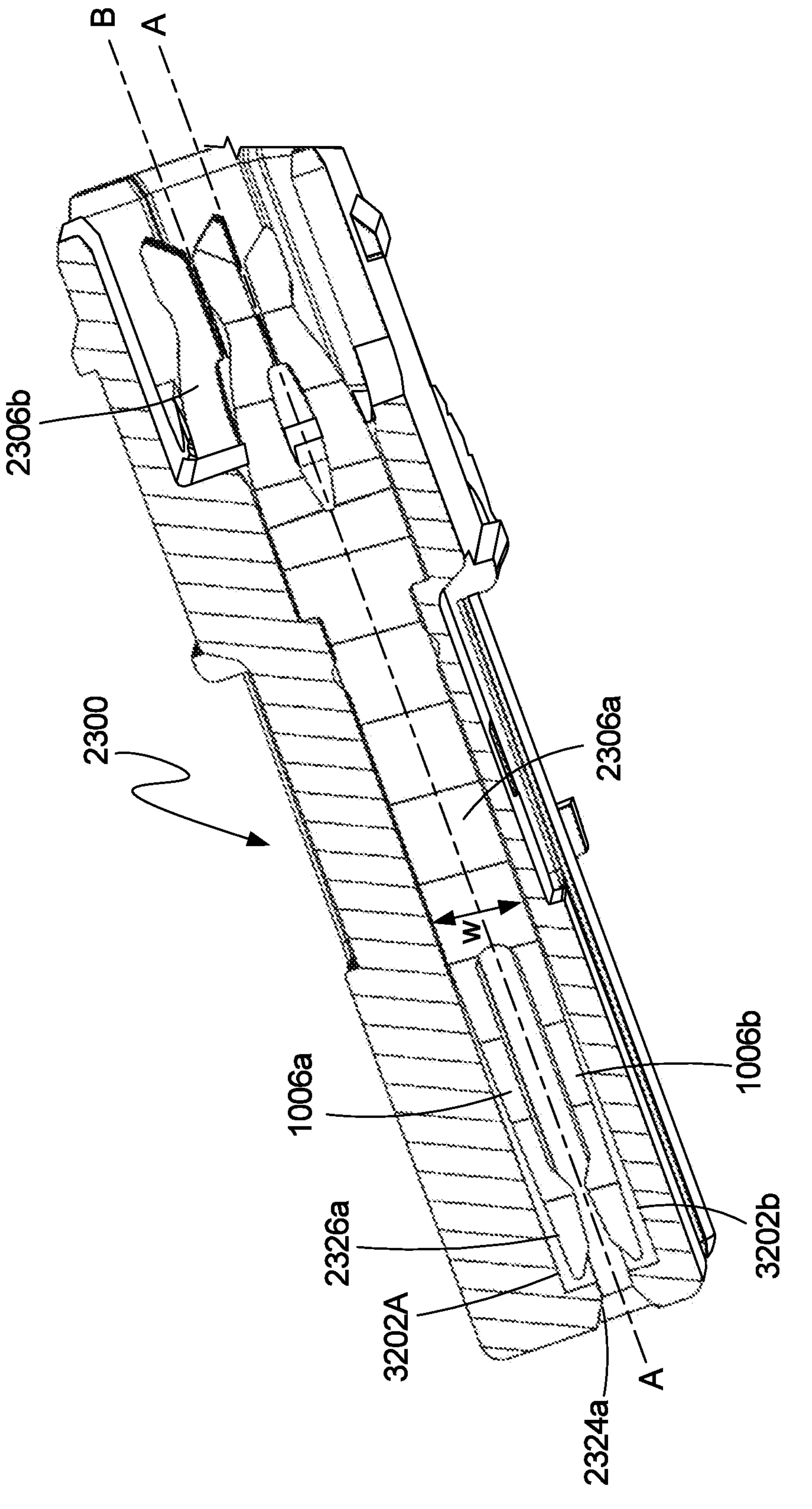
FIG. 32 is a sectional view of an embodiment of free connector illustrating a tuning fork receptacle contact.

Referring now to FIG. 32, a sectional view of the free connector 2300 is provided to illustrate the orientation of the tuning fork receptacle contacts 2306*a*, 2306*b* relative to the free connector 2300 itself. As shown, tuning fork receptacle contact 2306*a* has a width w that is transverse (approximately perpendicular) to an elongate axis of the free connector 2300, e.g. elongate axis A indicated by the dashed line. Tuning fork receptacle contact 2306*b* similarly has a corresponding width w (not shown) that is transverse (approximately perpendicular) to another elongate axis of the free connector 2300, e.g. elongate axis B indicated by the dashed line. Also illustrated in the sectional view of free connector 2300 is the is the pin contact opening 2324*a* and the contact receiving channel 2326*a*. The contact receiving channel 2326*a* allows for width-wise expansion of the spring arms 1006*a*, 1006*b* to receive one of pin contacts 2506*a* yet also provides side channels walls 3202*a*, 3202*b* that serve to contain and limit the maximum expansion of the spring arms 1006*a*, 1006*b*. In certain embodiments, the tuning fork receptacle contacts 2306*a*, 2306*b* are rotated by 90 deg. from that show in FIG. 32, such that the width w of the tuning fork receptacle contacts 2306*a*, 2306*b* are perpendicular to the illustrated width (contact receiving channels 2326*a*, 2326*b* are modified to accommodate the rotated position). In certain embodiments, the tuning fork receptacle contacts 2306*a*, 2306*b* are rotated from the illustrated position to an angle less than 90 deg. such that the tuning fork receptacle contacts 2306*a*, 2306*b* provide a slanted presentation.

Figure 33A:
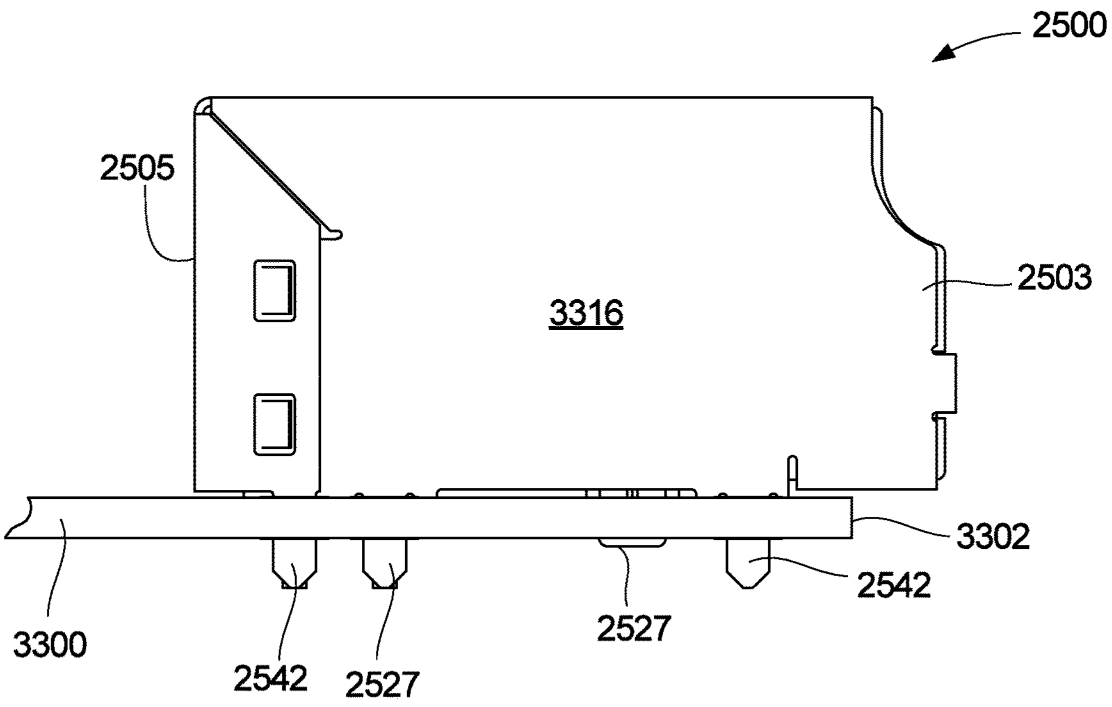
FIGS. 33A-33D provide a side view of a fixed connector mounted to a circuit board, a front view of a plurality of fixed connectors mounted to the circuit board, a top view of the circuit board and a bottom view of the circuit board, respectively.
Figure 33B:
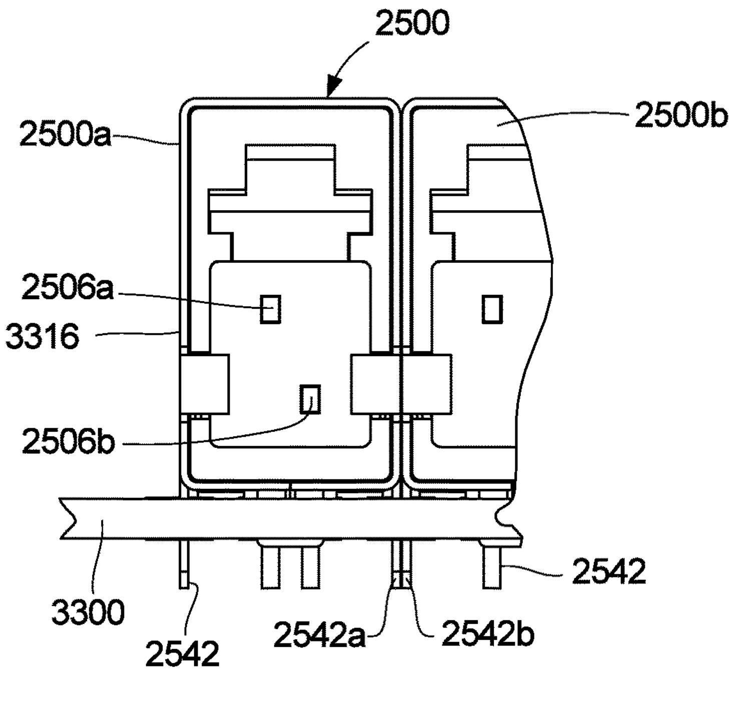
Figure 33C:
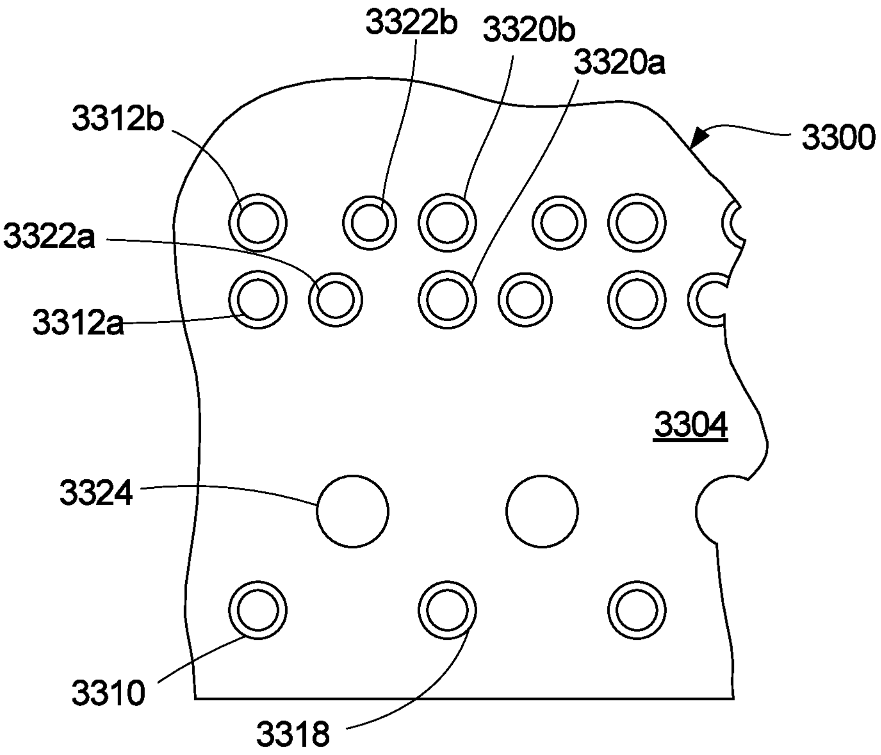
Figure 33D:
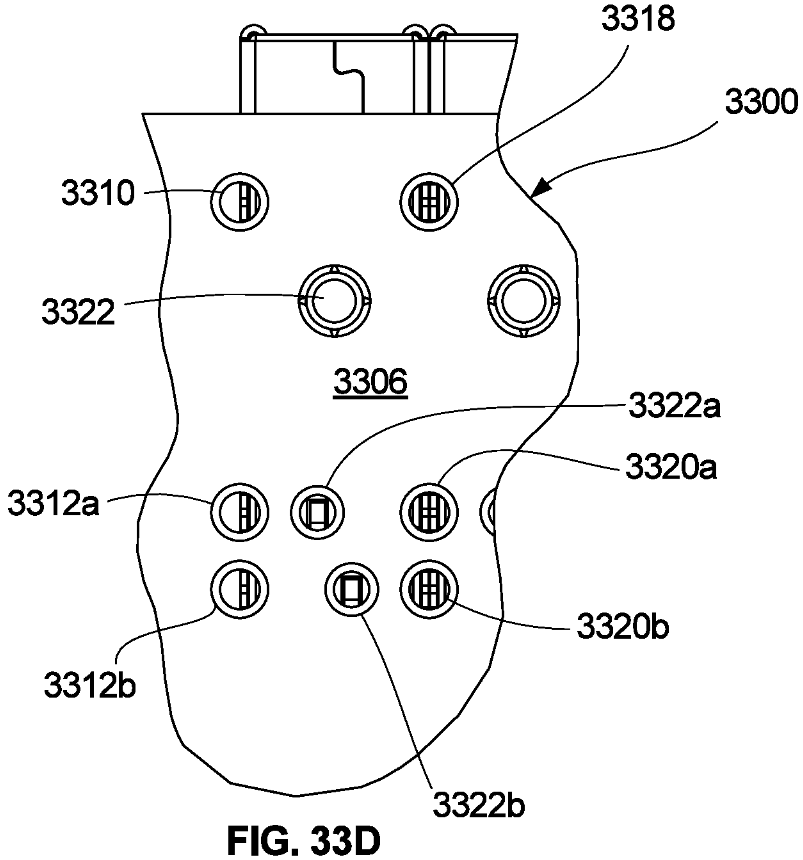

FIGS. 33A-33D illustrate the fixed connector 2500 in a board-mounted configuration with forward face 2503 and rearward face 2505 substantially perpendicular to a plane defined by the circuit board 3300; the forward face 2503 of the fixed connector 2500 extends beyond a forward face 3302 of the circuit board 3300. Mounting pin 2527 extends into the circuit board 3300 as do shielding pins 2542. In the illustrated configuration, the fixed connector 2500 includes three shielding pins 2542 along each elongate side for a total of six shielding pins 2542 per fixed connector 2500. However, a greater or fewer number of shielding pins 2542 can be used as appropriate to the application. FIG. 33B illustrates two fixed connectors 2500*a* and 2500*b* in a side-by-side configuration such that shielding pins 2542*a* and 2542*b* share a common via. FIG. 33C illustrates a top surface 3304 of the circuit board 3300 while FIG. 33D illustrates a bottom surface 3306 of the circuit board 3300. As shown, the circuit board 3300 includes a first forward via 3310 aligned with two rearward vias 3312*a*, 3312*b* to accommodate the three shielding pins 2542 along a first side 3316 of the fixed connector 2500. A second forward via 3318 (aligned in a first direction with forward via 3310) is aligned in a second direction with two rearward vias 3320*a*, 3320*b* (vias 3320*a*, 3320*b* are aligned in the first direction with vias 3312*a* and 3312*b*). Further, aligned with vias 3312*a* and 3320*a* in the first direction, is a pin via 3322*a* to receive pin contact 2506*a*, and, aligned with vias 3312*b* and 3320*b* in the first direction, is a pin via 3322*b* to receive pin contact 2506*b*; alignment of "a" vias and "b" vias, along with the alignment of their respective shielding pins 2542 and pin contacts 2506*a*, 2506*b* work to cancel the magnetic flux generated by the current flowing though pin contacts 2506*a* and 2506*b* of the fixed connector 2500 when coupled with the free connector 2300. Further, the resultant alignment of the shielding pins 2542 and pin contacts 2506*a*, 2506*b* provides inductive cancellation of alien crosstalk between side-by-side mated connectors. Note that each of the vias comprise a plated thru-hole. A non-plated thru hole 3324 is additionally provided in the circuit board 3300 to receive mounting pin 2527 of the fixed connector 2500. Also note that vias 3318, 3320*a*, 3320*b* serve as vias for fixed connector 2500*b*.

Each of pin contacts 2506*a*, 2506*b*, though offset in both the x- and y-direction, are designed to be of the same length and have a return loss that is maximized by being matched to the return loss of the conductors (e.g. conductors 12, 14); in certain embodiments, this return loss is approximately 50 ohms. In certain preferred embodiments, there is a 6.6 mm pitch between side-by-side fixed connectors 2500.

Figure 34A:
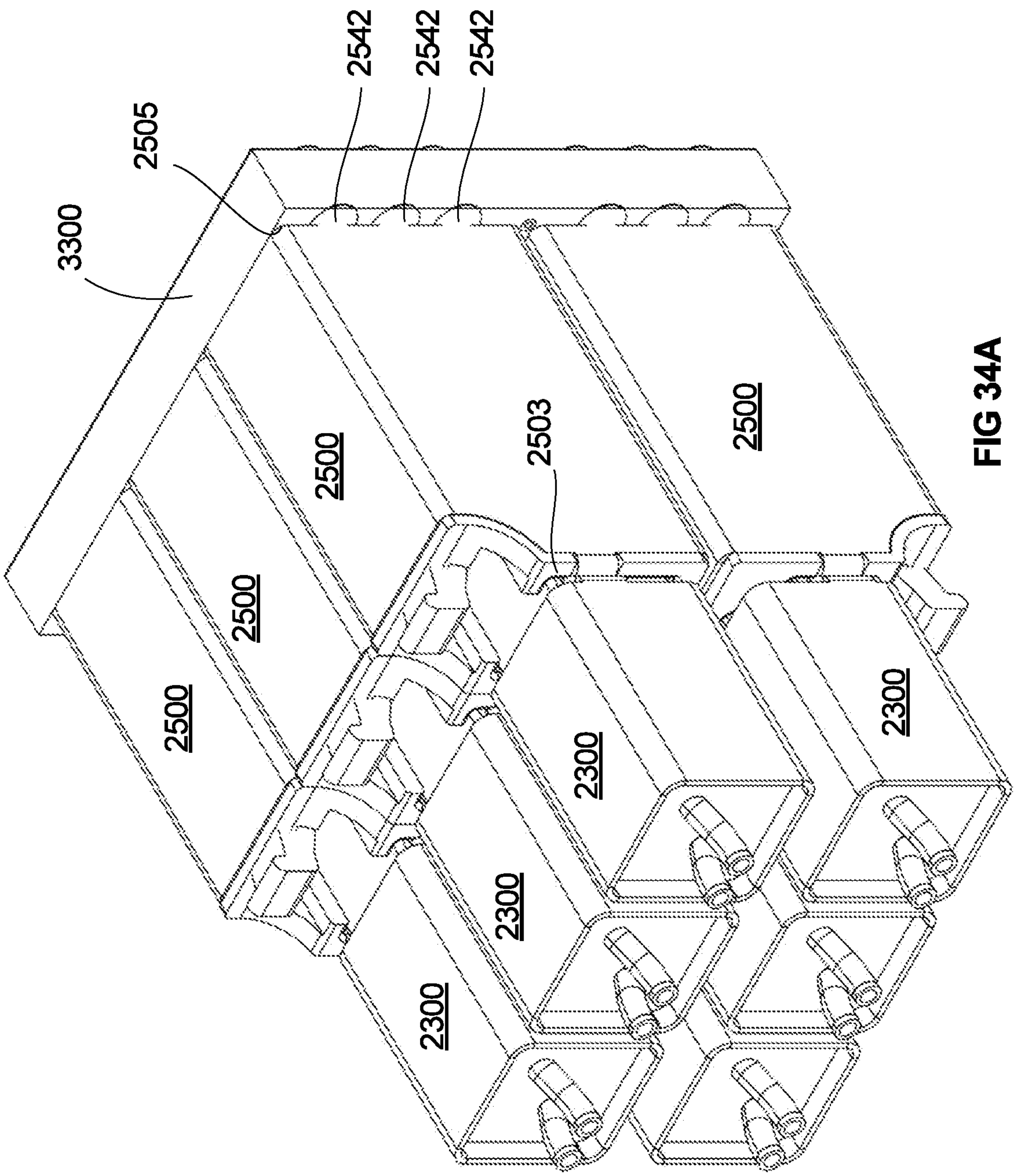
FIGS. 34A-34B provide a forward and rearward perspective views, respectively, of a plurality of mated free and fixed connectors with the fixed connectors mounted to a circuit board and a forward face of the fixed connector being parallel to the circuit board.
Figure 34B:
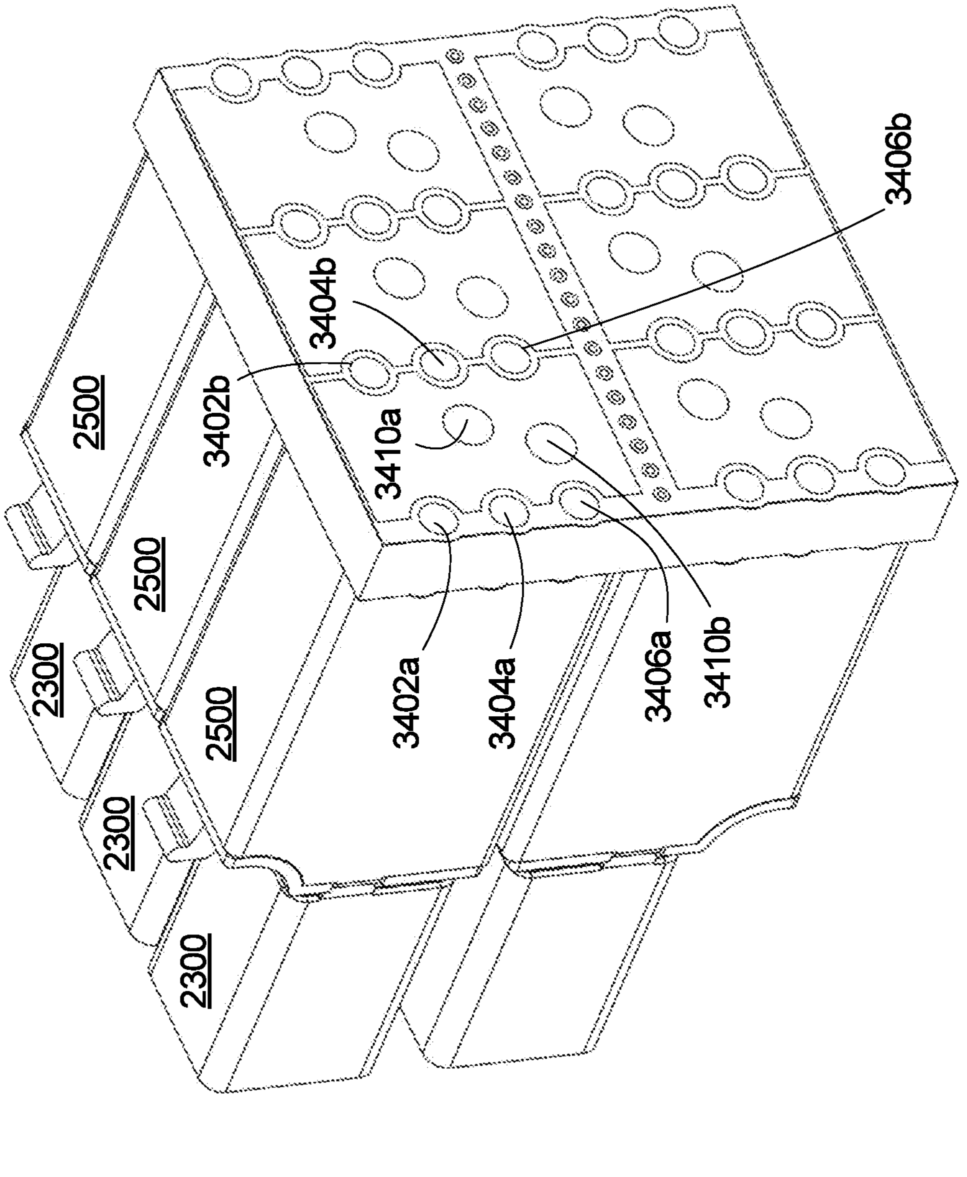

FIGS. 34A-34B provide perspective views of a plurality of free connectors 2300 mated with fixed connectors 2500 in a plurality of rows and columns. However, in this instance, the rows and columns of fixed connectors present their forward face 2503 in an orientation that is parallel, rather than perpendicular, to the circuit board 3300. As such the rearward face 2505 of the fixed connector is coupled to the circuit board through shielding pins 2542 and corresponding aligned plated vias 3402*a*, 3404*a*, 3406*a* (aligned in the y-direction). Plated vias 3402*b*, 3404*b*, 3404*c* are also aligned in the y-direction and are shared with a neighboring fixed connector 2500. Plated pin via 3410*a* receives one of the pin contacts 2506*a* and is aligned in the x-direction with vias 3404*a* and 3404*b*. Plated pin via 3410*b* receives the other of the pin contacts 2506*b* and is aligned in the x-direction with vias 3406*a* and 3406*b*. As with the embodiment of FIGS. 33A-33B the shielding pins 2542 of the fixed connector 2500 help to prevent alien crosstalk between adjacent mated connector pairs.

Figure 35B:
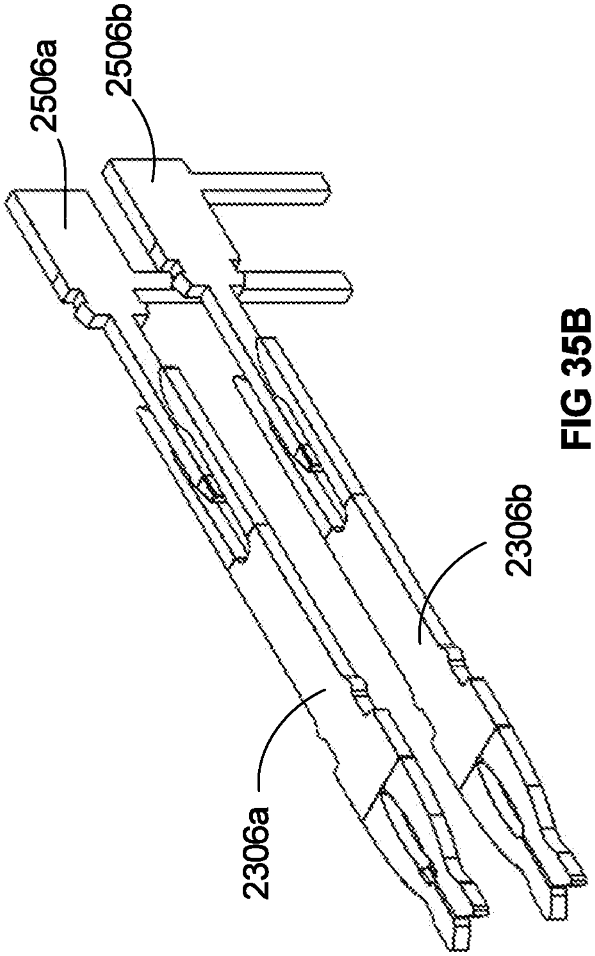
FIGS. 35A-35B illustrate a perspective view of the free connector contacts receiving the fixed connector in a partially inserted and a fully inserted position, respectively.
Figure 35A:
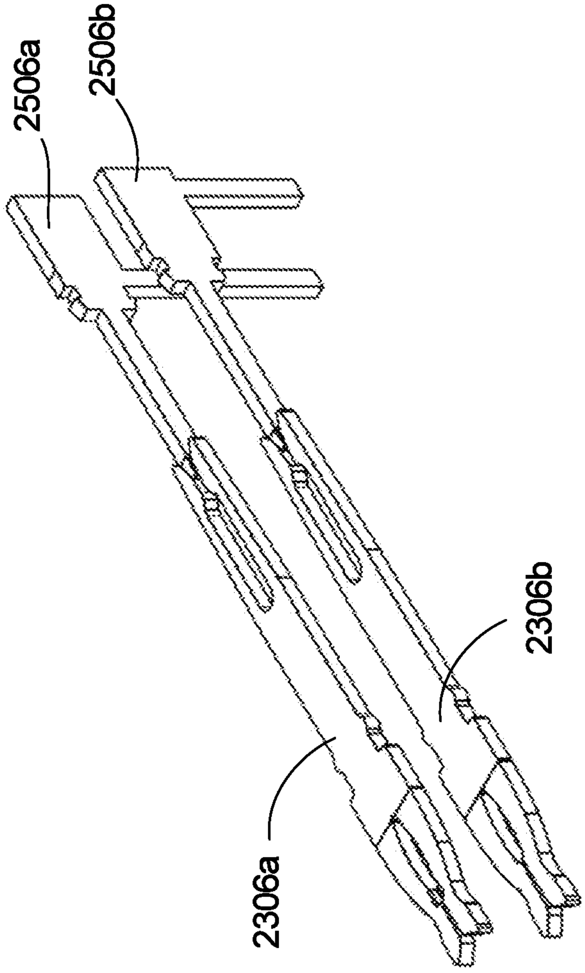
Figure 36A:
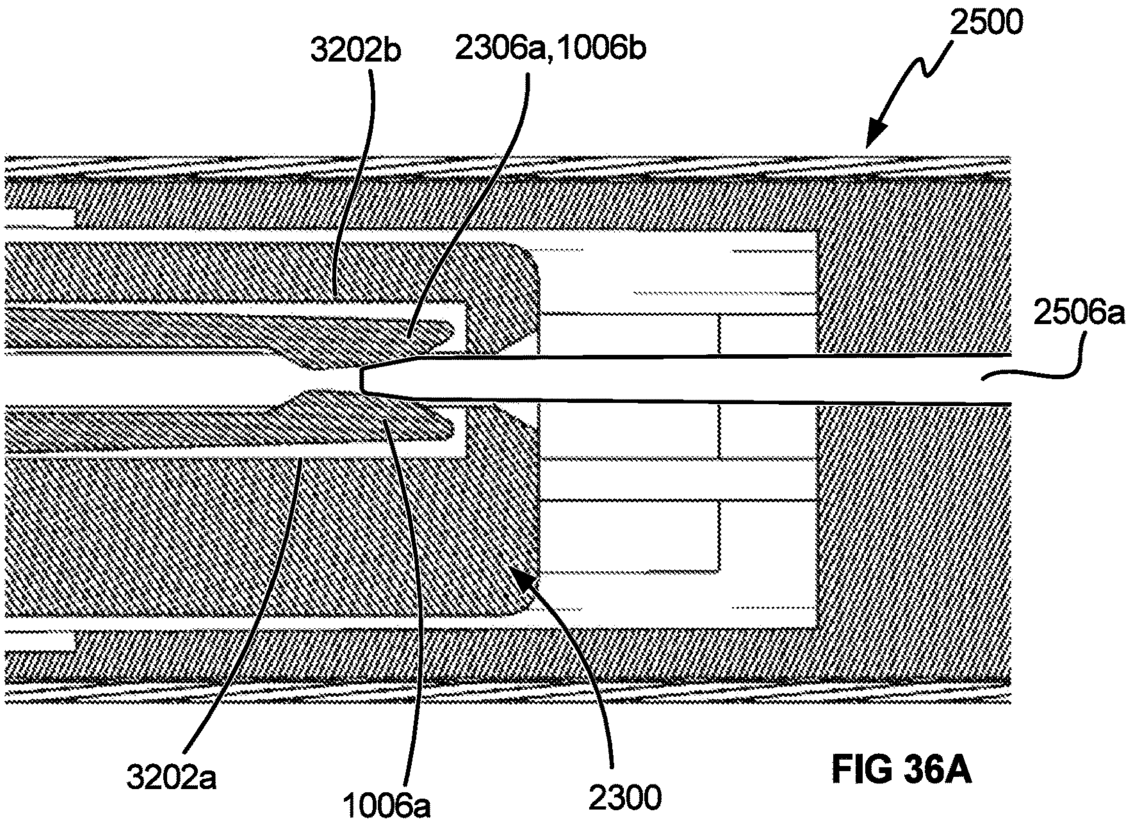
FIGS. 36A-36B illustrate side-sectional views of a free connector and a fixed connector with the contacts of the fixed connector being received in the free connector in a partially inserted and fully inserted position, respectively.
Figure 36B:
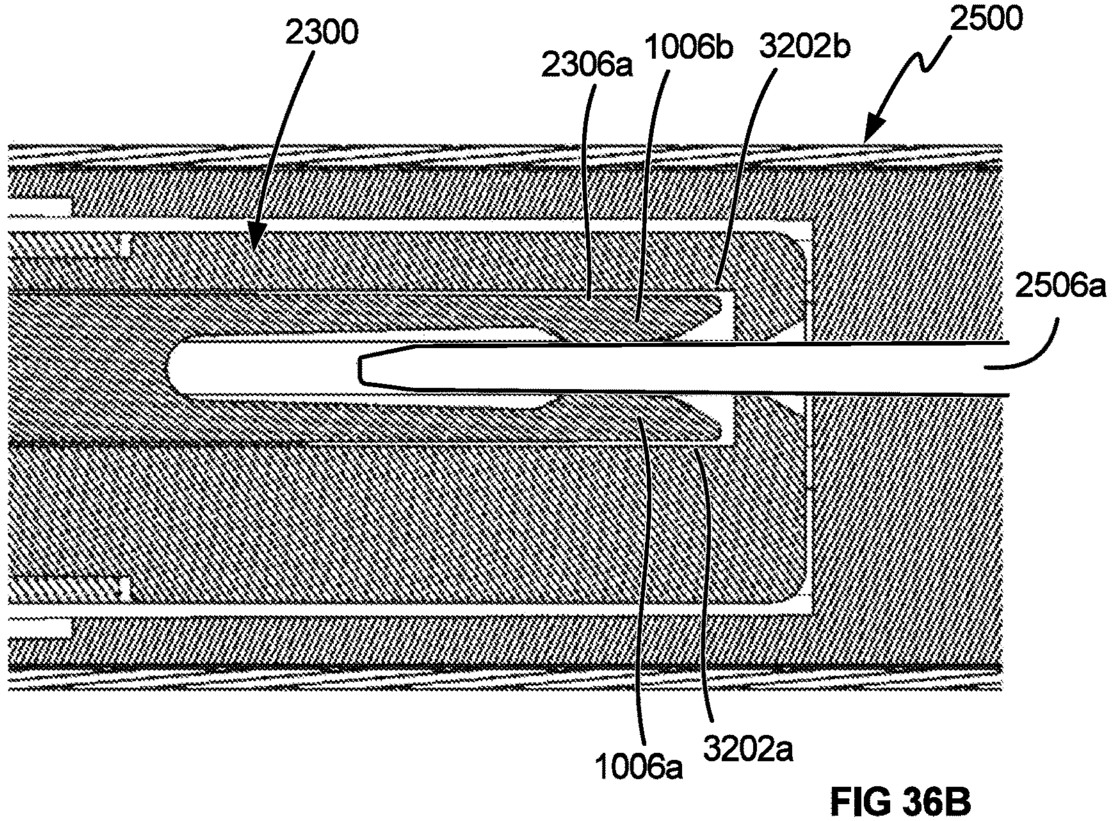
Figure 37A:
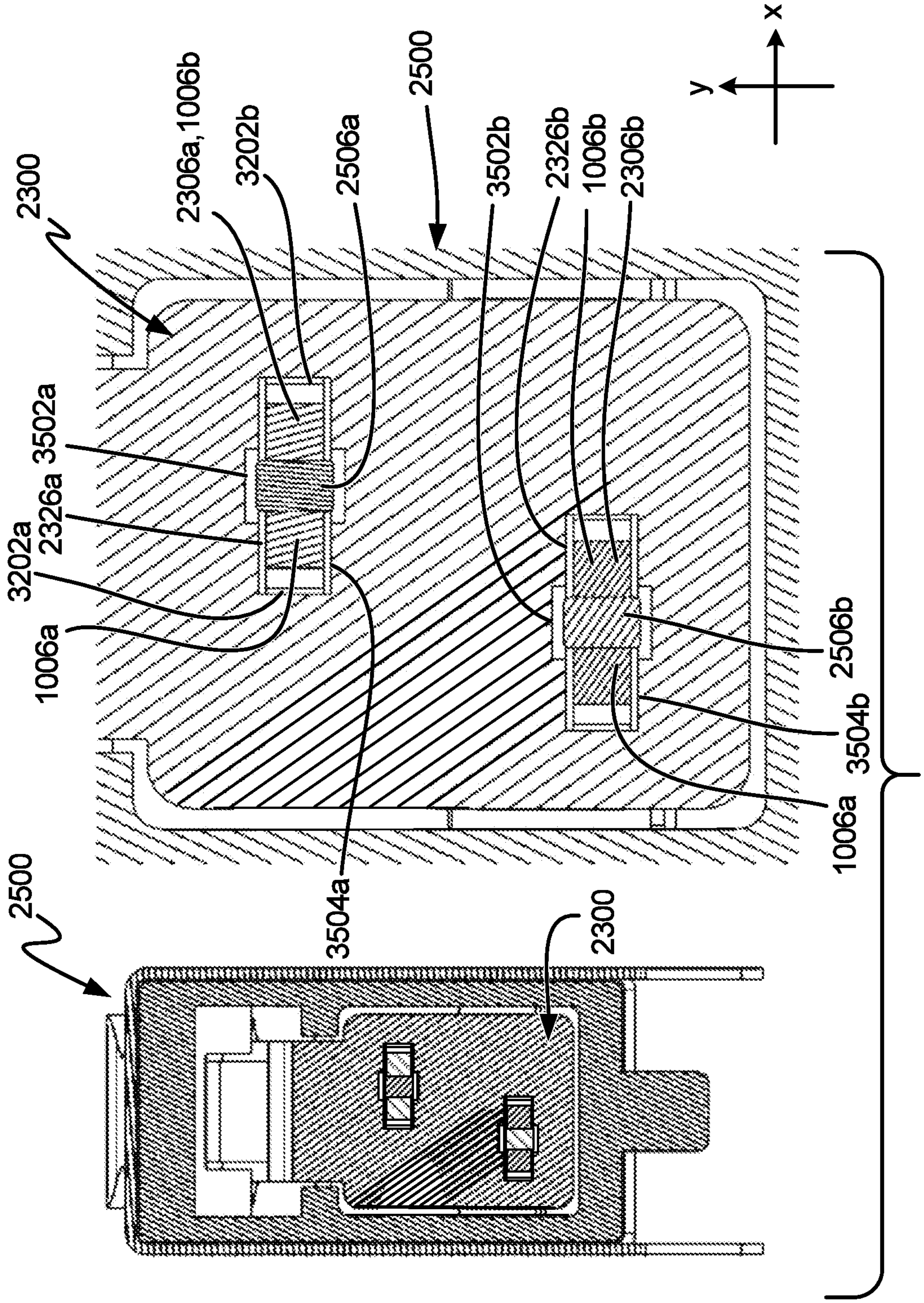
FIGS. 37A-37B illustrate front sectional views of a free connector and a fixed connector with contacts of the fixed connector being received in the free connector in a partially inserted and fully inserted position, respectively.
Figure 37B:
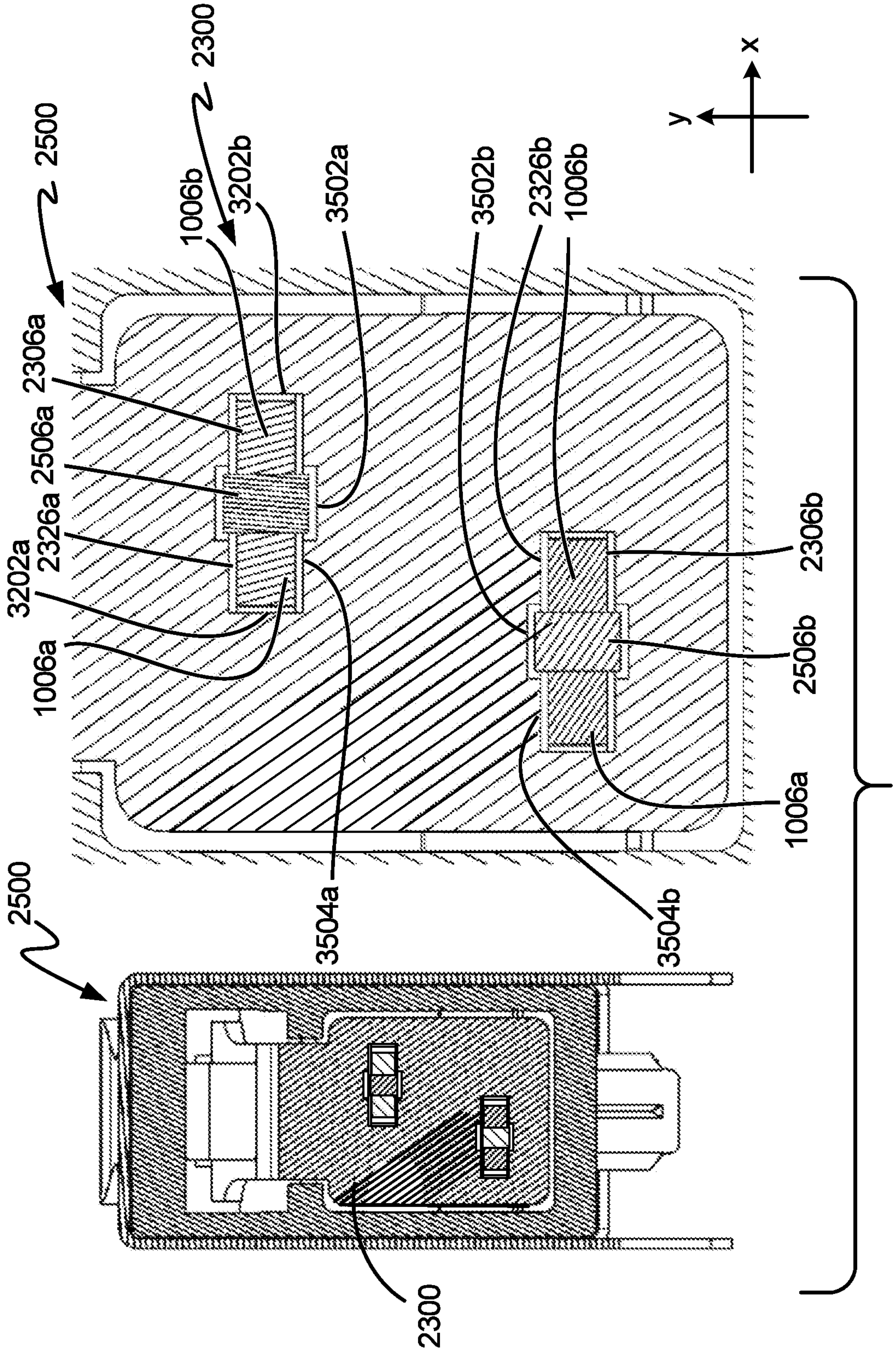

FIGS. 35A-35B, 36A-36*b* and 37A-37B help to illustrate the movement of the spring arms 1006*a*, 1006*b* of each of tuning fork receptacle contacts 2306*a*, 2306*b* as pin contacts 2506*a*, 2506*b* are inserted/withdrawn (i.e., the free connector 2300 is mated with the fixed connector 2500). Each "A" figure illustrates the pin contacts 2506*a*, 2506*b*, as they are partially inserted and each "B" figure illustrates the pin contacts 2506*a*, 2506*b* as being fully inserted within tuning fork receptacle contacts 2306*a*, 2306*b*. FIGS. 35A-35B illustrate the tuning fork receptacle contacts 2306*a*, 2306*b* and pin contacts 2506*a*, 2506*b* with the structure of the free connector 2300 and fixed connector 2500 removed. FIGS. 36A-36*b* provide a top cross-sectional view of the free connector 2300 and fixed connector 2500 illustrating how the side walls 3202*a*, 3202*b* contain the spring arms 1006*a*, 1006*b* of the tuning fork receptacle contact 2306*a* and force the spring arms 1006*a*, 1006*b* to maintain contact with pin contact 2506*a* (see FIG. 36*b*). FIGS. 37A-37B provide a forward cross-sectional view of the free connector 2300 and fixed connector 2500. As shown the, contact receiving channels 2326*a*, 2326*b* have cross-shaped cross-section such that a central portion 3502*a*, 3502*b* of the cross-shape has a height in the y-direction that is greater than a height in the y-direction of an elongate portion 3504*a*, 3504*b* of the cross-shape. The greater height of the central portion 3502*a*, 3502*b* accommodates a height in the y-direction of the pin contact 2506*a*, 2506*b* which extends beyond (above and below) a height in the y-direction of the spring arms 1006*a*, 1006*b* of each of the tuning fork receptacle contacts 2306*a*, 2306*b*.

It should be noted that, while free connector 2300 is described as using a tuning fork receptacle contact 2306, various other types of electrical contacts may also be used to interface with the pin contacts 2506 of the fixed connector 2500. For example, a socket contact, a beam contact, an arched beam contact, a single spring arm contact, etc. might be used.

Figure 39:
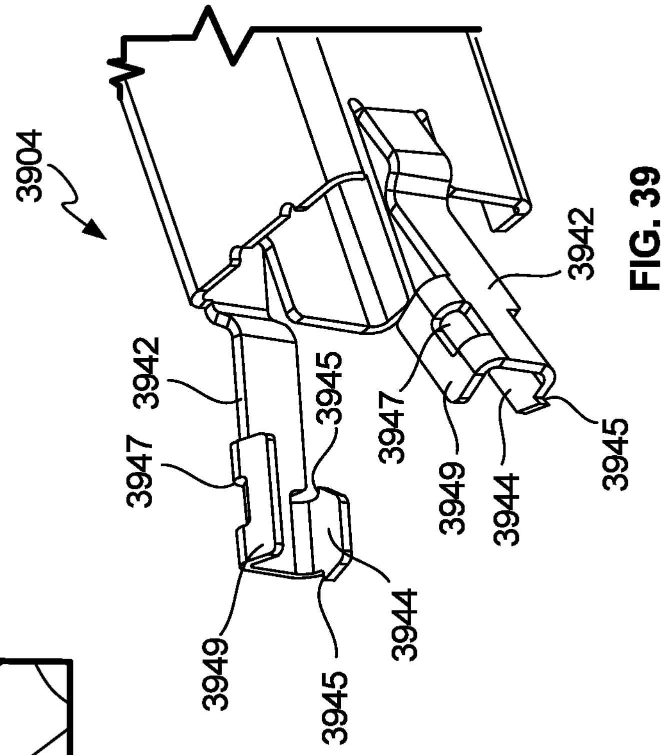
FIG. 39 is a perspective view of an alternative embodiment of a metal frame of a free connector.
Figure 38:
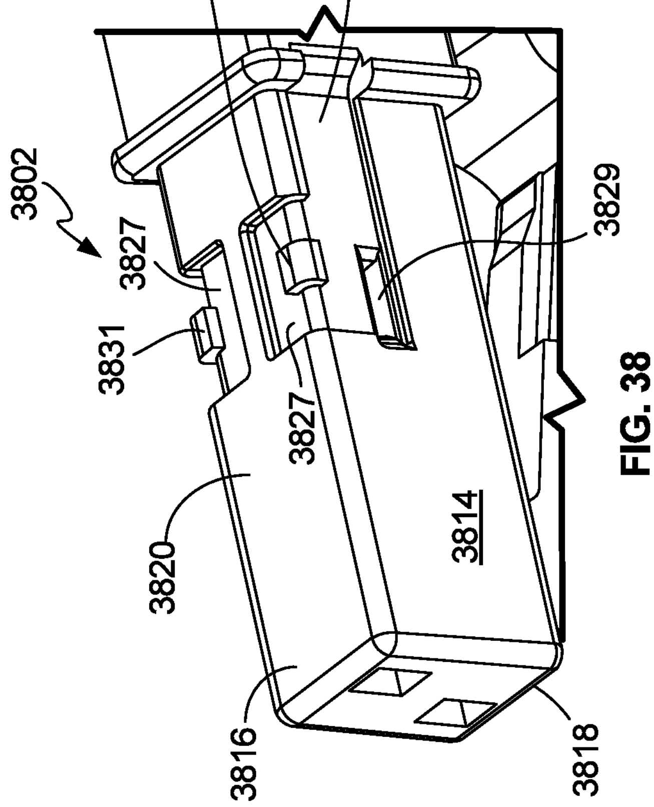
FIG. 38 is a perspective view of an alternative embodiment of a forward connector body of a free connector.

Referring to FIGS. 38 and 39, alternative embodiments of the forward connector body and the metal frame of the free connector 2300 are illustrated.

FIG. 38 illustrates a forward connector body 3802 that includes a first side face 3814 and a second side face 3816 connected by an upper face 3618 and a lower face 3820. The forward connector body 3802 additionally includes a recess 3828 in each of the first and second side faces 3814, 3816 that extends to and includes a recessed portion 3827 in the lower face 3820. A projection 3831 remains within the recess 3828/recessed portion 3827. A recessed notch 3829 comprises a blind hole extending into the forward connector body 3802.

FIG. 39 illustrates a metal frame 3904 having a pair of flex tabs 3942 that interface with the recess 3828 and recessed portion 3827 on each respective side of the forward connector body 3802. Each of the flex tabs 3942 includes an inward facing tab 3944 having a blunted arrow-head shape such that a flared edge 3945 is present on each side of the inward facing tab 3944. The inward facing tab 3944 of each flex tab 3942 interfaces with a respective recessed notch 3829 in the forward connector body 3802; the flared edge 3945 is a retaining feature that embeds within the forward connector body 3802 thereby helping to retain the inward facing tab 3944 within the recessed notch 3829 and helping to ensure that the metal frame 3904 remains coupled to the forward connector body 3802. Each of the flex tabs 3942 is additionally provided a second retaining feature in the form of a retaining loop 3949 that defines an opening 3947. The retaining loop 3949 is received within the recessed portion 3827 of the forward connector body 3802 while the opening 3947 of the retaining loop 3949 receives the projection 3831 of the forward connector body 3802; the interface of the opening 3947 of the retaining loop 3949 and the projection 3831 of the forward connector body further help to ensure that the metal frame 3904 remains coupled to the forward connector body 3802. The inward facing tab 3944 and the retaining loop 3949 of each flex tab 3942 are substantially parallel to one another and are each substantially perpendicular to an elongate axis of their respective flex tab 3942.

In certain embodiments, the metal frame 3904 is stamped from metal resulting in flex tabs 3942 that extend outward and away from the main body of the metal frame 3904 when the main body is formed. The flexibility/springiness of the metal enables the flex tabs 3942 to be pulled inward during assembly of the free connector 2300 and secured to the forward connector body 3802 with retaining features described above.

In certain embodiments, an adhesive or other bonding agent can be used additionally (or alternatively) to secure the various metal frame embodiments described herein to the various forward connector bodies described herein.

Figure 40C:
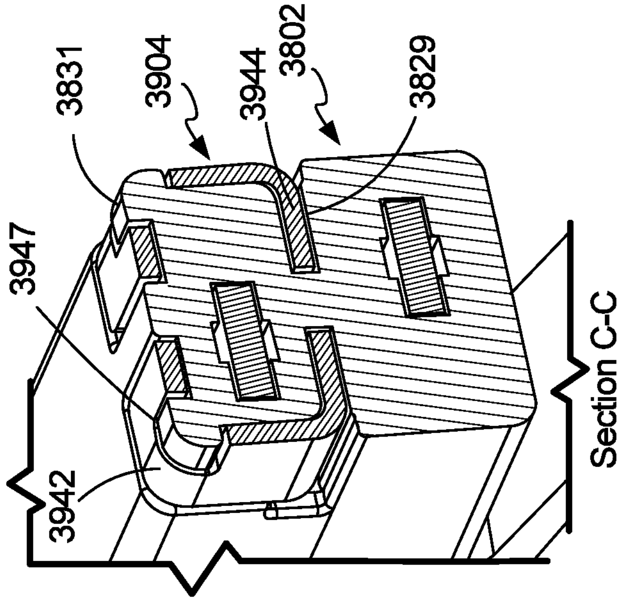
FIGS. 40A-40C illustrate a partially assembled, assembled and cross-sectional assembled perspective views, respectively, of the forward connector body and metal frame of FIGS. 38 and 39.
Figure 40A:
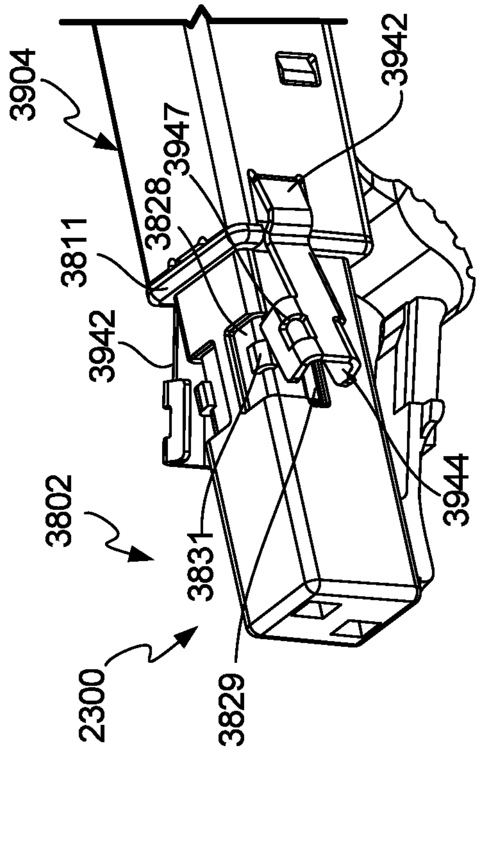
Figure 40B:
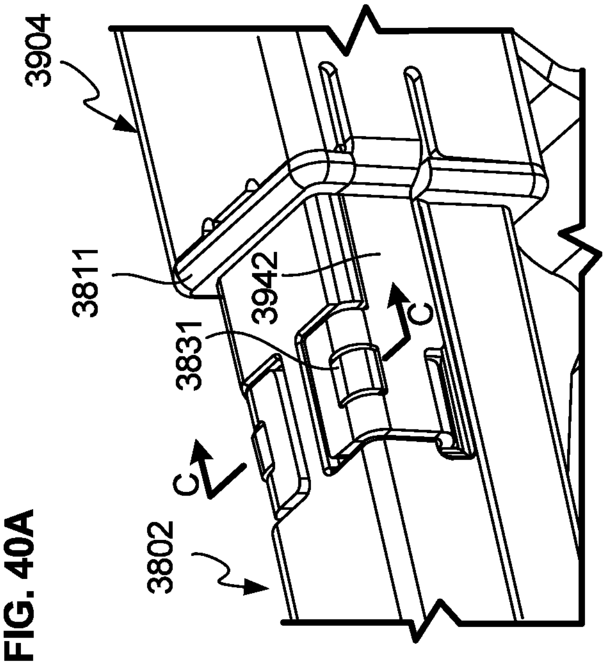

FIGS. 40A-40B illustrate the metal frame 3904 as it is assembled/coupled to the forward connector body 3802 of the free connector 2300 with the metal frame 3904 being loaded onto the forward connector body 3802 from the rear and the flex tabs 3942 extending outward via a fixed bend to accommodate a shoulder 3811 of the forward connector body 3802. FIG. 40B depicts the metal frame 3904 fully secured to the forward connector body 3802 via the interfacing inward facing tab 3944 and recessed notch 3829 as well as via the interfacing retaining loop 3949 and projection 3831. FIG. 40C provides a cross-sectional of the retaining interfaces between the metal frame 3904 and forward connector body 3802.

Figure 41B:
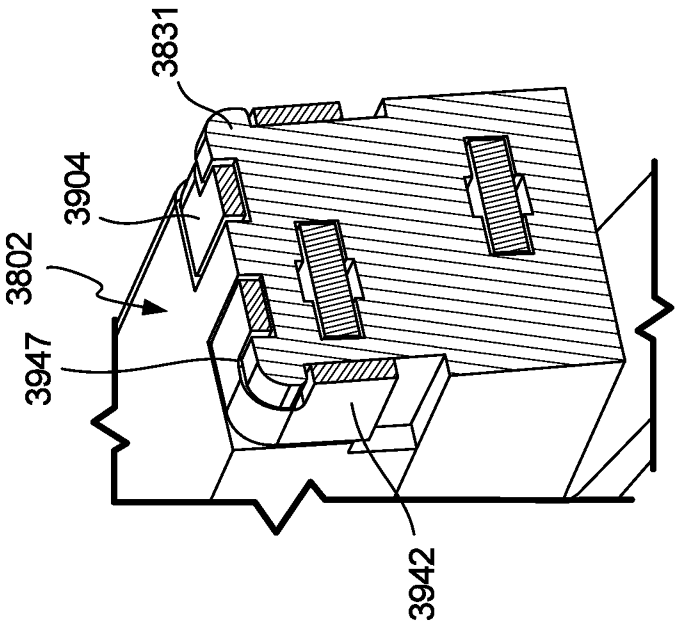
FIGS. 41A-41B comprise a perspective and cross-section perspective view, respectively, of a variation on the metal frame and forward connector body of FIGS. 38 and 39.
Figure 41A:
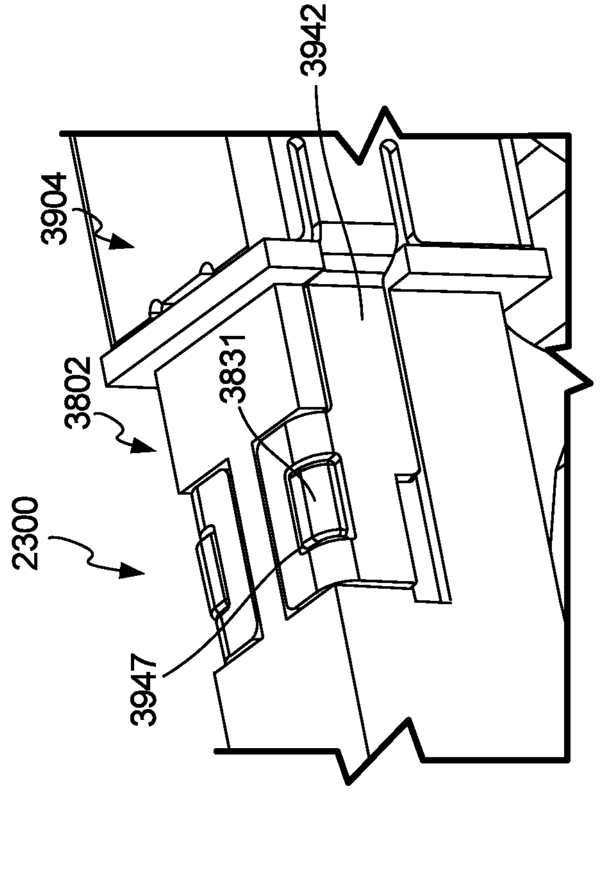

FIGS. 41A-41B illustrate a variation on metal frame 3904 and forward connector body 3802 of the free connector 2300. In this variation, the only retaining feature provided is that of the retaining loop 3949 of the flex tabs 3942 of the metal frame 3904 in combination with the projection 3831 of the forward connector body 3802; the inward facing tab 3944 of the flex tabs 3942 and the corresponding recessed notches 3829 within the forward connector body are eliminated.

It will be appreciated that aspects of the above embodiments may be combined in any way to provide numerous additional embodiments. These embodiments will not be described individually for the sake of brevity.

While the present invention has been described above primarily with reference to the accompanying drawings, it will be appreciated that the invention is not limited to the illustrated embodiments; rather, these embodiments are intended to disclose the invention to those skilled in this art. Note that features of one or more embodiments can be incorporated in other embodiments without departing from the spirit of the invention. In the drawings, like numbers refer to like elements throughout. Thicknesses and dimensions of some components may be exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, with out departing from the scope of the present invention. It will also be understood that the terms "tip" and "ring" are used to refer to the two conductors of a differential pair and otherwise are not limiting.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including" when used in this specification, specify the presence of stated features, operations, elements, and/or components, but do not preclude the presence or addition of one or more other features, operations, elements, components, and/or groups thereof.

Herein, the terms "attached", "connected", "interconnected", "contacting", "mounted" and the like can mean either direct or indirect attachment or contact between elements, unless stated otherwise.

Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

The invention claimed is:

1. A connector for exactly two conductors:

a forward connector body;

a rear connector body that interfaces with the forward connector body;

a metal frame surrounding at least a portion of both the forward connector body and the rear connector body, the metal frame including a shielding interface, wherein the metal frame is secured to the forward connector body with at least two retaining features; and exactly one pair of electrical contacts comprising a first electrical contact and a second electrical contact, the first and second electrical contacts extending from the rear connector body into the forward connector body, wherein the first electrical contact is electrically coupled to one of the exactly two conductors and the second electrical contact is electrically coupled to the other of the exactly two conductor;

wherein the metal frame includes a pair of flex tabs that each interface with a respective recess in the forward connector body, wherein each of the flex tabs includes an inward facing tab as one of the at least two retaining features, wherein the inward facing tab interfaces with a recessed notch in the forward connector body, wherein each of the flex tabs includes a retaining loop as another of the at least two retaining features, wherein the retaining loop interfaces with a projection extending from the recess of the forward connector body.

2. The connector of claim 1, wherein the inward facing tab includes a flared edge that embeds within the forward connector body when fully inserted in the recessed notch of the connector body.

3. The connector of claim 1, wherein each of the flex tabs includes a bend to accommodate a shoulder of the forward connector body.

4. The connector of claim 1, wherein the inward facing tab and the retaining loop are substantially parallel.

5. The connector of claim 4, wherein the inward facing tab and the retaining loop are substantially perpendicular to an elongate axis of the flex tabs.

6. A method of assembling a connector that includes a metal frame and a forward connector body, the method comprising:

rear loading the metal frame on the forward connector body until the metal frame abuts a shoulder of the forward connector body;

pushing an inward facing tab of a first flex tab of the metal frame into a first recessed notch of the forward connector body and securing a retaining loop of the first flex tab about a first projection of the forward connector body; and pushing an inward facing tab of a second flex tab of the metal frame into a second recessed notch of the forward connector body and securing a retaining loop of the second flex tab about a second projection of the forward connector body.

7. The method of claim 6, wherein each of the first and second inward facing tabs include flared edges, and wherein the flared edges embed within the forward connector body when the first and second inward facing tabs are fully pushed into the first and second recessed notches of the forward connector body.

8. The method of claim 6, wherein the forward connector body accommodates exactly two electrical contacts.

9. The method of claim 6, wherein each of the first and second flex tabs resides in a respective recess in the forward connector body when the respective inward facing tabs and respective retaining loops of the metal frame are fully pushed and fully secured to the forward connector body.

10. The method of claim 9, wherein the first and second flex tabs of the metal frame residing in the respective recesses of the forward connector body are within the dimensions of a profile of a forward face of the forward connector body.

11. The method of claim 6, wherein each of the first and second inward facing tabs are substantially parallel to their respective first and second retaining loops.

12. The method of claim 11, wherein the substantially parallel first inward facing tab and first retaining loop are substantially perpendicular to an elongate axis of the first flex tab of the metal frame.

13. The method of 6, wherein each of the flex tabs is flexible relative to a main body of the metal frame.

14. The method of claim 13, wherein each of the flex tabs includes a fixed bend that accommodates the shoulder of the forward connector body.

15. The method of claim 13, wherein each of the inward facing tabs interfaces with a respective side of the forward connector body and wherein each of the retaining loops interfaces with a common side of the forward connector body.

16. A metal frame for shielding a non-metal connector body, the metal frame comprising:

a frame body including a central opening that receives the non-metal connector body;

a pair of substantially parallel flex tabs that extend forwardly from the frame body and flex relative to the frame body, wherein each of the flex tabs includes an inward facing tab and a retaining loop, wherein the inward facing tab and the retaining loop of each flex tab are substantially parallel and wherein the inward facing tab and the retaining loop of each flex tab are substantially perpendicular to an elongate axis of the flex tabs; and a pair of flexible shielding interfaces formed within first and second sides of the frame body, the flexible shielding interfaces directed inward into the central opening of the frame body.

17. The metal frame of claim 16, wherein each of the flex tabs includes a fixed bend proximate a flex point of the flex tabs relative to the frame body.

* * * * *